US009462348B2

(12) United States Patent
McElhatten et al.

(10) Patent No.: US 9,462,348 B2
(45) Date of Patent: *Oct. 4, 2016

(54) TECHNIQUE FOR EFFECTIVELY ACCESSING PROGRAMMING LISTING INFORMATION IN AN ENTERTAINMENT DELIVERY SYSTEM

(71) Applicant: Time Warner Cable Enterprises LLC, New York, NY (US)

(72) Inventors: David McElhatten, Marina Del Ray, CA (US); Stephen Johnson, Pasadena, CA (US); Robert Benya, Breezy Point, NY (US); Robert B. Golden, Riverside, CT (US); James W. Kasanin, Brooklyn, NY (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,559

(22) Filed: May 31, 2015

(65) Prior Publication Data

US 2015/0281795 A1     Oct. 1, 2015

Related U.S. Application Data

(63) Continuation of application No. 11/671,374, filed on Feb. 5, 2007, now Pat. No. 9,071,795, which is a continuation of application No. 10/430,161, filed on May 5, 2003, now Pat. No. 7,174,126, which is a (Continued)

(51) Int. Cl.
*G06F 3/00* (2006.01)
*G06F 13/00* (2006.01)
(Continued)

(52) U.S. Cl.
CPC ........ *H04N 21/4821* (2013.01); *G06F 3/0482*

(2013.01); *H04N 5/445* (2013.01); *H04N 5/44543* (2013.01); *H04N 5/782* (2013.01); *H04N 7/17318* (2013.01); *H04N 7/17327* (2013.01); *H04N 7/17336* (2013.01);
(Continued)

(58) Field of Classification Search
CPC .................. H04N 21/23106; H04N 21/2408; H04N 21/2625; H04N 21/2747; H04N 21/4227; H04N 21/433; H04N 21/47
See application file for complete search history.

(56) References Cited

U.S. PATENT DOCUMENTS 5,812,124 A * 9/1998 Eick .................... H04N 5/44543
348/E5.105
5,872,588 A * 2/1999 Aras .................... H04N 7/17354
348/E7.075

(Continued)

*Primary Examiner* — Joshua Taylor
(74) *Attorney, Agent, or Firm* — Michael P. Straub; Stephen T. Straub; Ronald P. Straub

(57) ABSTRACT

In a broadband communications system, e.g., a cable system, programming content can be readily reserved and accessed for viewing using an interactive program guide, a network home graphic user interface (GUI), Quick View Guide, etc., in accordance with the invention. Such programming content may include in-progress programs, future programs and previously broadcast programs which are recorded at a headend in the cable system, and which may or may not have overlapping broadcast times. In addition, the user may reserve programs at a set-top terminal, and may also do so remotely from the terminal through a communications network such as, the Internet, a public switched telephone network (PSTN), a wireless telephone network, etc.

17 Claims, 38 Drawing Sheets

Related U.S. Application Data continuation-in-part of application No. 10/302,550, filed on Nov. 22, 2002, now Pat. No. 7,073,189.

(60) Provisional application No. 60/377,963, filed on May 3, 2002.

(51) Int. Cl.
| | |
|---|---|
| H04N 5/445 | (2011.01) |
| H04N 21/482 | (2011.01) |
| G06F 3/0482 | (2013.01) |
| H04N 5/782 | (2006.01) |
| H04N 7/173 | (2011.01) |
| H04N 21/231 | (2011.01) |
| H04N 21/235 | (2011.01) |
| H04N 21/236 | (2011.01) |
| H04N 21/24 | (2011.01) |
| H04N 21/242 | (2011.01) |
| H04N 21/262 | (2011.01) |
| H04N 21/2747 | (2011.01) |
| H04N 21/4147 | (2011.01) |
| H04N 21/4227 | (2011.01) |
| H04N 21/432 | (2011.01) |
| H04N 21/433 | (2011.01) |
| H04N 21/4335 | (2011.01) |
| H04N 21/435 | (2011.01) |
| H04N 21/45 | (2011.01) |
| H04N 21/454 | (2011.01) |
| H04N 21/458 | (2011.01) |
| H04N 21/472 | (2011.01) |
| H04N 21/4722 | (2011.01) |
| H04N 21/485 | (2011.01) |
| H04N 21/6587 | (2011.01) |
| H04N 21/8545 | (2011.01) |
| H04H 60/46 | (2008.01) |
| H04H 60/74 | (2008.01) |
| H04N 5/44 | (2011.01) |
| H04N 5/45 | (2011.01) |
| H04N 5/60 | (2006.01) |
| H04N 21/422 | (2011.01) |
| H04N 21/431 | (2011.01) |
| H04N 21/47 | (2011.01) |
| H04N 21/478 | (2011.01) |

(52) U.S. Cl.
CPC ...... *H04N21/235* (2013.01); *H04N 21/23106* (2013.01); *H04N 21/23614* (2013.01); *H04N 21/242* (2013.01); *H04N 21/2408* (2013.01); *H04N 21/2625* (2013.01); *H04N 21/26291* (2013.01); *H04N 21/2747* (2013.01); *H04N 21/4147* (2013.01); *H04N 21/4227* (2013.01); *H04N 21/435* (2013.01); *H04N 21/4312* (2013.01); *H04N 21/4325* (2013.01); *H04N 21/4331* (2013.01); *H04N 21/4333* (2013.01); *H04N 21/4334* (2013.01); *H04N 21/4335* (2013.01); *H04N 21/454* (2013.01); *H04N 21/4532* (2013.01); *H04N 21/4583* (2013.01); *H04N 21/4722* (2013.01); *H04N 21/47202* (2013.01); *H04N 21/47214* (2013.01); *H04N 21/482* (2013.01); *H04N 21/485* (2013.01); *H04N 21/4825* (2013.01); *H04N 21/4826* (2013.01); *H04N 21/6587* (2013.01); *H04N 21/8545* (2013.01); *H04H 60/46* (2013.01); *H04H 60/74* (2013.01); *H04N 5/4401* (2013.01); *H04N 5/45* (2013.01); *H04N 5/602* (2013.01); *H04N 21/42204* (2013.01); *H04N 21/4316* (2013.01); *H04N 21/47* (2013.01); *H04N 21/478* (2013.01); *H04N 2005/4441* (2013.01)

(56) References Cited

U.S. PATENT DOCUMENTS

| | | | | |
|---|---|---|---|---|
| 6,002,394 | A * | 12/1999 | Schein | H04N 5/44543 348/E5.104 |
| 6,175,362 | B1 * | 1/2001 | Harms | H04N 5/44543 348/563 |
| 6,249,320 | B1 * | 6/2001 | Schneidewend | H04B 7/18526 348/569 |
| 2002/0078466 | A1 * | 6/2002 | Beyda | H04N 7/17318 725/109 |
| 2003/0046695 | A1 * | 3/2003 | Billmaier | G06F 3/0482 725/39 |

* cited by examiner

100

300

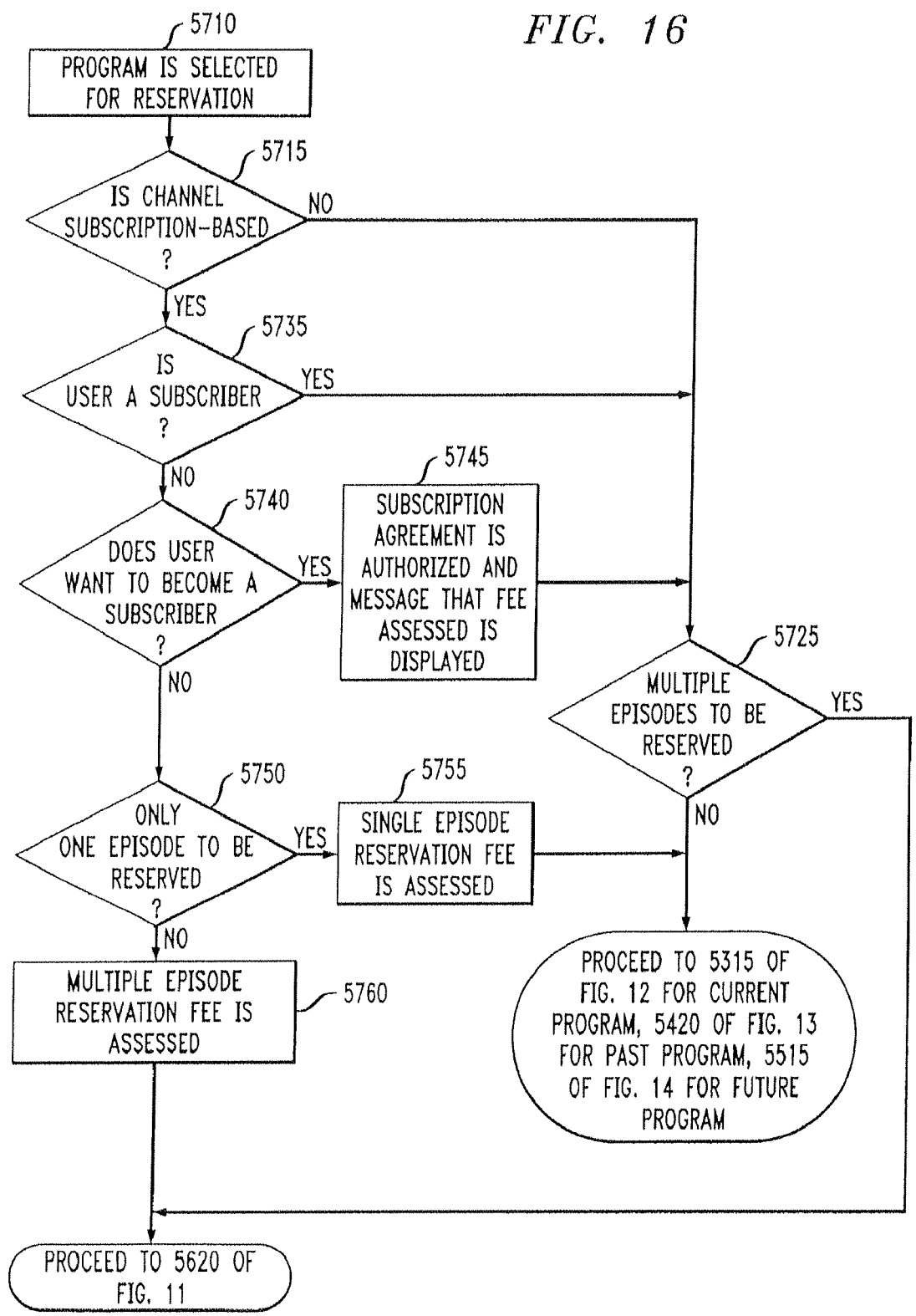

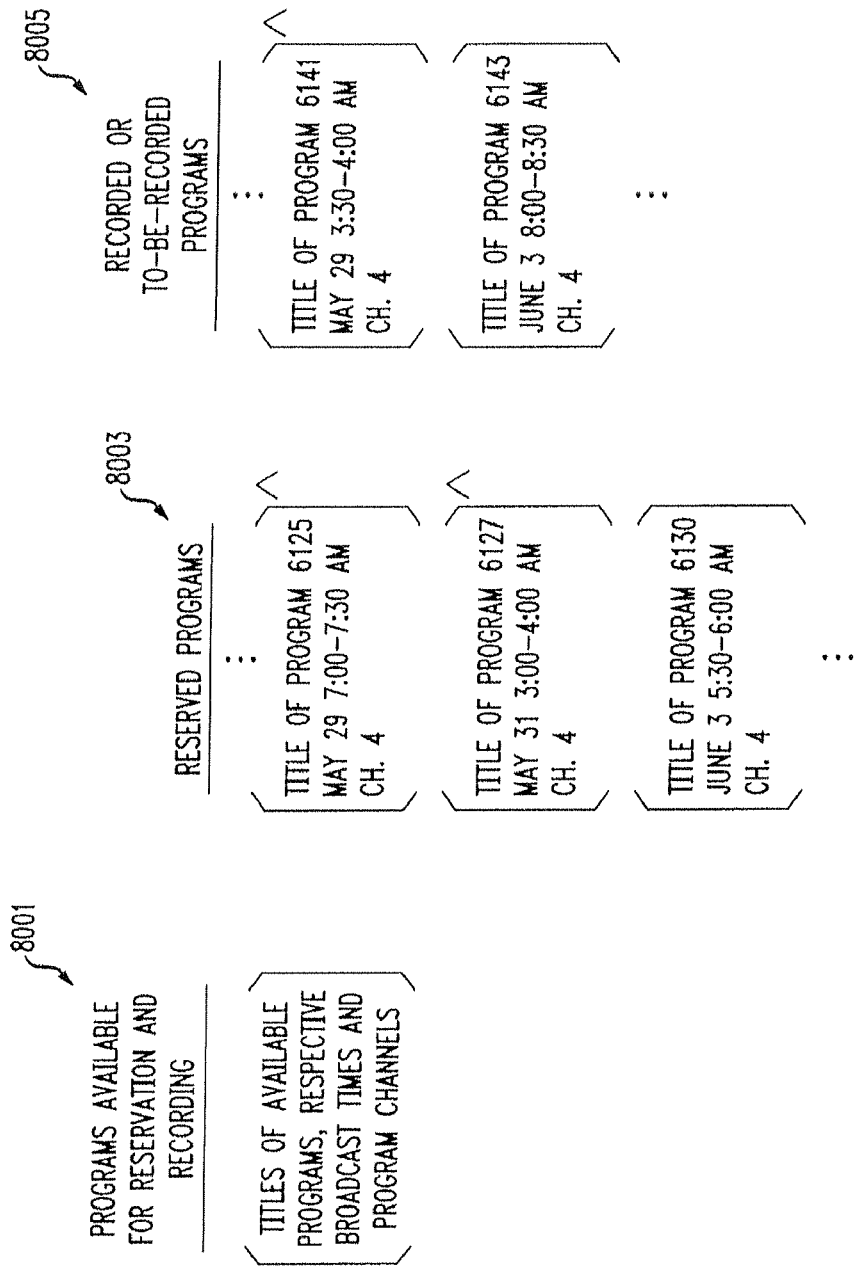

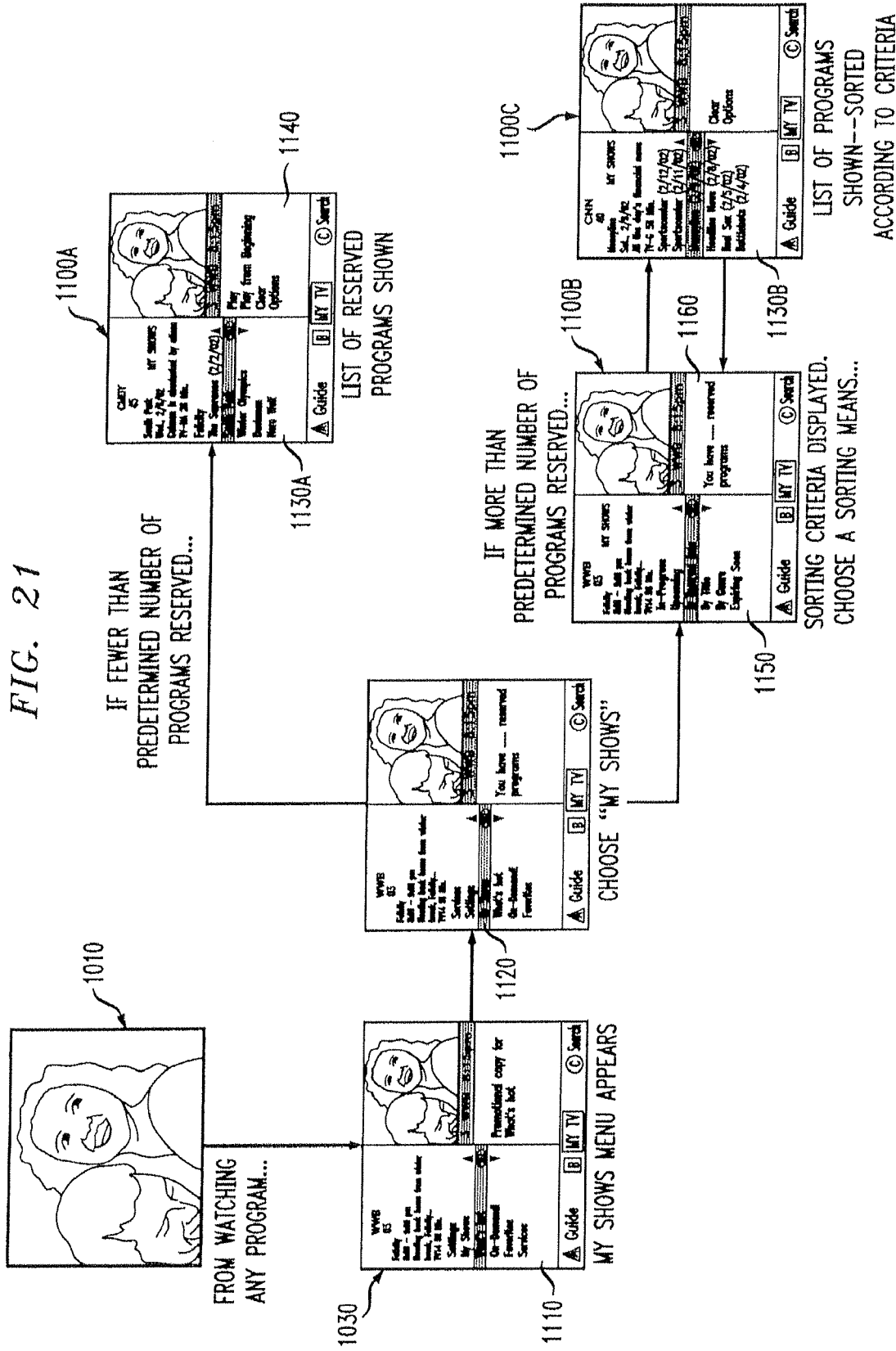

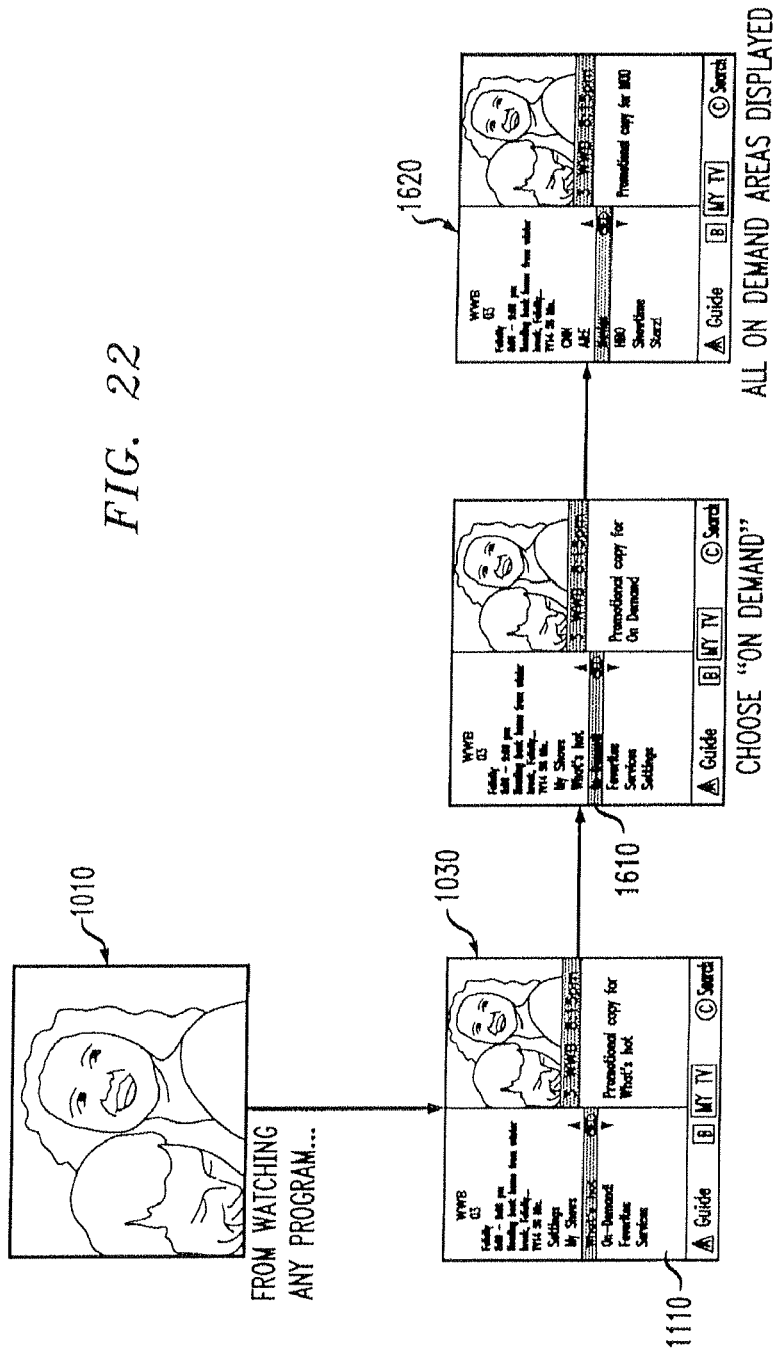

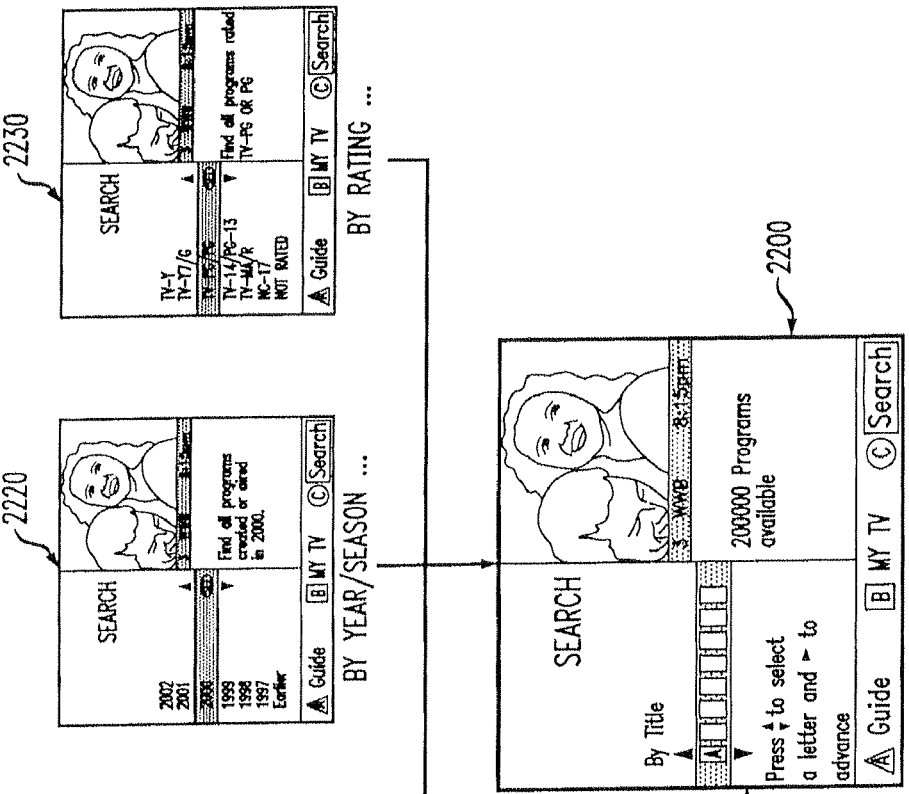
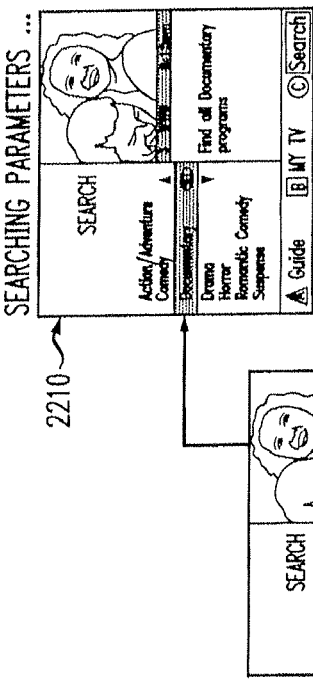
FIG. 40

TECHNIQUE FOR EFFECTIVELY ACCESSING PROGRAMMING LISTING INFORMATION IN AN ENTERTAINMENT DELIVERY SYSTEM

RELATED APPLICATIONS

The present application is a continuation of U.S. application Ser. No. 11/671,374 filed Feb. 5, 2007 which is hereby expressly incorporated by reference and which is a continuation of U.S. application Ser. No. 10/430,161 filed May 5, 2003 which is also hereby expressly incorporated by reference and which is a continuation-in-part of U.S. application Ser. No. 10/302,550 filed on Nov. 22, 2002, which claims the benefit of U.S. Provisional Application No. 60/377,963 filed on May 3, 2002 under 35 U.S.C. 119(e).

FIELD OF THE INVENTION

The invention relates to communications systems and methods, and more particularly to a system and method for accessing entertainment programs and other information through a communications network, e.g., a cable network.

BACKGROUND OF THE INVENTION

Personal video recorders (PVRs), also known as digital video recorders (DVRs), e.g., TiVo and ReplayTV devices, are popular nowadays, stemming from their capabilities of Apausing@, Arewinding@, and Afast-forwarding@ live television (TV) broadcast while it is being recorded. They may also offer programming access and recording functions, including Aseason pass@-like options for automatically recording every episode of a show for an entire season and an Aon-screen guide@ for looking up recorded programs to view. The PVRs may also suggest programs for recording based on a user=s viewing habit.

With the advent of digital communications technology, many TV broadcast streams are transmitted in digital formats. For example, Digital Satellite System (DSS), Digital Broadcast Services (DBS), and Advanced Television Standards Committee (ATSC) broadcast streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, multiplexed in a transport stream traversing a single broadcast channel. A digital TV receiver may be used to decode an MPEG-2 encoded transport stream, and extract the desired program therefrom. The prior art PVRs take advantage of MPEG-2 compression of video and audio data to maximize use of their limited storage capacity.
MPEG-2 Background In accordance with the MPEG-2 standard, video data may be compressed based on a sequence of groups of pictures (GOPs), in which each GOP may begin with an intra-coded picture frame (also known as an AI-frame@), which is obtained by spatially compressing a complete picture using discrete cosine transform (DCT). As a result, if an error or a channel switch occurs, it is possible to resume correct decoding at the next I-frame.

The GOP may represent additional frames by providing a much smaller block of digital data that indicates how small portions of the I-frame, referred to as macroblocks, move over time. Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption) and this information is also carried in the MPEG-2 transport stream, possibly as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

SUMMARY OF THE INVENTION

Although prior art PVRs offer such useful functions as on-screen guides to facilitate a user to access desired programming content, certain deficiencies associated with use of the prior art program guides have been recognized. In particular, a user who wants to access programming content on a programming-network basis finds it hard to do so with the prior art guides. Such a programming network may be a multi-program-channel broadcaster such as the CNN network, NBC network, HBO network, etc. For example, the CNN network offers multiple program channels and choices such as CNN, CNN Headline News, CNN fn (Financial News), CNN Sports Illustrated, CNN Espanol, CNN International, etc. However, because the channel numbers assigned to the CNN channels invariably are not consecutive or even close to one another, their listings do not appear as a group on a prior art program guide where program channels typically are listed in numerical order. Another example is the NBC network, which offers the NBC channel on program channel 4 in some markets, but its affiliated CNBC and MS NBC channels are not listed anywhere close to the NBC channel on a prior art program guide.

In accordance with the invention, a "home" site for a programming network has been realized from which a user may access the network's affiliated program channels, and its products and services in general. In practice, at least one group of program channels which are associated with a programming content provider, e.g., the programming network, are identified. Indicators are then listed on a program guide (e.g., accessible from the home site), indicating two or more of the program channels in the group, as an aggregation exclusive of any indicator indicating a program channel outside the group. A user is allowed to select of one of the indicators to access programming content offered by the program channel indicated thereby. Advantageously, such an inventive aggregation not only facilitates user access to the programming network's channels, but also its cross-marketing and promoting the same.

To further facilitate user access to programming content associated with a particular program channel via a program guide, a user is afforded a selection of an indicator indicating the desired program channel on a "Quick View" guide in accordance with the invention. In response to one such selection, identifiers identifying a predetermined number of programs offered by the selected program channel are listed on the Quick View guide. By contrast, a user of a prior art program guide is not afforded a selection of a particular program channel to list its associated programs. Nor does the prior art guide list a predetermined number of programs at a time. Rather, the number of programs listed on the prior art guide is a function of the number of time slots which can be accommodated thereby, and durations of the listed programs which cannot be predetermined.

BRIEF DESCRIPTION OF THE DRAWINGS

Further objects, features and advantages of the invention will become apparent from the following detailed description taken in conjunction with the accompanying drawing showing illustrative embodiments of the invention, in which:

FIG. 16 is a flow chart depicting a process for selecting a program-specific or channel-specific subscription service;

FIG. 20C illustrates an alternate format to the integrated program guide of FIG. 20A;

FIG. 21 illustrates screen displays in accessing a My Shows GUI in accordance with the invention;

FIG. 22 illustrates screen displays in accessing an On-Demand GUI in accordance with the invention;

FIG. 40 illustrates screen displays in conducting searches in accordance with the invention.

DETAILED DESCRIPTION

Figure 1:
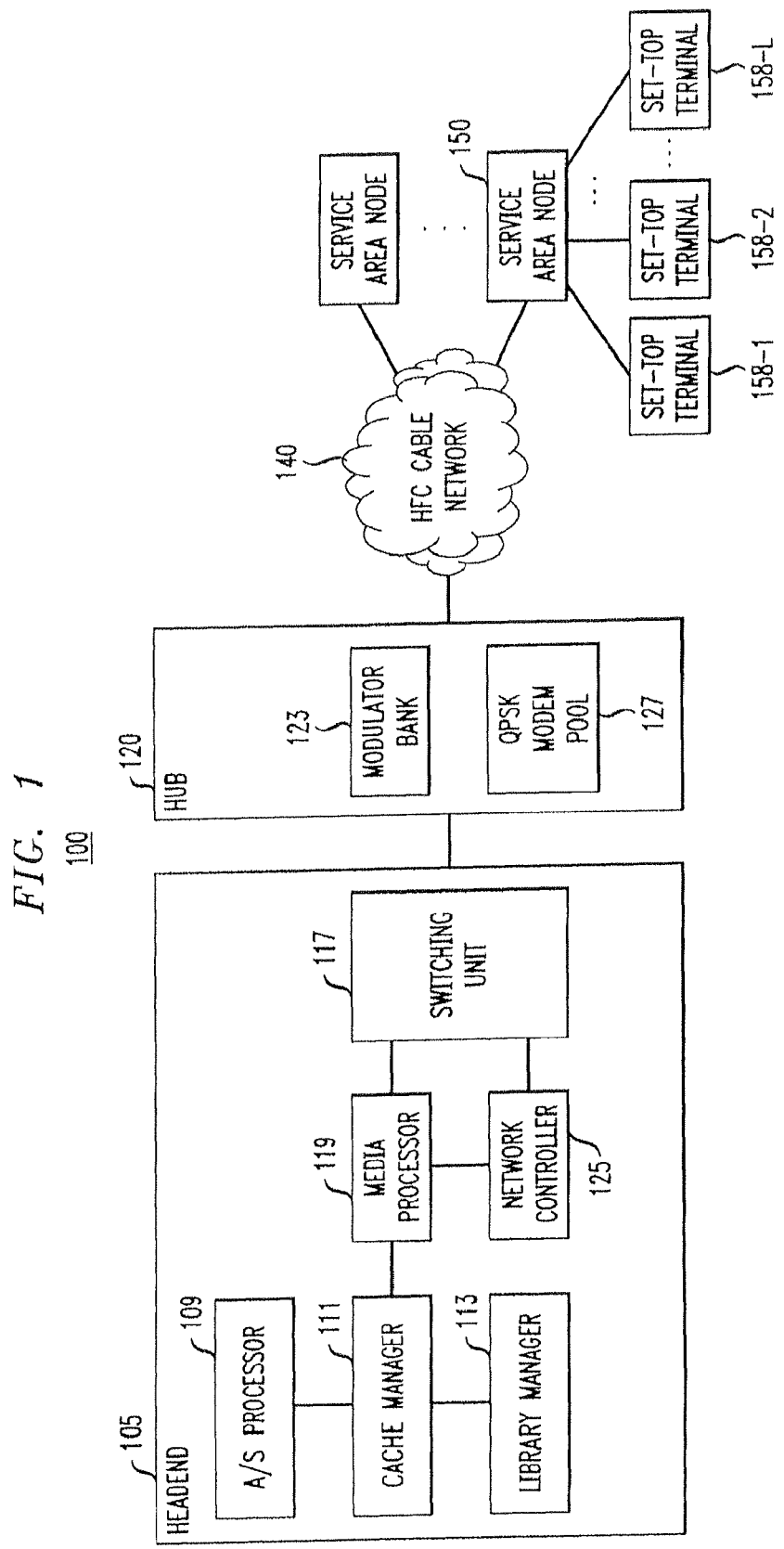
FIG. 1 is a block diagram of a broadband communications system in accordance with one embodiment of the invention.

FIG. 1 illustrates broadband multi-channel communications system 100 embodying the principles of the invention for providing interactive programming and services to users, including program reservation, season pass reservation and out-of-market programming, program-specific subscription services and access to interactive program guides. For example, system 100 in this instance includes a cable system for delivering, in accordance with the invention, information and entertainment programs to set-top terminals on the user premises. As shown in FIG. 1, system 100 includes headend 105, hub 120, hybrid fiber coax (HFC) cable network 140 and different service area nodes including node 150, which in this instance is connected to set-top terminals 158-1 through 158-L in a neighborhood, where L represents an integer.

Headend 105 receives programs and services from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as MPEG-2 encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention.

Acquisition/Staging (A/S) processor 109 in headend 105 processes program materials including, e.g., TV program streams, from one or more of the aforementioned sources in analog and digital forms. Analog TV program streams may be formatted according to the National Television Standards Committee (NTSC) or PAL broadcast standard. Digital TV streams may be formatted according to the Digital Satellite System (DSS), Digital Broadcast Services (DBS), or Advanced Television Standards Committee (ATSC) standard. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams are typically encoded at a variable bit rate (VBR). To avoid data burstiness, processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term Atransmission channel@ should not be confused with a Aprogram channel.@ A Atransmission channel@ signifies a designated frequency band through which a transport stream is transmitted. On the other hand, a Aprogram channel@ signifies the source of the program material selected by a user to view. For example, a user may select program channel 2 to view program material provided by CBS, program channel 14 to view program material provided by ESPN; program channel 32 to view program material provided by MTV, etc.

In this illustrative embodiment, the transmission channels, each carrying a transport stream, may be 6 MHz bands populating a forward passband, e.g., 350-750 MHz band, of a coaxial cable, which is allocated for downstream communication from headend 105 to a set-top terminal.

A/S processor 109 may receive Aassets@ including pre-staged movie videos, news reports, sports events, etc. from content providers. However, in accordance with the invention, processor 109 may also create Aassets@ in real time while processing received program materials which are not pre-staged by the content providers. In general, an Aasset@ is a container for any object or set of objects that may be desired to implement a service, including video, audio, images, application executables, scripts, configuration files, text, fonts, and HTML pages. In addition to the raw content, metadata (not to be confused with MPEG-2 metadata) is also a part of an asset object that describes characteristics of the asset. For example, asset metadata may describe attributes that are inherent in the content of the asset, such as the rating, format, duration, size, or encoding method. Values for asset metadata are determined at the time the asset is created.

Figure 2:
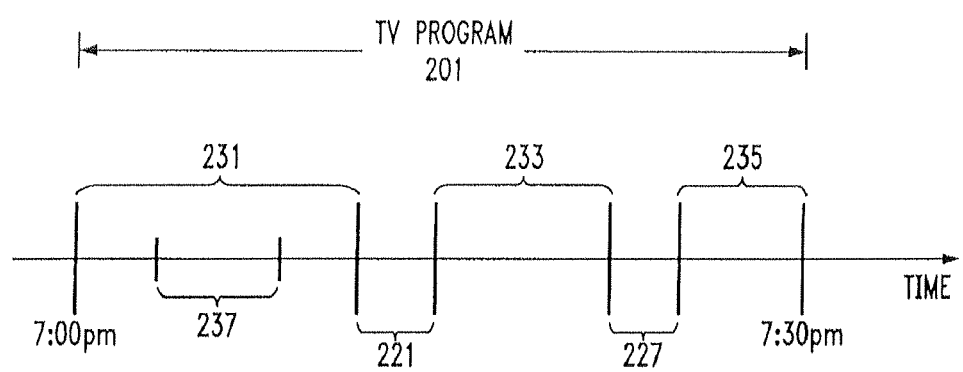
FIG. 2 illustrates a TV program comprising multiple program segments which is provided in the system of FIG. 1.

In this illustrative embodiment, an asset concerning a program includes a metadata file and trick files associated with the program, in addition to the program content contained in a transport stream. FIG. 2 illustrates TV program 201 which spans from 7:00 p.m. to 7:30 p.m. Program 201 comprises a show interrupted by commercials, which is typical. Thus, the program content in this instance consists of show segments 231, 233 and 235, interleaved with commercial segments 221 and 227. In accordance with an aspect of the invention, the TV program streams received by processor 109 are pre-processed, e.g., by the providers, to include indicators, e.g., cue-tones, on which processor 109 relies to identify the demarcations (or edges) of different programs and program segments within each program. Thus, in this instance before processor 109 processes the TV program stream containing TV program 201, a first cue-tone has been inserted at the beginning of segment 231, indicating the beginning of TV program 201; second cue-tones have been inserted at the beginnings of segments 221 and 227, indicating the beginnings of the respective commercial segments; third cue-tones have been inserted at the ends of segments 221 and 227, indicating the ends of the respective commercial segments; and a fourth cue-tone has been inserted at the end of segment 235, indicating the end of TV program 201. In accordance with another aspect of the invention, another set of cue-tones may be inserted to delimit a Achapter@ (denoted 237) within a program. A chapter is a self-contained subprogram, e.g., a skit, monolog, song performance, news report, weather report, etc. within a program. With the cue-tones defining one such chapter, processor 109 is capable of identifying the chapter and create an asset concerning the same.

Let=s assume that TV program 201 in this instance is an initial broadcast program. Processor 109, among other things, collects in a database (not shown) program guide data associated with different TV programs which are not pre-staged (including TV program 201 in this instance) from an application server, which may be different from the sources of the TV programs themselves. Each program when presented to processor 109 is identified by a program designation, which may be used to locate the corresponding program guide data. In particular, processor 109 while processing TV program 201 may locate the corresponding program guide data to create in real time the metadata file associated with TV program 201. The metadata file thus created includes such data as the title, rating (e.g., G, PG-13, R, etc.), names of the producer, director, and actors, duration of the program, program type (e.g., situation comedy), etc.

Processor 109 may also create in real time trick files associated with program 201 as part of the asset which are used to perform PVR-like functions (e.g., rewinding and fast-forwarding) on program 201 in accordance with the invention. One such trick file in this instance is a Afast-forward@ trick file which contains an array of identifiers of I-frames in the program stream (MPEG-2 encoded as mentioned before) corresponding to program 201 in a forward direction. Another trick file is a Arewind@ trick file which contains an array of identifiers of I-frames in the program stream corresponding to program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

It should be noted that where program 201 is not an initial broadcast program, which may also be pre-staged, commercial segments 221 and 227 may not contain the commercials originally provided by the program provider. Rather, program 201 may be repackaged with after-market commercials, which may be targeted to the user (described below), and which may even be injected anywhere in the program with no regard for original segments 221 and 227 in terms of their timing, duration, or quantity. In the event that program 201 is pre-staged, the program content comes with the corresponding metadata file and trick files associated with the program. Processor 109 stores the created or pre-staged asset including the metadata file and trick files associated with a program according to its program designation in asset storage (not shown), which may reside in library manager 113 described below.

The transport streams generated by processor 109, which contain live TV programs in this instance, are fed to cache manager 111. The latter includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory such that the cache memory stores the last Y hours=worth of the TV programs while the library storage stores the last Z hours=worth of the TV program, where the value of Z is much greater than that of Y. It suffices to know for now that use of the cache memory, which affords faster access to its content than the library storage, facilitates a speedy retrieval of a requested program in the event of a Acache hit,@ i.e., the requested program being within the last Y hour broadcast. Otherwise, a Acache miss@ causes locating the requested program in the library storage, thereby incurring a delay in the retrieval of the program.

Network controller 125, among others, assigns resources for transporting program materials to set-top terminals and communicates various data including system information with the terminals. Upstream data from a set-top terminal to network controller 125 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller 25 may change after a system reconfiguration. Nevertheless, each set-top terminal and controller 25 is also assigned a media access control (MAC) address on a permanent basis, surviving any system reconfiguration.

Downstream data from network controller 125 to a set-top terminal is communicated via forward data channels (FDCs). These channels, often referred to as Aout-of-band@ channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

When a user at a set-top terminal, say, terminal 158-1, turns on the TV associated therewith and selects a particular program channel, say, program channel 2, or change from another channel to channel 2, terminal 158-1 in a well known manner scans for any transport streams transporting programs to the neighborhood. In system 100, each transport stream is identified by a unique transport stream identification (TSID).

Figure 3:
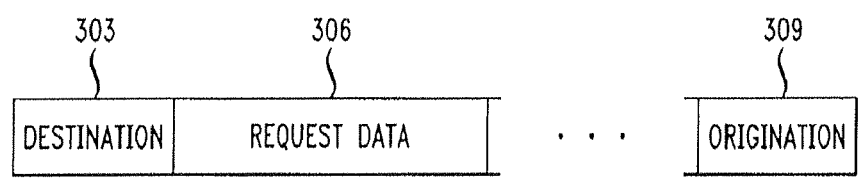
FIG. 3 illustrates a request for program material from a set-top terminal in the system of FIG. 1.

Continuing the above example, once the TSIDs of the transport streams are detected, terminal 158-1 sends through QPSK modem pool 127 a request for program channel 2 material. FIG. 3 illustrates one such request (denoted 300) sent from a set-top terminal to network controller 125 via an RDC. As shown in FIG. 3, request 300 includes, among others, destination field 303 which in this instance contains the IP address of network controller 125 for which request 300 is destined; request data field 306 which contains data concerning the detected TSIDs and the requested program channel material, e.g., program channel 2 material in this instance; and origination field 309 which in this instance contains the IP (and/or MAC) address of terminal 158-1 from which request 300 originates.

Figure 4:
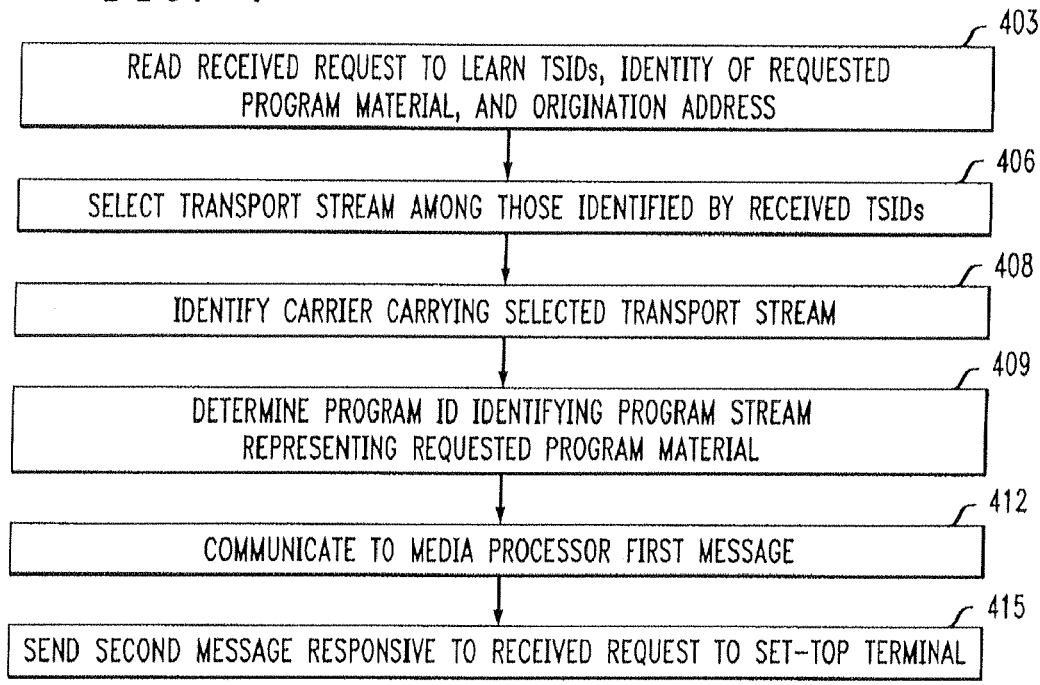
FIG. 4 is a flow chart depicting a process for providing program material in response to the request of FIG. 3.

After receiving request 300, network controller 125 reads the received request to learn the TSIDs, the identity of the requested program material, and the origination address therein, as indicated at step 403 in FIG. 4. Network controller 125 communicates with media processor 119 to determine the capacity required for transmitting the requested program material. Based on the required capacity, controller 125 at step 406 selects a transport stream among those identified by the received TSIDs which is suitable for transporting the requested program material. Controller 125 at step 408 identifies the carrier carrying the selected transport stream.

Figure 5:
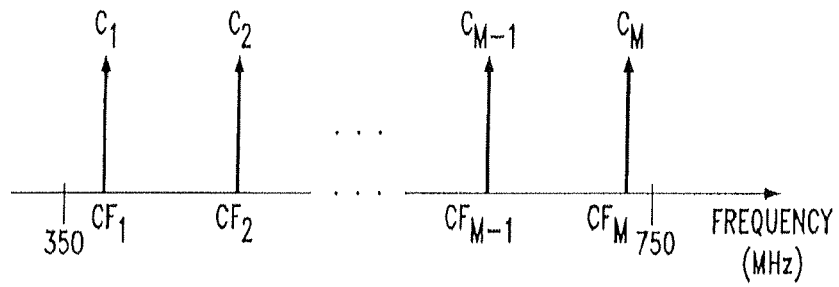
FIG. 5 illustrates selected carriers for transmitting program materials in a forward passband of the system of FIG. 1.

Referring also to FIG. 1, modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 5 illustrates M carriers, $C_1$ through $C_M$, associated with M transmission channels in the forward passband. As shown in FIG. 5, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123 in this instance may modulate up to 9 program streams, multiplexed in a transport stream, onto the corresponding carrier. The resulting modulated carrier is transmitted through the transmission channel associated with the carrier.

Network controller 125 may include therein a carrier assignment table which lists, for each carrier, the TSID of the transport stream carried thereby. The carrier identification by network controller 125 at aforementioned step 408 may be achieved by looking up from the table the carrier associated with the TSID of the selected transport stream. Based on the requested program channel, network controller 125 at step 409 determines the program ID identifying the program stream representing the requested program material, i.e., program channel 2 material in this instance, which is then multiplexed with other program streams in the selected transport stream. At step 412, network controller 125 communicates to media processor 119 a first message containing the identity of the modulator in modulator bank 123 which corresponds to the carrier, say, $C_1$, just determined, and the program ID associated with the requested program channel material just determined. Network controller 125 at step 415 sends, through QPSK modem pool 127, a second message responsive to the received request to set-top terminal 158-1 identified by the origination IP (and/or MAC) address in field 309 of request 300. This second message traversing an FDC contains the information concerning the carrier frequency, i.e., $CF_1$ in this instance, to which terminal 158-1 should tune to receive the appropriate transport stream, and the program ID for extracting the desired program stream, representing in this instance program channel 2 material, within the transport stream.

In response to the first message, processor 119 directs cache manager 111 to deliver a copy of the program stream representing the requested program channel material thereto and causes the program stream to be multiplexed with any other program streams already in the transport stream identified by the selected TSID. In addition, processor 119 causes switching unit 117 to switch the resulting transport stream to the modulator corresponding to the carrier $C_1$. Accordingly, the modulator modulates the carrier $C_1$ with the received transport stream, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing program channel 2 material in this instance. In a well known manner, terminal 158-1 converts the extracted program stream to appropriate signals for the associated TV to play program channel 2 material.

While the program channel 2 material is being played, terminal 158-1 continuously registers the last I-frame identifier in the received transport stream. From time to time, terminal 158-1 sends a Aheartbeat@ containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

Figure 6:
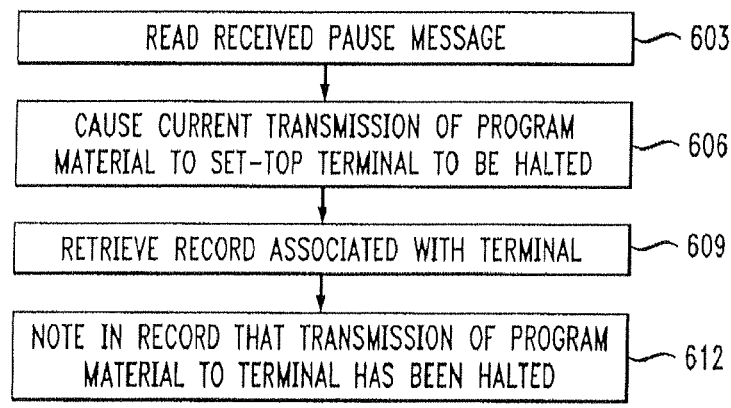
FIG. 6 is a flow chart depicting a process for pausing a program in response to a pause message from a set-top terminal.

When the user issues a pause command to terminal 158-1, e.g., by pressing a Apause@ key on a remote control associated therewith to temporarily stop the progress of the program, terminal 158-1 issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect. After receiving the pause message, processor 119 reads the received pause message, as indicated at step 603 in FIG. 6. Processor 119 at step 606 causes the current transmission of the program material to set-top terminal 158-1 (identified by the received IP and/or MAC address) to be halted at the I-frame immediately following the last I-frame identified in the received message. Processor 119 at step 609 retrieves the record associated with terminal 158-1. Processor 119 at step 612 notes in the record that the transmission of the program material to terminal 158-1 has been halted at I-frame$_{pause}$.

When the user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/or MAC address of terminal 158-1. After reading the received resumption message, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

Figure 7:
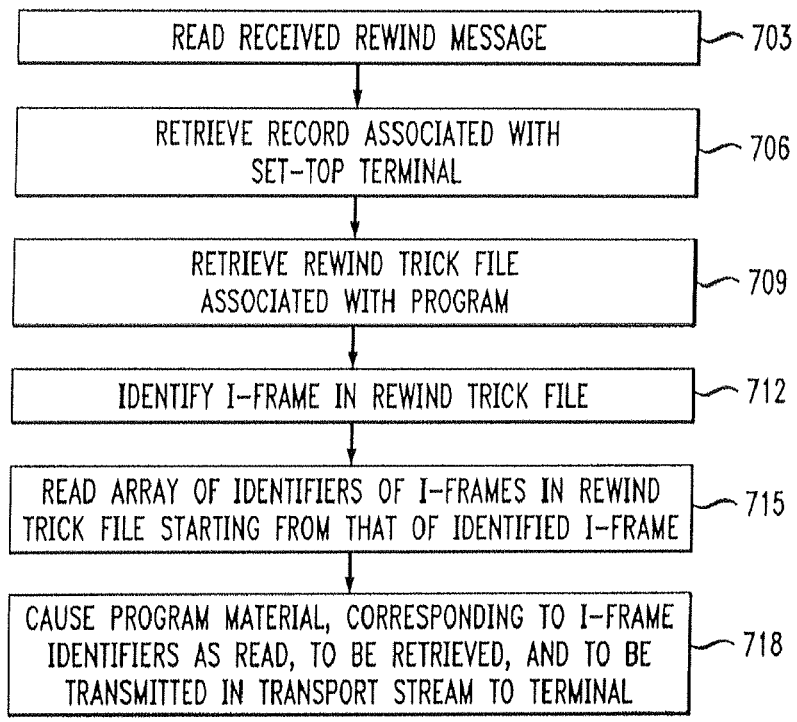
FIG. 7 is a flow chart depicting a process for rewinding a program in response to a rewind message from a set-top terminal.

While viewing a program, the user may issue a rewind command, e.g., by pressing a rewind key on the remote control, to rewind the program. In that case, terminal 158-1 issues a rewind message to processor 119 identified by its IP address. This rewind message includes a rewind initiation command, the last I-frame identifier registered by terminal 158-1, and the IP address (and/or MAC address) identifying terminal 158-1. After receiving such a rewind message, processor 119 reads the received rewind message, as indicated at step 703 in FIG. 7. Processor 119 at step 706 retrieves the record associated with set-top terminal 158-1 identified by the received IP address (and/or MAC address). Knowing from the record the identity of the program being transmitted, processor 119 at step 709 retrieves from the aforementioned asset storage the rewind trick file associated with the program. Based on the last I-frame information in the received message, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame. Processor 119 at step 718 causes the program material, corresponding to the I-frame identifiers as read, to be retrieved from cache manager 111, and to be transmitted in the transport stream to terminal 158-1, thereby achieving the desired rewind effect.

When the user issues a command to stop rewinding the program, e.g., by toggling the rewind key on the remote control, terminal 158-1 sends a rewind termination message to processor 119. This message includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

Figure 8:
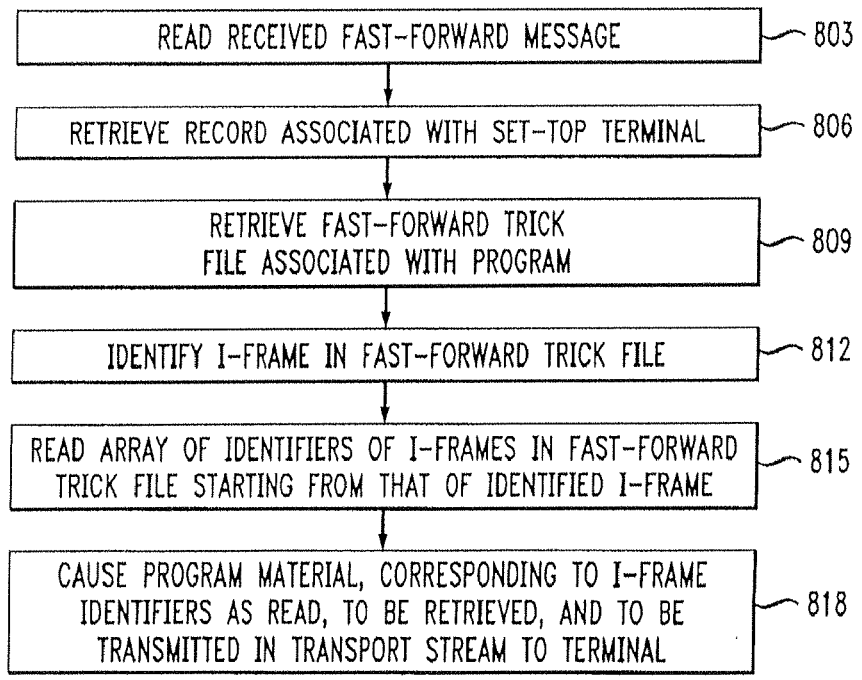
FIG. 8 is a flow chart depicting a process for fast-forwarding a program in response to a fast-forward message from a set-top terminal.

After rewinding a program, the user may issue a fast-forward command, e.g., by pressing a fast-forward key on the remote control, to fast-forward the program. In that case, terminal 158-1 issues a fast-forward message to processor 119 identified by its IP address. This fast-forward message includes a rewind initiation command, the last I-frame identifier registered by terminal 158-1, and the IP address (and/or MAC address) identifying terminal 158-1. After receiving such a fast-forward message, processor 119 reads the received fast-forward message, as indicated at step 803 in FIG. 8. Processor 119 at step 806 retrieves the record associated with set-top terminal 158-1 identified by the received IP address (and/or MAC address). Knowing from the record the identity of the program being transmitted, processor 119 at step 809 retrieves from the aforementioned asset storage the fast-forward trick file associated with the program. Based on the last I-frame information in the received message, processor 119 at step 812 identifies the I-frame in the fast-forward trick file which either matches or is the closest to that last I-frame. Processor 119 at step 815 reads the array of identifiers of the I-frames in the fast-forward trick file starting from that of the identified I-frame. Processor 119 at step 818 causes the program material, corresponding to the I-frame identifiers as read, to be retrieved from cache manager 111, and to be transmitted in the transport stream to terminal 158-1, thereby achieving the desired fast-forward effect.

When the user issues a command to stop fast-forwarding the program, e.g., by toggling the fast-forward key on the remote control, terminal 158-1 sends a fast-forward termination message to processor 119. This message includes a fast-forward termination command, and the IP address (and/or MAC address) of terminal 158-1. In response to the fast-forward termination command, processor 119 stops reading the fast-forward trick file associated with the program. Processor 119 learns from the record associated with terminal 158-1 the last I-frame identifier read from the fast-forward trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

It should be pointed out at this juncture that in the above illustrative embodiment, the transport streams generated by processor 109, which contain, e.g., live TV broadcast, are recorded in cache manager 111, followed by library manager 113, before they are fed to the requesting set-top terminals. As a result, the transport streams received by the terminals actually are recorded copies of the streams generated by processor 109. However, in a second embodiment, the transport streams generated by processor 109 are fed to the requesting set-top terminals in real time, and at the same time switched to cache manager 111 and library manager 113 for recording thereof. Thus, in this second embodiment, when a user at a set-top terminal performs a PVR-like function on an in-progress TV broadcast program, say, rewinding the program, the real-time transport stream being received by the terminal is immediately replaced by a second transport stream containing a recorded copy of the TV program, e.g., from cache manager 111. If after rewinding the program, the user invokes a fast-forwarding command to fast-forward the recorded TV program, there may come a point where the recorded TV program catches up with the in-progress program. In that case, the second transport stream being received by the terminal may be replaced back by the real-time transport stream containing the in-progress program.

Based on the disclosure heretofore, it is apparent to a person skilled in the art that the above-described interactivities between a set-top terminal and media processor 119 and/or network controller 125 in serving a TV broadcast program similarly apply to serving of other types of asset, e.g., a music video, news event, weather report, traffic report, sports event, video-on-demand (VOD), an audio-on-demand, etc. For example, the VOD assets may be stored in the library storage in library manager 113. In serving a VOD requested by a user, media processor 119 incorporates also other well known VOD server functions (e.g., receiving VOD requests, scheduling video presentations, etc.) retrieves a copy of the requested VOD from the library storage and caches the copy while serving the VOD. Subsequent requests for the same VOD would trigger a cache hit, thereby expediting the VOD presentation. In fact, in another embodiment, a number of caches, in addition to that in manger 111, are placed at selected delivery points in system 100, e.g., at an input to modulator bank 123, to cache any assets recently requested by, or delivered to, users in the hope that the same assets will be requested repeatedly because of their popularity, thereby increasing the chance of a cache hit.

Based on the disclosure heretofore, it is also apparent to a person skilled in the art that the above-described interactivities between a set-top terminal and media processor 119 and/or network controller 125 apply not only to carrying out the particular interactive PVR-like functions described above (e.g., pausing, rewinding and fast-forwarding), but interactive programming and services in general. To facilitate the realization of such programming and services, users at set-top terminals may be provided with on-screen user interfaces including, e.g., a Home graphical user interface (GUI), My Shows GUI, On-Demand GUI, Lookback GUI, Favorites GUI, Services GUI, What=s Hot GUI, Music-On-Demand GUI, Sports GUI and Search GUI, etc. to be described.

Program Reservation

Figure 9:
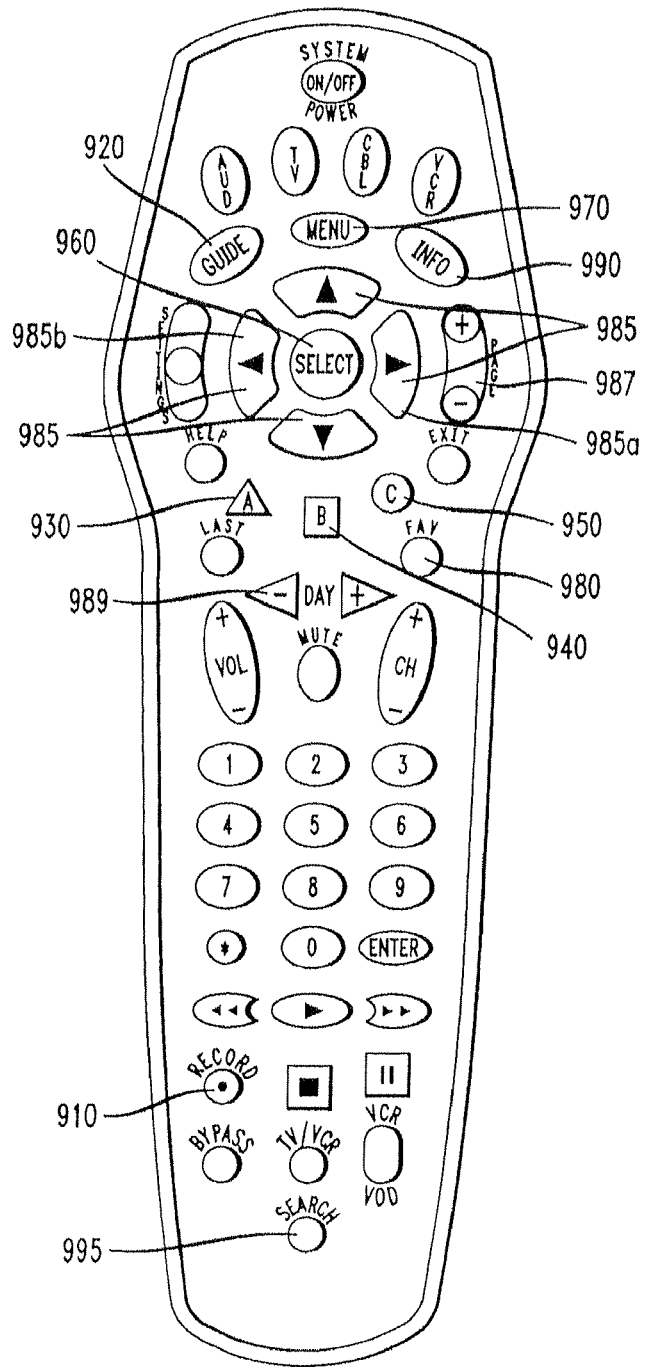
FIG. 9 is an illustration of a remote control according to one embodiment of the present invention.

One such interactive service is a Aprogram reservation@ service in accordance with the invention. This program reservation service enables a user to Areserve@ (1) programs, e.g., live (i.e., in-progress) or played back (i.e., previously broadcast) television programs, movies, music videos, etc. and (2) service displays, e.g., product information, commercials, web pages, etc. As mentioned before, all broadcast programs in this instance are recorded at headend 105 and all on-demand and other content is stored at headend 105 as well. Referring to FIG. 9, when a user at a set-top terminal, say, terminal 158-1, presses record key 910 of remote control 900 associated with the terminal to save a program for subsequent viewing, set-top terminal 158-1, unlike a prior art PVR, does not actually record the program. Rather, in accordance with the invention, in response to the user depression of record key 910, terminal 158-1 marks the program or event that has been recorded and/or stored at headend 105. The marking information concerning the point of the program (e.g., time or I-frame) at which the user pressed key 910 is transmitted to media processor 119. Information concerning the program channel to which terminal 158-1 tunes at that point, and an IP address (and/or MAC address) identifying terminal 158-1 are also transmitted to media processor 119. Based on the received IP address, processor 119 retrieves a user record associated with terminal 158-1, and registers in the record the ID of the asset containing the reserved program which is identifiable by the received marking information and program channel information, and which is made available to the user for subsequent playback. Thus, this user record is maintained, along with other user records, in storage (not shown) in headend 105, and contains, among others, a collection of IDs of the assets reserved by the user. The user record may be retrieved from the storage from time to time to review and update the assets the user has reserved. The identities of the reserved assets may be presented to the user in different formats or GUIs, e.g., in a My Shows list described below.

Figure 10:
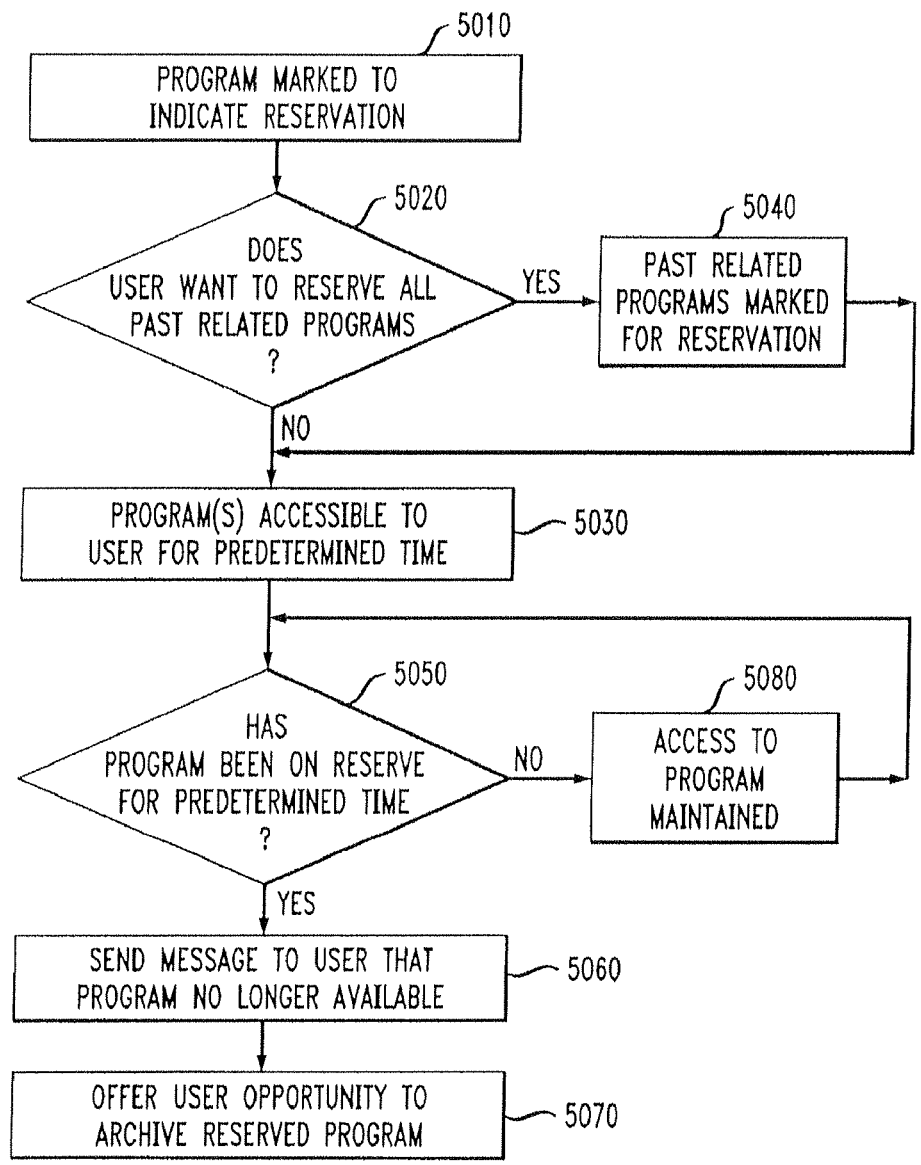
FIG. 10 is a flow chart depicting a program reservation process in a first embodiment of the invention.

In a particular illustrative embodiment, referring to FIG. 10, when the user reserves a program that is in progress, terminal 158-1 marks the entire program (e.g., by noting the program start and end times or I-frames) as well as the point at which the user pressed record key 910 (step 5010). On playback, the user has the option to begin viewing either at the beginning of the program or at the point that the user pressed record key 910. In another embodiment, when key 910 is pressed, a menu including different reservation options for selections is displayed on the TV screen. One such reservation option may be Aseason pass@ or (reserve all) which enables a user to reserve all related programs that are available. For example, the user may use select key 960 to select the Aseason pass@ option to reserve all episodes of a particular TV show, including all past, in-progress and future episodes that are available for reservation (steps 5020, 5040).

Figure 11:
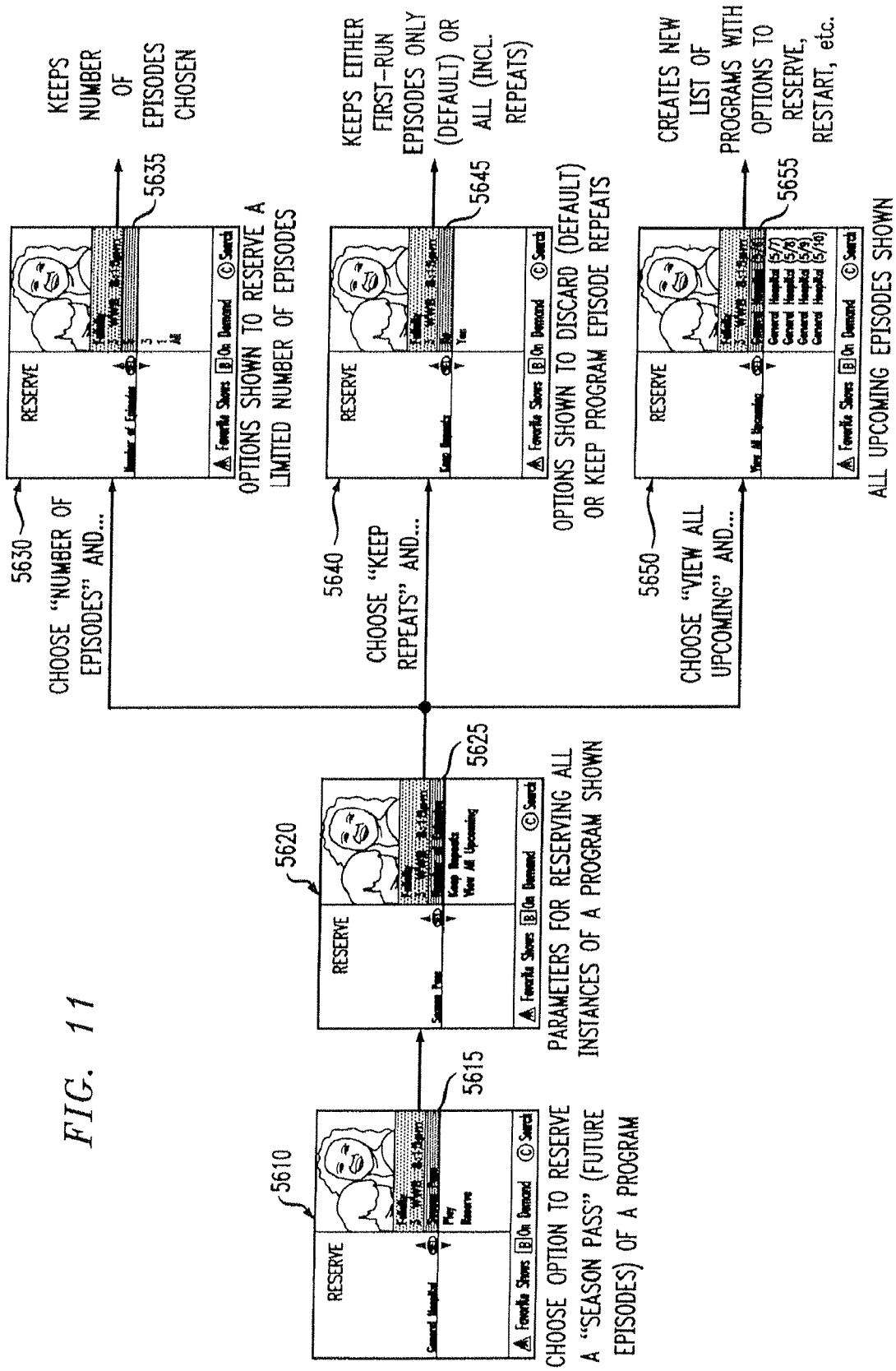
FIG. 11 illustrates screen displays in reserving a group of programs in accordance with the invention.

Referring to FIG. 11, a user may access the Aseason pass@ option by using record key 910 of remote control 900 to access AReserve@ display 5610. Reserve display 5610 makes the following reserve options (5615) available to a user: season pass, play or reserve. The play option enables the display of a selected program from its beginning, although the selected program is not reserved. The reserve option selects a program to be added to a user=s Favorite Show list. The season pass option allows a user to reserve multiple episodes of a selected program. By accessing the season pass feature from reserve options 5615, season pass submenu 5620 makes the following sub-options (5625) available to a user: choosing the number of episodes to be reserved, determining whether to reserve repeat episodes and viewing upcoming episodes for access.

By selecting the option for choosing the number of episodes to be reserved, ANumber of Episodes@ GUI 5630 is displayed and enables a user to select from submenu 5635 the number of upcoming episodes to be reserved. In one embodiment, the user may select from reserving the next episode, the next three episodes, the next five episodes or all upcoming episodes of a selected program. In another embodiment, the user may have the option of entering an integer which indicates the number of upcoming episodes that are to be reserved for the user in the future. The user may also have the option of reserving all episodes which would include reserving all of the upcoming episodes in addition to the past episodes that are still available to the user for viewing.

By selecting the option for keeping repeats, AKeep Repeats@ GUI 5640 is displayed and enables a user to command that all upcoming episodes of a specified program should be reserved by selecting AYes@ from submenu 5645 or only those episodes that are not repeats by selecting ANo@ from submenu 5645. A Arepeat@ is a program episode that has been previously broadcast by a content provider and is being broadcast again, which is indicated in the program guide data associated with the episode. In a preferred embodiment, a default is associated with the season pass feature in which only first run episodes (i.e., not repeats) are reserved unless the AYes@ repeat option is selected by the user.

By selecting the option for viewing all upcoming episodes of a selected program, AView All Upcoming@ GUI 5650 is displayed and enables a user to select among a display of all upcoming episodes of a specified program. The display lists all upcoming episodes of a selected program and the date that they are scheduled to broadcast. The list is limited to those episodes for which data may be available. For example, if data is available for two weeks into the future, every episode scheduled to broadcast in those two weeks is displayed. The user is then prompted to select among listed program episodes 5655 of View All Upcoming GUI 5560. When the user selects a listed episode by, for example, highlighting the desired episode and pressing select key 960 of remote control 900, the user is provided with options for reserving future programs as described below with reference to FIG. 14.

It should be noted that using the inventive program reservation service, a user may advantageously reserve multiple programs having overlapping broadcast times. As such, system 100 is superior to prior art PVRs in that, among others, limited by the number of tuners therein, the PVRs are not capable of recording time-overlapping programs in their entirety whose number is greater than the number of tuners, and retrieving previously unrecorded broadcast programs. It should also be noted that reserving a program here does not interfere with a user=s ability to watch and/or interact with other programs.

The inventive program reservation service enables a user to reserve past, current and future programs. When a user reserves a program that was broadcast in the past, the user may add the program to a My Shows list (described below) and can play the program from the beginning of the program or from any other point of time within the program. If the user reserves a currently broadcast (i.e., in-progress) program, the program is also added to the user=s My Shows list and the user can continue to watch the program from the point of the program that is being broadcast or any portions of the show that has already been broadcast. If the user reserves a future program, the program is added to the user=s My Shows list for viewing at the time of program broadcast or after the program is broadcast. Regardless of whether the reserved program is a past, current or future program, the user has the choice of watching any channel (e.g., other than the dedicated playback channel for the reserved program) at the time of the reservation and can choose the period in which the reserved program is to be viewed.

Figure 12:
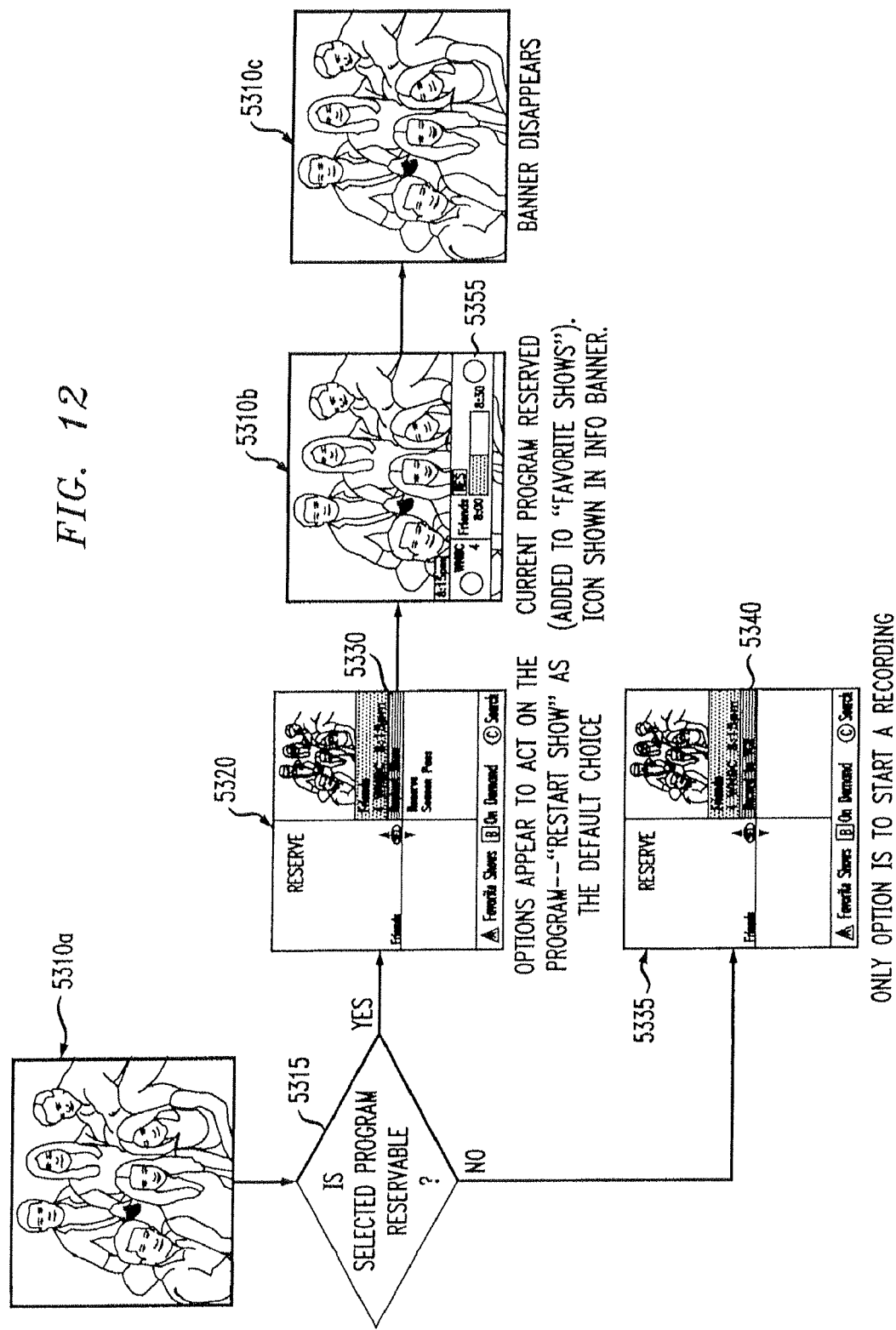
FIG. 12 illustrates screen displays in reserving a current show in accordance with the invention.
Figure 13:
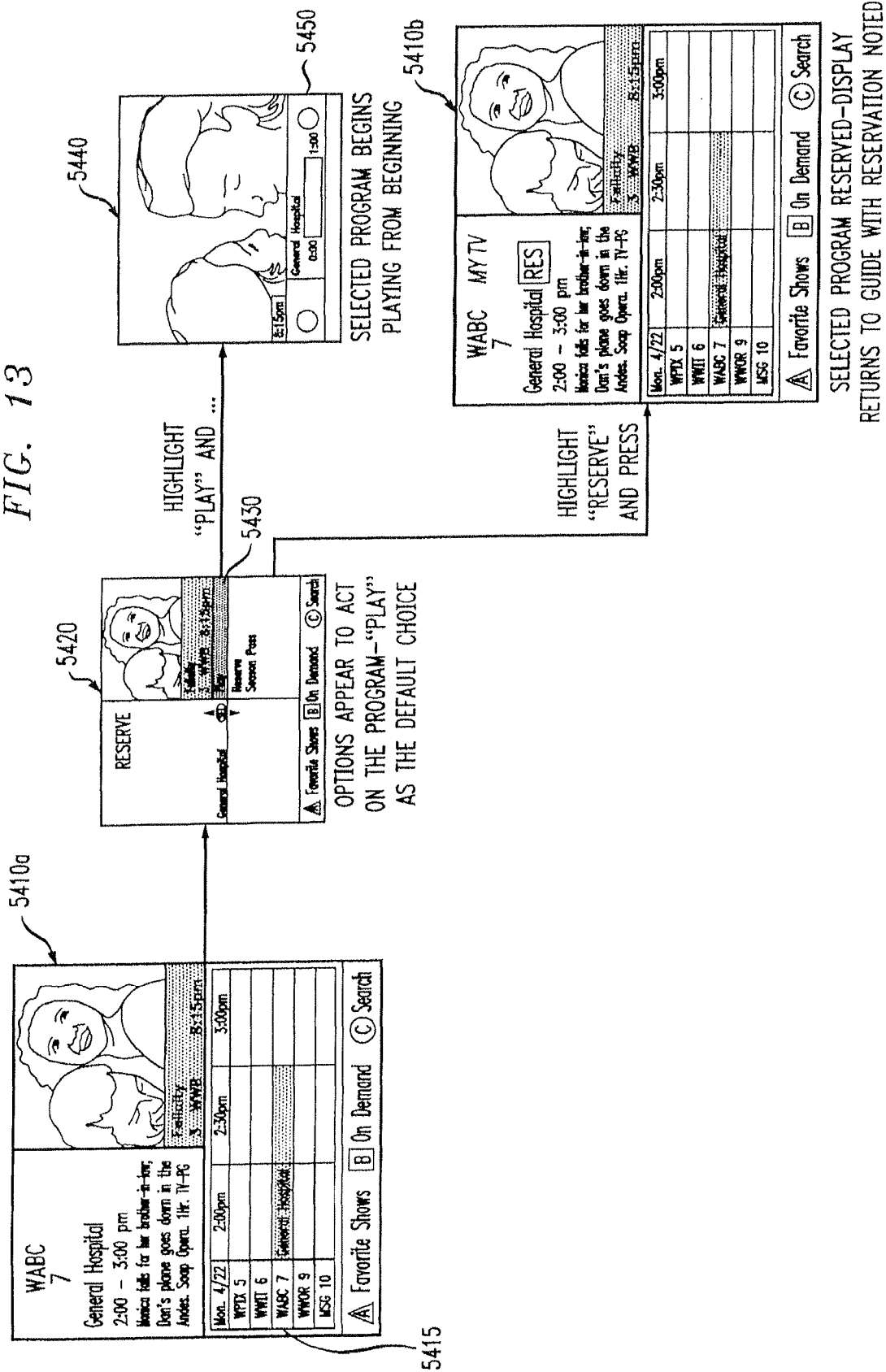
FIG. 13 illustrates screen displays in reserving a past show in accordance with the invention.
Figure 14:
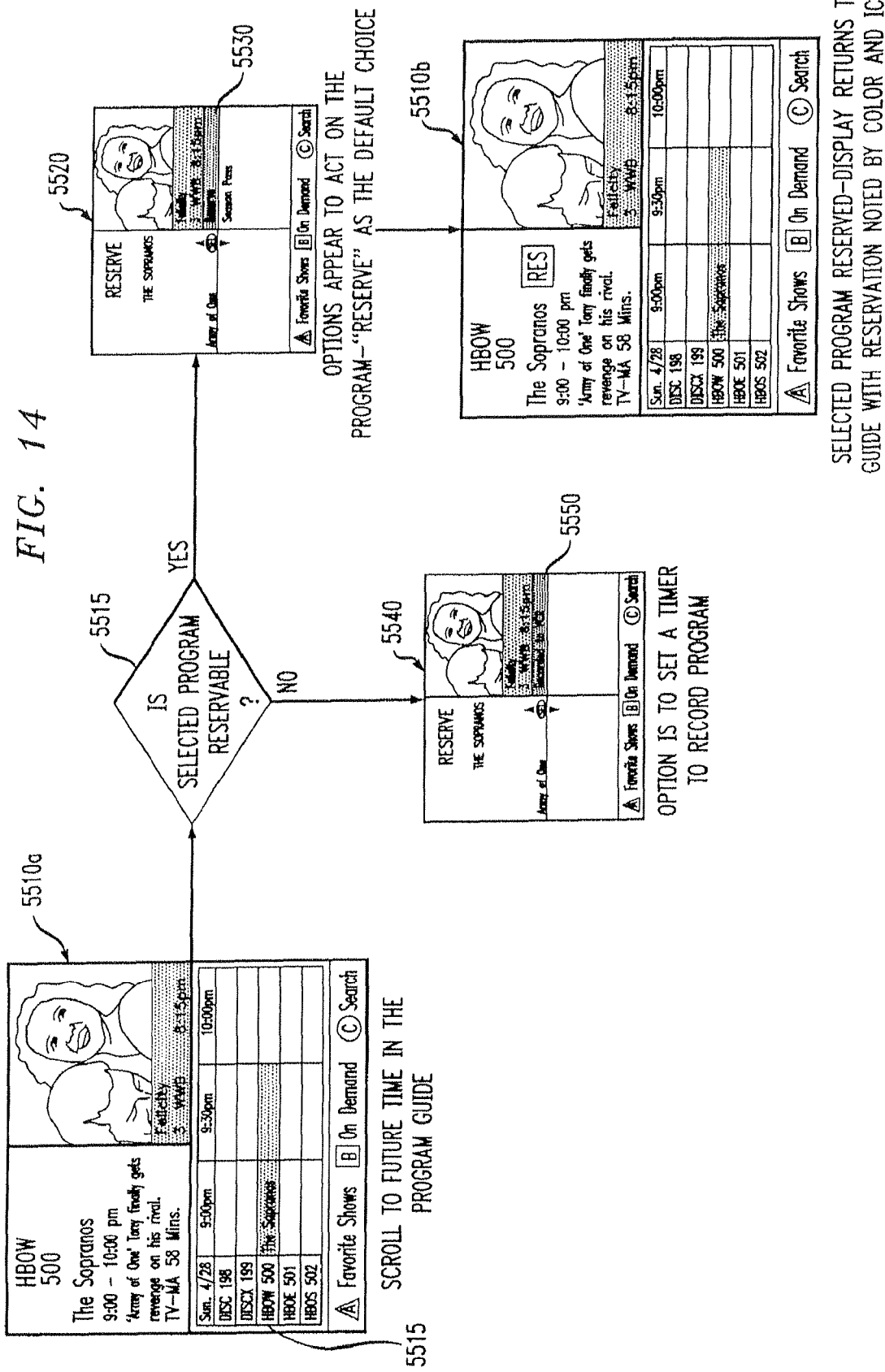
FIG. 14 illustrates screen displays in reserving a future show in accordance with the invention.

FIGS. 12-14 illustrate the options available to a user when reserving a current (FIG. 12), past (FIG. 13) and future (FIG. 14) program. Users can reserve programs that are currently being broadcast while they are watching the program or from an interactive program guide to be described. Referring to FIG. 12, if a user is watching a program that is currently being broadcast on a first channel GUI 5310a, the user may issue a reserve command by pressing record key 910 of remote control 900. When media processor 119 receives a command to reserve a selected program, processor 119 determines whether the selected program is reservable (5315). Reservable programs are those that have been recorded and stored at headend 105 for future accessability. Such programs may then be reserved after they have been broadcast. These programs may also be manipulated by the user by issuing PVR-like commands, such as rewind, fast-forward, pause, skip commercials and restart. Programs that are not predesignated for reservation are referred to as non-reservable programs.

If the selected program is non-reservable, then Reserve GUI 5335 is displayed indicating that the user has the option to record the selected program to a VCR (alternatively PVR, DVD player or other local recording device) (5340). If however, the program is deemed reservable, Reserve GUI 5320 is displayed providing the user with three Reserve options (5330): (1) restart the program, (2) reserve the program, or (3) select a season pass. The restart option enables the display of a selected program from its beginning, although the selected program is not reserved. The reserve option selects a program to be added to a user=s Favorite Show list and does not restart the show from its beginning unless a restart command is also issued by the user. The season pass feature allows a user to reserve multiple episodes of a program (as described above with reference to FIG. 11).

In an illustrative embodiment of the invention, the user receives a confirmation after making a reservation by selecting one of the reservation options. For example, if a user selects the program for reserving by pressing select key 960 of remote control 900, banner 5355 is temporarily displayed on first channel GUI 5310b. Banner display 5355 includes information relating to the program reservation, including the program that was reserved, the broadcast time (e.g., 8:00 p.m. to 8:30 p.m.), the current time and the network that broadcast the program. After banner 5355 has been displayed for a predetermined amount of time (e.g., 3 seconds), it is removed from first channel GUI 5310b and the program that the user was watching prior to initiating the reservation is displayed (5310c) without any further message.

In this illustrative embodiment, when a user is watching a live TV broadcast, the user may press record key 910 twice in quick succession (e.g., with one second of the first) to bypass the reserve options menu and automatically reserve the program. No messages (e.g., Reserve GUI or banner ad) appear and first channel display 5310a continues to show the program without interruption. In another embodiment, banner 5355 is displayed for a three seconds. In another embodiment, no display (banner or otherwise) is provided and confirmation for the reservation is only viewed by accessing the user=s Favorite Shows GUI.

Users can reserve programs that were previously broadcast (i.e., past broadcasts) by accessing and locating the desired program from the interactive program guide. Referring to FIG. 13, after accessing interactive program guide 5410a, the user scrolls through program grid 5415 to locate and highlight a reservable program that has been previously broadcast. Scrolling through the program grid is described more fully with reference to FIG. 19. If the user issues a reserve command by pressing record key 910 of remote control 900, Reserve GUI 5420 is displayed, providing the user with three Reserve options (5430): (1) play the program, (2) reserve the program, and (3) select a Season Pass.

The play option enables the display of a selected program from its beginning, although the selected program is not reserved. Referring to FIG. 13, if a user issues a command to play the selected program by pressing select key 960 of remote control 900 when the play option is highlighted, banner 5450 is temporarily displayed on first channel GUI 5440. Banner display 5450 includes information relating to the program reservation. If the reserve option is selected, the specified program is added to a user=s Favorite Show list, but is not automatically displayed to the user. Instead, the display returns to program guide 5410b. If the season pass feature is enabled, the user is then prompted to reserve multiple episodes of a program as described above with reference to FIG. 11.

Users can reserve programs that have yet to broadcast but are scheduled to be broadcast in the future (i.e., future broadcasts) by accessing and locating the desired program from the interactive program guide. Referring to FIG. 14, after accessing interactive program guide 5510a, the user may scroll through program grid 5515 to locate and highlight a program that is scheduled to broadcast in the future. When media processor 119 receives a command to reserve a selected future broadcast, processor 119 determines whether the selected program is reservable (5515).

If th selected program is non-reservable, then Reserve GUI 5540 is displayed indicating that the user only has the option to record the selected program to a VCR (5550). If, however, the user issues a command to reserve a reservable program, Reserve GUI 5520 is displayed, providing the user with two reserve options (5530): (1) reserve the program, and (2) select a season pass. The program reserve option (which is highlighted as the default choice) enables a user to select a program to be added to a user=s Favorite Show list which becomes available for viewing after the program has broadcast. Program guide 5510b is then redisplayed. It should be noted that, in a preferred embodiment, when the future program eventually becomes a current program, the program is then immediately available to the user for viewing as a current program. Further, when the program is completely broadcast, it becomes available for access by a user as a past program.

The period in which a reserved program can be viewed may be limited to a predetermined amount of time (e.g., three weeks) from the program reservation date (5030). In such instance, all users who reserve a program will have access to the program for the same amount of time (i.e., three weeks) regardless of the broadcast date, as long as the program is reserved within the available time frame. If the predetermined amount of time has not passed (5050), access to the program is maintained (5080). However, once media processor 119 determines that the program has been on reserve for the predetermined amount of time (5050), a message may be sent to the user indicating that the program will no longer be available (5060) and offering the user the opportunity to archive the reserved program (5070). Archiving a program permits a user accessibility to the program for an extended period of time (e.g., up to one or more years from broadcast) and may be for a fee. In another embodiment, the user may archive the program by downloading it to selected storage at the user=s site, e.g., on a DVD player, VCR or PVR connected to or integrated into terminal 158-1.

In accordance with another aspect of the invention, the program reservation service allows a user to reserve a program within a predetermined period after the program=s broadcast. System 100 may make a program available for reserving and viewing within a limited time (e.g., two weeks) from the broadcast date, subject to the rights negotiated with the content provider. In such an instance, the more time that transpires since a program is broadcast, the less time the user would have to view the program, assuming the program is still available to be reserved. In any event, a notice may be issued to users, notifying the users about the programs which are about to expire for reservation, e.g., 24 hours before their expiration.

Figure 15:
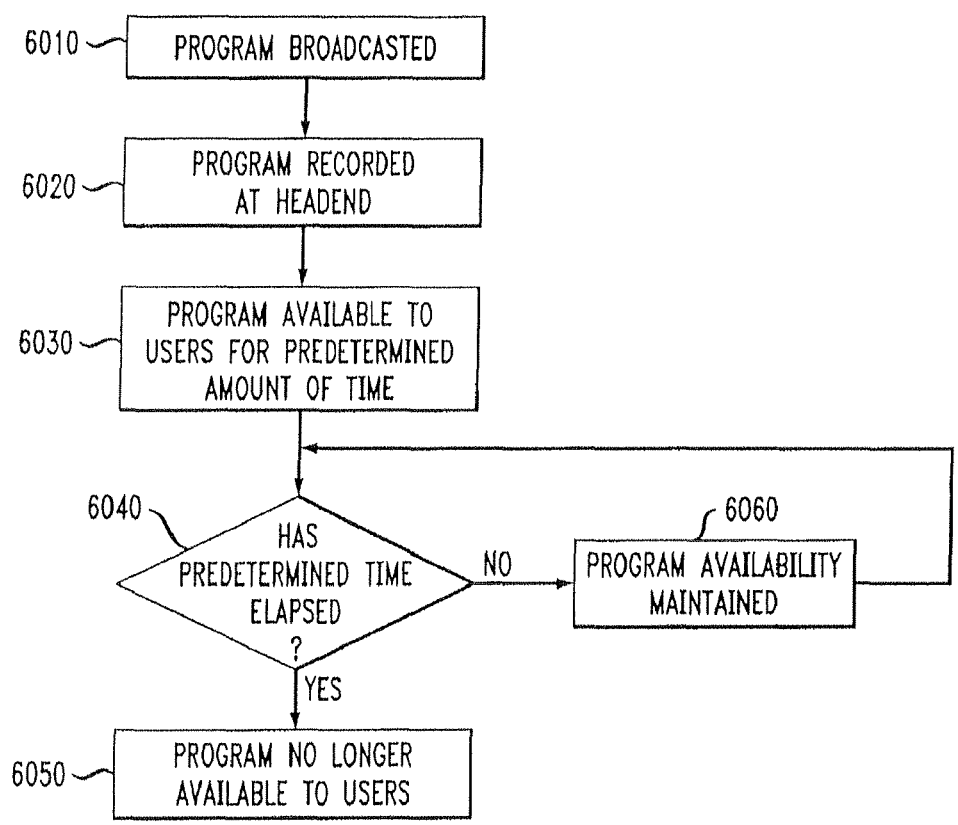
FIG. 15 is a flow chart depicting a program reservation process in a second embodiment of the invention.

Referring to FIG. 15, once a program is broadcast (6010), it is recorded at headend 105 (6020) in accordance with the invention and the program may be accessible to the user for a predetermined amount of time (6030). If the predetermined time from when the program was broadcast has yet to lapse (6040), program availability is maintained (6060). When, however, media processor 119 determines at that predetermined amount of time has lapsed, the program is no longer available to users (6050).

Once a program has been reserved, the user can access the reserved program in a manner to be described, and navigate through the program with the above-described PVR-like functions. The user may therefore play, pause, stop, fast-forward and rewind the reserved program. If the entire length of a program has been broadcast, then all of these PVR-like functions may be operational for that program. If, however, a show is in progress, the fast-forward function is operational to the extent that the show has been broadcast. In other words, the user cannot fast-forward or play the portion of the show that has not been broadcast. Nevertheless, the play, pause, stop and rewind functions are fully operational when viewing a reserved in-progress program.

Many subscription service options become realizable owing to the versatility of the inventive reservation service. For example, suppose a user does not subscribe to a subscription-based channel (i.e., a channel that requires a user to pay a fee in order to gain access, such as HBO, Showtime, etc.), but wants to reserve a certain program that is broadcast by that channel. In such instances, the user may have the option to reserve a specific program or specific episode(s) of a program at a pre-specified price. That is, even if a user is not a subscriber to HBO, a subscription service option may be effectuated in accordance with the invention to allow the user to reserve one or more episodes of a desired TV show, e.g., The Sopranos, on HBO.

FIG. 16 illustrates the inventive reservation service with one such subscription service option. When a user selects a specific program for which a reservation is desired (step 5710), a determination is made as to whether the selected program is provided by a subscription-based channel (step 5715).

If the selected program is not provided by a subscription-based channel, then the user is asked whether the user is reserving multiple episodes of the selected program (step 5725). If only the selected program is desired for reserve, then the program is reserved as described with reference to FIG. 12 if the program is a currently broadcast (i.e., in-progress) program, FIG. 13 if the program is a past program or FIG. 14 if the program is a future program. If a user desires to reserve multiple episodes of the selected program, then the program is reserved as described with reference to FIG. 11.

Returning to step 5715, if the user selects a program for reservation provided by a subscription-based channel, whether the user is a subscriber to that channel is determined (step 5735). If the user is a subscriber to the channel for which the program is selected, the subject routine proceeds to step 5725 described above. If the user is not a subscriber to the channel for which a program reservation is made, the user is provided with the following options: (1) to subscribe to that channel; (2) pay an access fee for the selected program; and (3) pay an access for all episodes of a specified program for a season (or a year).

For example, if the user agrees to become a subscriber to a channel (step 5740), the user receives a message that a subscription fee will be assessed and that the user may reserve programming provided by that channel without having to pay any additional fees (step 5745). If, however, the user wants to reserve a program provided by a subscription-based channel for which the user does not subscribe, and if the user does not want to subscribe to the channel, the user may reserve the specified program for a fee. Accordingly, the user is asked whether a reservation is being made for only one episode or more than one episodes of the selected program (step 5750). If the user indicates that only one episode of the program is to be reserved, the user is charged a program episode reservation fee (e.g., $0.99) (step 5755) and then is prompted to make the reservation as previously described with reference to FIG. 12 for a current program, FIG. 13 for a past program or FIG. 14 for a future program. Alternatively, if the user indicates that more than one episode of the selected program is to be reserved, the user is charged a season pass reservation fee (step 5760) and is then prompted to make the reservation as described by FIG. 11 for season pass reservations.

It should be noted at this juncture that a user may, instead of reserving a program at terminal 158-1 using remote control 900, a user may reserve a program at a remote location, e.g., through the Internet, a public switched telephone network (PSTN), wireless telephone network, or other communications network.

Figure 17:
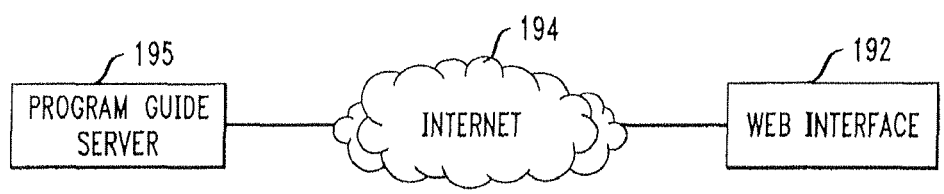
FIG. 17 illustrates a system in which a user may use a remote interface to access the system of FIG. 1 in accordance with a second embodiment of the invention.

FIG. 17 illustrates an arrangement in which a user may remotely access headend 105 to reserve a program through the Internet. For example, a user may utilize a personal computer (PC) having web interface 192 to access program guide server 195 over the Internet 194 at a predetermined uniform resource locator (URL). Program guide server 195 may be a component of headend 105.

Figure 19:
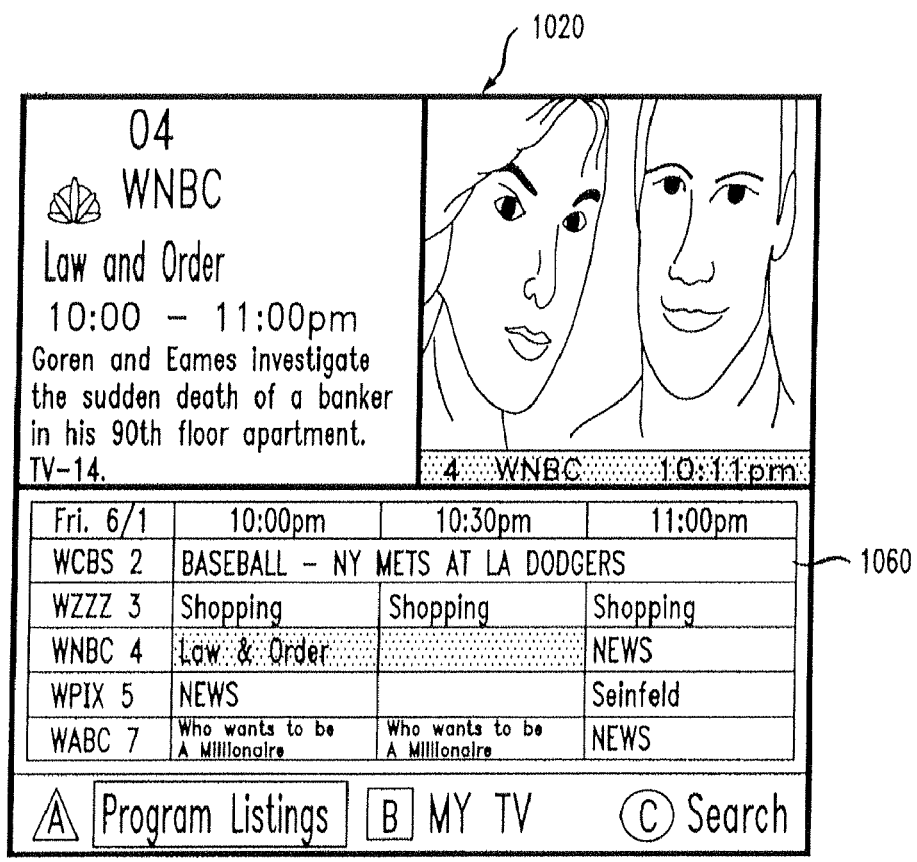
FIG. 19 illustrates a screen display for navigating through an interactive program guide in accordance with the invention.

In this illustrative arrangement, program reservation is effectuated by server 195 providing on web interface 192 an electronic program guide similar to guide 1020 in FIG. 19 to be described. Program guide server 195 is receptive to reservation commands from the user and communicates such commands to media processor 119. In an alternative arrangement, the user may utilize a telephonic device (e.g., landline or wireless) to receive voice menus from program guide server 195 through a PSTN, a wireless telephone network, etc. Such voice menus describe the program guide and facilitate the user=s selection of a program for reservation. In addition, program guide server 195 has capabilities of voice recognition or DTMF signal recognition for receipt of a user=s commands.

It should also be noted that other interactive programming and services, including My Shows, Favorites, Special Services, Customized Settings, AWhat=s Hot@, On-Demand services, searching, etc. to be described, may similarly be accessed locally using remote control 900 or remotely via a communications network.

Figure 18:
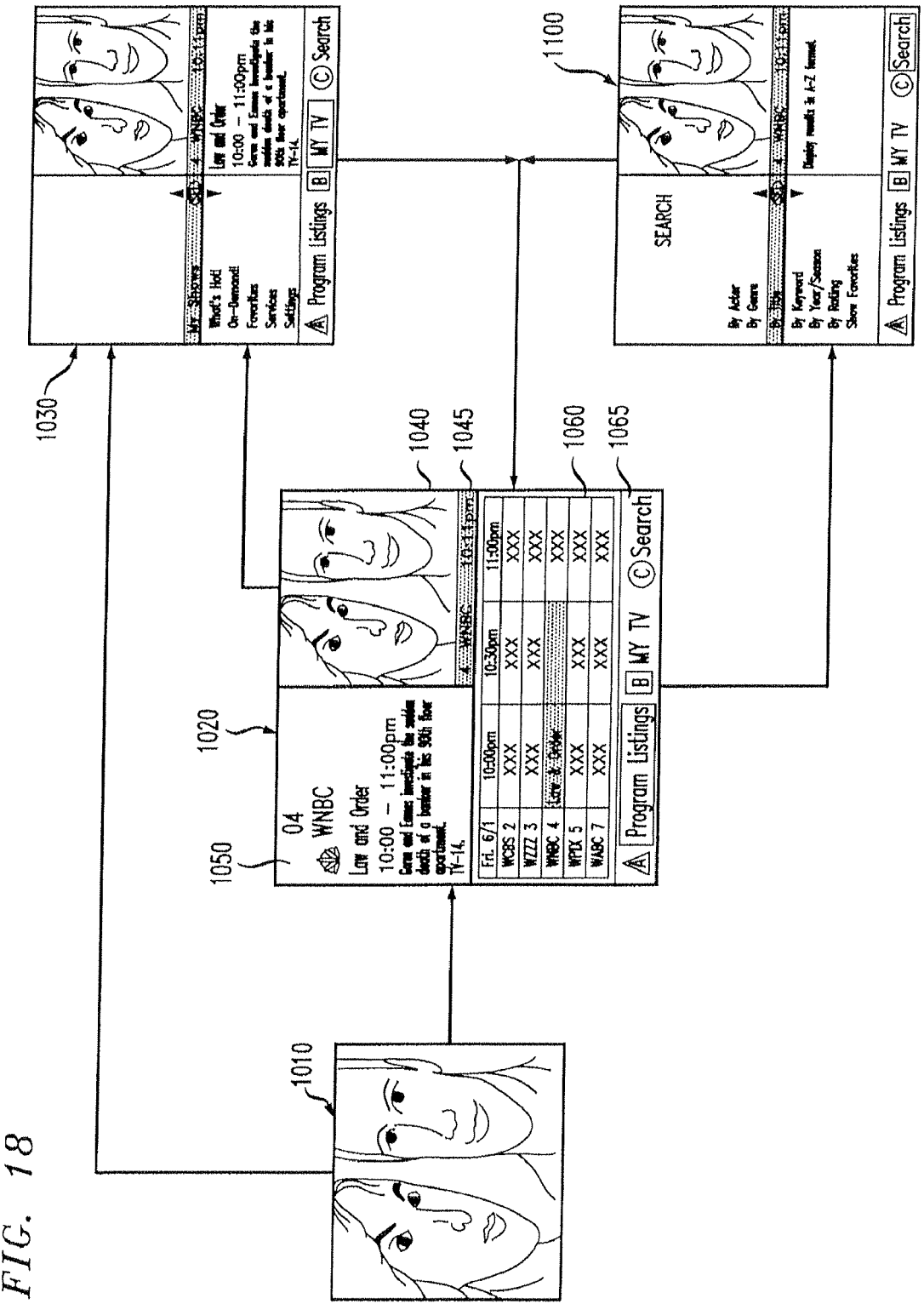
FIG. 18 illustrates screen displays in accessing Home and Search graphical user interfaces (GUIs) in accordance with the invention.

Referring to FIG. 18, by pressing guide key 920 on remote control 900 while viewing program channel display 1010 in FIG. 18 (which may be a live or played back TV show, movie, music video, service or the like), a user may access interactive program guide 1020, which includes program viewing window 1040, current time and channel indicator 1045, program description box 1050, program grid 1060 and menu display 1065. In one embodiment, menu display 1065 lists three menu choices available to the user. By pressing key 940 labeled AB,@ the available interactive services are displayed at expanded Home GUI 1030. Alternatively, by pressing key 950 labeled AC,@ the interactive search services are made available at Search GUI 1100. The user may return to the interactive program guide 1020 from either expanded Home GUI 1030 or Search GUI 1100 by pressing key 930.

The interactive program guide 1020 may be, e.g., a time/channel-based guide that provides a user with time and channel information regarding specific shows. In addition to enabling a user to view such information with respect to in-progress and upcoming programming, interactive program guide 1020 permits users to view information concerning previously broadcast programs. Such information is particularly useful to a user for reserving past programs. Accordingly, in one embodiment, interactive program guide 1020 lists all previously broadcast programs for a predetermined amount of time into the past, some but not all of which may be reserved, in accordance with the negotiated content rights. In another embodiment, interactive program guide 1020 lists only those previously broadcast programs that are available for reservation.

Referring to FIG. 19, a user may navigate through interactive program guide 1020 using remote control 900. For example, by pressing Aup arrow@ or Adown arrow@ key 985 of remote control 900 while highlighting a cell in program grid 1060, the user may scroll up or scroll down, respectively, to view programs that are available by different channels for a specific time slot. Pressing Apage up@ or Apage down@ key 987 while highlighting a cell in program grid 1060 enables scrolling up or down, respectively, through program grid, four channels at a time. In another embodiment, the number of channels that are scrolled through when page +/− key 987 is pressed may be greater or less than four rows. A user may also navigate forward and backward through time in interactive program guide 1020. By pressing Aright arrow@ or Aleft arrow@ key 985a or 985b of remote control 900, the user may navigate forward or backward through the interactive program guide 1020 in half hour increments. Navigation through interactive program guide 1020 for a selected channel may also be effectuated in one day increments by pressing Aday +/−@ key 989 of remote control 900.

In accordance with an aspect of the invention, navigating through interactive program guide 1020 enables a user to identify a show for reservation and or viewing as described above with reference to FIGS. 11-14. In one embodiment, a user can reserve content for up to a predetermined period (e.g., two weeks) in the past for past programs and up to another predetermined period (e.g., two weeks) in the future (for future programs). In another embodiment, there is no predetermined time restriction for making a reservation for future programs as long as information concerning the program is available by the content provider. When the user reaches the Aend@ of interactive program guide 1020 (i.e., the last future or past time slot for which data is available), pressing the right/left arrow keys 985a/985b or day +/− keys 989 beyond the guide=s Aend@ has no effect. The reservation is accomplished by the user=s selecting (or highlighting) a desired program shown on program guide 1020, followed by pressing Arecord@ key 910 on remote control 900.

As mentioned before, multiple programs having overlapping broadcast times may be reserved in accordance with the invention. Thus, a user may reserve the program ALaw and Order@ provided by WNBC and the baseball game provided by WCBS even though the two programs are scheduled to broadcast between 10:00 PM and 11:00 PM according to program guide 1020.

Further, additional interactive program guides may be made available to a user based on geographic location. For example, users may not be limited to only view channel and time information for programs that are broadcast to the geographic area in which the user is currently located; instead, the user may choose to view such programming information in other geographic areas (out-of-market). Such a feature (described more fully with reference to FIG. 29 may be particularly useful if the user is traveling to an area outside the user=s geographic region.

Referring briefly back to FIGS. 9 and 18, the user may return to the programming or services features by selecting AB@ key 940 or AC@ key 950 on remote control 900, respectively. The interactive programming and services offer users access to personalized programming content which can be accessed through the user interface and the functionality of such programming and services is described more fully below. Further, the interactive searching services enable a user to initiate a search for content and is also further described below.

Integrated Program Guide

A user of the inventive program reservation service, which enables the user to access selected past and future programs by way of reservation, may also have other means or services to access broadcast programs. For example, recently, set-top boxes incorporating traditional PVR functions (Aset-top PVR@ functions) were offered to the public. Thus, in this illustrative embodiment, the user may also rely on set-top terminal 158-1 which in this instance incorporates the set-top PVR functions to, among others, digitally record programs. The set-top PVR recorded programs in their entirety are stored in a hard drive, e.g., a disk, in set-top terminal 158-1 for later review by the user. Like a traditional PVR but unlike the inventive program reservation service, the set-top PVR service can only record those programs which have been identified to or by the set-top PVR service in advance of their broadcast, and whose broadcast times do not overlap. In contrast to the set-top PVR service, the inventive program reservation service is also referred to as a "network PVR (NPVR)" service.

It is desirable that the user having multiple program access services can effectively keep track of the programs which are accessible to the user at any given point in time. Accordingly, in accordance with another aspect of the invention, a user-specific integrated program guide listing accessible programs (e.g., reserved, reservable, set-top PVR recorded, etc.) depending on the services enabled for a user is made available to the user. By way of example, the user in this instance is afforded the NPVR service and the set-top PVR service. When the user presses guide key 920 on remote control 900, set-top terminal 158-1 transmits a request for an integrated program guide to program guide server 195 in headend 105. Included in the request is the IP (and/or MAC) address of terminal 158-1 associated with the user, and a list of the IDs of the assets containing programs which are set-top PVR recorded (or to be recorded) in accordance with the user=s earlier instructions. Based on the received IP (and/or MAC) address, server 195 causes identification of the program access services afforded to the user. In addition, server 195 retrieves from storage the aforementioned user record, which includes the IDs of the assets containing programs reserved by the user. Based on other data in the received request, the retrieved information and the access service information, server 195 generates the user-specific integrated program guide in question and transmits the guide to terminal 158-1 for display.

Figure 20A:
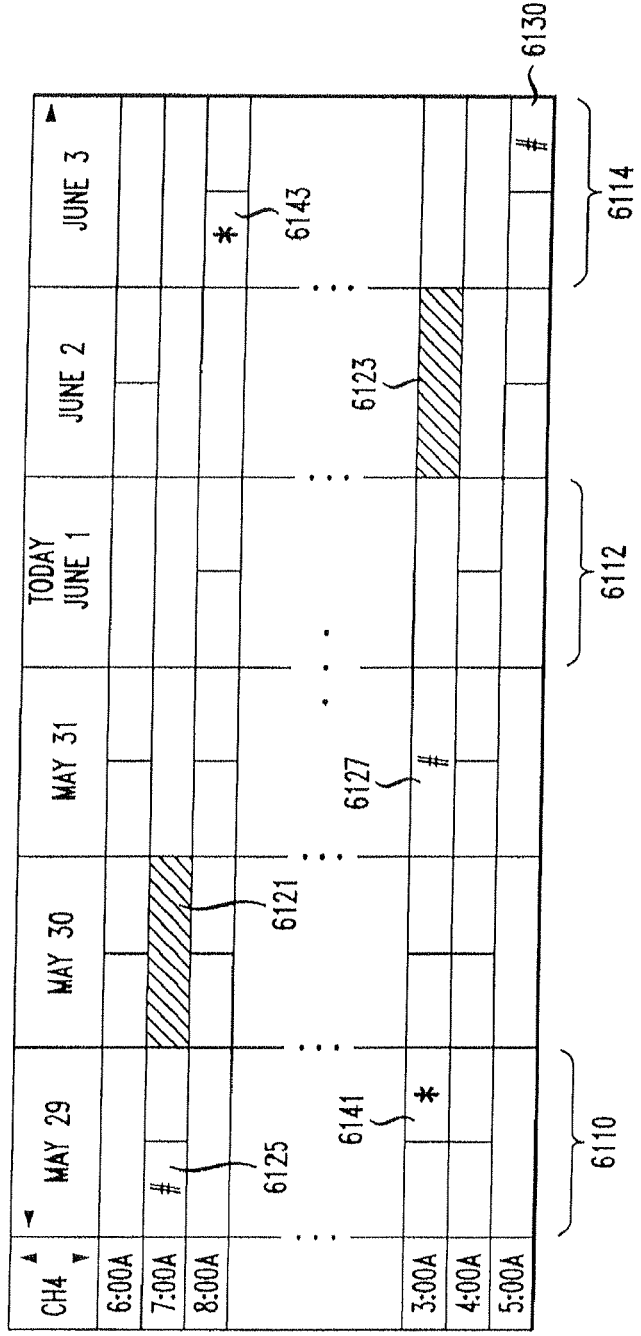
FIG. 20A illustrates an inventive integrated program guide for identifying programs accessible to a user afforded a first set of program access services.

FIG. 20A provides a view of one such integrated program guide identifying programming accessible to the specific user who is afforded both the NPVR service and set-top PVR service. FIG. 20A shows integrated program guide 6000 selected by the user to view for a particular channel, e.g., channel 4 in this instance. However, guide 6000 may be scrollable (up and down) to view listings of the accessible programming for other channels as well. Without loss of generality, the channel 4 programming for each day is listed in guide 6000 in a cell associated therewith, e.g., in this instance cell 6110 associated with May 29 which is in the past, cell 6112 associated with June 1 which is today=s date, cell 6114 associated with June 3 which is in the future, etc. It should be noted that guide 6000 may also be scrollable (left and right) to view listings of the accessible programming for other past and future dates as well, especially when the NPVR service enables the user to reserve past and future programs up to a predetermined period (e.g., two weeks) from the current day.

In this instance, all of the programs listed in guide 6000 are reservable (and thus accessible to the user) except the shaded programs, e.g. programs 6121 and 6123, perhaps due to certain limitations of the NPVR service afforded to the user. It will be appreciated that in actual implementation, the NPVR service may be provided to a user on a channel, program, time range or other basis depending on a subscription fee schedule. Thus, in this instance, the user may reserve any unshaded program listed in guide 6000 by selecting the unshaded program, and then pressing Arecord@ key 910 on remote control 900. The reserved programs in this instance are indicated by A#@ in guide 6000. Thus, in this example programs 6125, 6127 and 6130 have been reserved by the user. In addition, programs which have been requested to be set-top PVR recorded in this instance are indicated by A*@. Thus, in this example the user has requested that programs 6141 and 6143 be set-top PVR recorded. Advantageously, with guide 6000 described above, the user can readily identify, and reserve or record those desired programs for later review which have not been recorded or reserved.

In accordance with yet another aspect of the invention, for those programs which were reserved or set-top PVR recorded and which have been broadcast (e.g., programs 6125, 6127 and 6141), the user may select one such program in guide 6000 and start reviewing it by pressing a Aplay@ key on remote control 900.

Figure 20B:
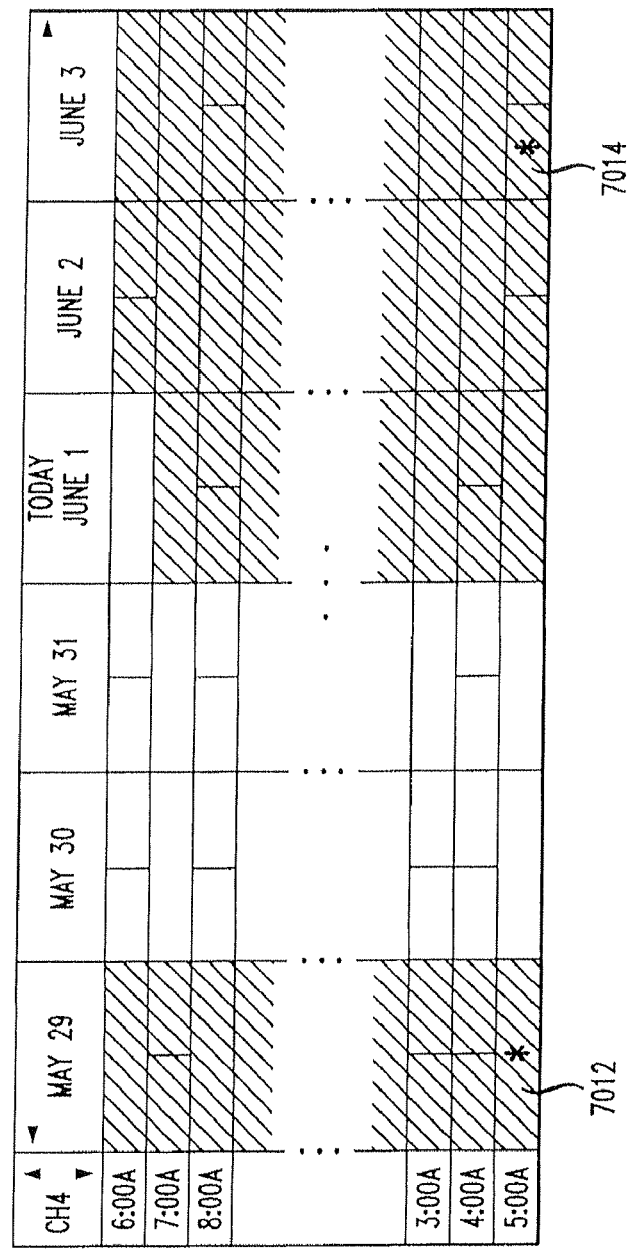
FIG. 20B illustrates an inventive integrated program guide for identifying programs accessible to a user afforded a second set of program access services.

The inventive program reservation service, i.e., NPVR service, is superior to a subscription video-on-demand (SVOD) service in that the SVOD service only allows a user to access programming that was broadcast. For example, an SVOD service may be configured to allow access to selected programming that was broadcast within the last few days (e.g., 2 days). FIG. 20B illustrates integrated program guide 7000 identifying programming accessible to a user who is afforded such an SVOD service and set-top PVR service only. In contrast to guide 6000, guide 7000 has all future programs (i.e. programs after the current time (e.g., 7:00 am) which have not been broadcast) shaded and made inaccessible to the user due to the limitations of the SVOD service. In addition, all of the programs broadcast three or more days ago (i.e., before May 30) are shaded in guide 7000, and thus made inaccessible to the user, again due to the limitations of the SVOD service. However, those desired programs which are not accessible using the SVOD service may be requested to be set-top PVR recorded in advance of their broadcast times, e.g., programs 7012 and 7014.

It should be noted at this point that program guides 6000 and 7000 are shown in a table format for illustrative purposes only. It will be appreciated that one skilled in the art would be able to devise other formats to identify, to a user, those programs which are available for reservation or recording, those which have been reserved, those which have been recorded or requested to be recorded, etc. For example, referring to FIG. 20C, a user may be provided with, instead of guide 6000, three program lists jointly conveying similar information to guide 6000. As shown in FIG. 20C, a first program list, denoted 8001, identifying those programs which are available for reservation using the NPVR service and recording using the set-top PVR service. A second program list, denoted 8003, identifying those programs which have been reserved using the NPVR service. Thus, program list 8003 in this instance includes identifiers of aforementioned programs 6125, 6127 and 6130. An identifier of a program here may comprise the title of the program, its broadcast time, the program channel on which the program is broadcast, etc. A third program list, denoted 8005, identifying those programs which have been recorded or requested to be recorded using the set-top PVR service. Thus, program list 8005 in this instance includes identifiers of aforementioned programs 6141 and 6143. The program identifiers in each of lists 8001, 8003 and 8005 may be organized according to the program channels they are on, their broadcast times, alphabetical order of their titles, their program types, etc., or a combination thereof. In fact, the user in this instance is afforded the capability of reorganizing the program identifiers in each list in whatever order preferred by the user.

In addition, the user in this instance is afforded the capability of traversing each list to select or deselect individual programs identified therein. For example, the user may select one or more programs in list 8001 to reserve the same. The identifiers of the reserved programs are then moved from list 8001 to list 8003. Conversely, the user may deselect programs in list 8003 to obliterate their reserved status. The identifiers of the deselected programs, available for reservation, may then be moved to list 8001. Moreover, for those programs which were reserved (in list 8003) or set-top PVR recorded (in list 8005) and which have been broadcast (e.g., programs 6125, 6127 and 6141 marked by "^"), the user may select one such program in the list and start reviewing it by pressing a Aplay@ key on remote control 900.

My Shows

A My Shows GUI provides a user with a list of available programs that have been reserved by the user. In the case where multiple users in a household are served by a set-top terminal, each user may utilize the My Shows GUI to create his/her own list of reserved programs. Referring to FIG. 21, when a user reserves a program, the reserved program are listed in the AMy Shows@ GUI (e.g., 1100A, 1100C) accessible from Home GUI 1030. In one embodiment, the My Shows GUI enables a user to find, sort and manage programs, including reserved programs (i.e., programs that have already been reserved and are currently available for viewing), upcoming programs (i.e., programs that are scheduled to be reserved but have yet to be broadcast) and recommended programs (i.e., programs that the system reserves automatically based on user profile).

While viewing channel display 1010 in FIG. 21, a user may access Home GUI 1030 by pressing guide key 920 and then AB@ key 940 of remote control 900. At Home GUI 1030, a user at terminal 158-1 is prompted to select one of the programming features listed in menu 1110. By selecting My Shows feature 1120 in menu 1110, a user is able to access My Shows GUI exhibiting the programs that have been reserved. In one embodiment, this may be accomplished by pressing select key 960 of remote control 900 when My Shows feature 1120 is highlighted in Home GUI 1030.

In one embodiment, when My Shows feature 1120 is selected and fewer than a predetermined number programs (e.g., seven programs) have been reserved by a user, all of the reserved shows are immediately listed in My Shows GUI 1100A. If, however, more than a predetermined number of programs have been reserved, the user=s shows may be organized by categories. For example, My Shows GUI 1100B lists several categories to assist a user in locating a program through the My Shows feature. Some of these categories may be temporal in nature; that is, a user=s reserved programs may be categorized by those programs that are in-progress (i.e., currently broadcast), upcoming (i.e., to be broadcast in the future) or by the reservation date of the program. In one embodiment of the invention, programs that are categorized by reservation date are listed in chronological order beginning with shows that have been most recently reserved (1100C) or in reverse chronological order.

Other categories of program listings are available. For example, programs in the My Shows list may be organized by title, which is an alphabetical listing of reserved programs by program title. Programs may also be organized by genre such that reserved programs are listed by program content type such as comedy, drama, action, sports and the like. Further, a user may access a list of reserved shows that are set to expire within a few days (i.e., expiring soon programs).

As users scroll through programs listed in My Shows GUI 1100A, 1100C, the following information may be shown for the highlighted show: program title, short description of the program, channel name (including call letters), channel number, broadcast date for past reserved programs, broadcast time for current and future reserved programs, rating (such as G, PG-13 and R), and the program running time.

After viewing the listed programs in My Shows GUI 1100A, 1100C, the user can select current and past programs for viewing, designating it as a AFavorite@ as described with reference to FIG. 23 below, find similar programs, archive program to a tape, DVD, etc., or designate programs for their deletion. Further, future programs that have been reserved may also be designated as a Favorite, selected for finding similar programs, archived to a tape or designated for their deletion.

On-Demand

An On-Demand GUI provides a user with an interactive capability to reserve and play movies, premium TV programming as well as certain news and other television programming without a time parameter since such movies and programming is available on-demand. Once broadcasting of a program or movie has begun, the user can watch the content as it is being broadcast for the first time or at any time thereafter as long as it is still available (i.e., has yet to expire), subject to the rights negotiated with the content provider.

FIG. 22 illustrates accessing the On-Demand feature through the user interface. From viewing a first channel GUI 1010, a user may access home GUI 1030 by pressing guide key 920 and then AB@ key 940 of remote control 900. At home GUI 1030, a user is then prompted by terminal 158-1 to select one of the programming features listed in menu 1110. By selecting On-Demand feature 1610, a user is presented with choices of premium movie channels (such as HBO, Showtime, Star/Encore and the like), a menu item labeled AMovies,@ specialized channels (such as music, music videos, weather, and the like) and AFree@ channels (such as CNN, A&E, and the like). Viewers can then select an On-Demand channel from the listed premium movie channels, AMovies@ channel, specialized channels or free channels.

Free channels require no purchase by the user, whereas premium movie channels and individual Movies typically do require a purchase by the user. Although premium movie channels require a purchase beyond the basic cable service fee, the fees associated with these channels are paid in advanced through a subscription service. When a purchase of an individual movie is required, however, the user is prompted on the screen to input certain data (such as a personal identification number) to effectuate the purchase of the program. With respect to the specialized channels, some of these channels may require a subscription service purchase, some may require a specific program purchase and others may not require any purchase.

In one embodiment of the invention, on-demand programs may be accessed by a user at terminal 158-1 by choosing among different categories. For example, on-demand programs may be listed in the premium TV category for programs that have been or will be broadcast by a premium TV provider (such providers include HBO, Showtime, etc.). Programs listed in the premium TV category may be further categorized by programs that are in progress, by genre or by channel. Programs listed by channel includes, in one embodiment, an alphabetical listing of programs for each channel available to a user. Further, On-Demand movies may be listed in a movies category and may be listed alphabetically, by actor or by genre. In addition to movies, TV series and news programs may also be reserved by a user on demand. Thus, the On-Demand feature enables a user to select programs for display that is convenient to the user=s schedule, instead of a time that is designated by the content provider.

Illustratively, once a movie or program has been selected by the user, a screen is displayed describing specific features of the movie or program selected. For example, when a movie is selected on demand for possible purchase, information concerning the selected program may be displayed, including: the movie=s title, a description of the movie, the movie rating, running time and the like. Additional information about the movie may be accessed by pressing info key 990 of remote control 900. This additional information may include, a more detailed description of the selected movie, a listing and description of the actors in the movie and a video preview of the movie.

Similar to a reserved program, once an On-Demand program has been ordered, the user can navigate through the program in a manner similar to watching a movie on a PVR. The user may therefore be able to play, pause, stop, fast forward and rewind the reserved program.

In one embodiment, access to a program may be terminated upon reaching one of the following scenarios. If, for example, an entire program is played and not as a result of the fast-forward key, media processor 119 may determine that the program is complete and access to the program is terminated. At this point, the user may be prompted to request an additional program on demand. Access to a program may also be terminated if media processor 119 determines that a predetermined time interval (expiration period) has been met. Typically, a reminder is displayed on the user=s screen notifying the user that the time to view a program will be terminated at a specified time in advance of such expiration.

Favorites

In this illustrative embodiment, a user (or each of multiple users in a household as the case may be) may establish one or more personal profiles that enable users to sort content and channels by the user=s personal content preferences. For example, users can define their favorite programs in profiles which are comprised of lists of criteria for sorting program content. Through the user interface, users can then search program data for content that matches the criteria in a user=s profile and return the results to the user=s lists of Favorite programs. Profiles may be defined by one or more criteria, including actor, program category (TV show, movie, etc.), director, genre, keyword, title or the like.

Figure 23:
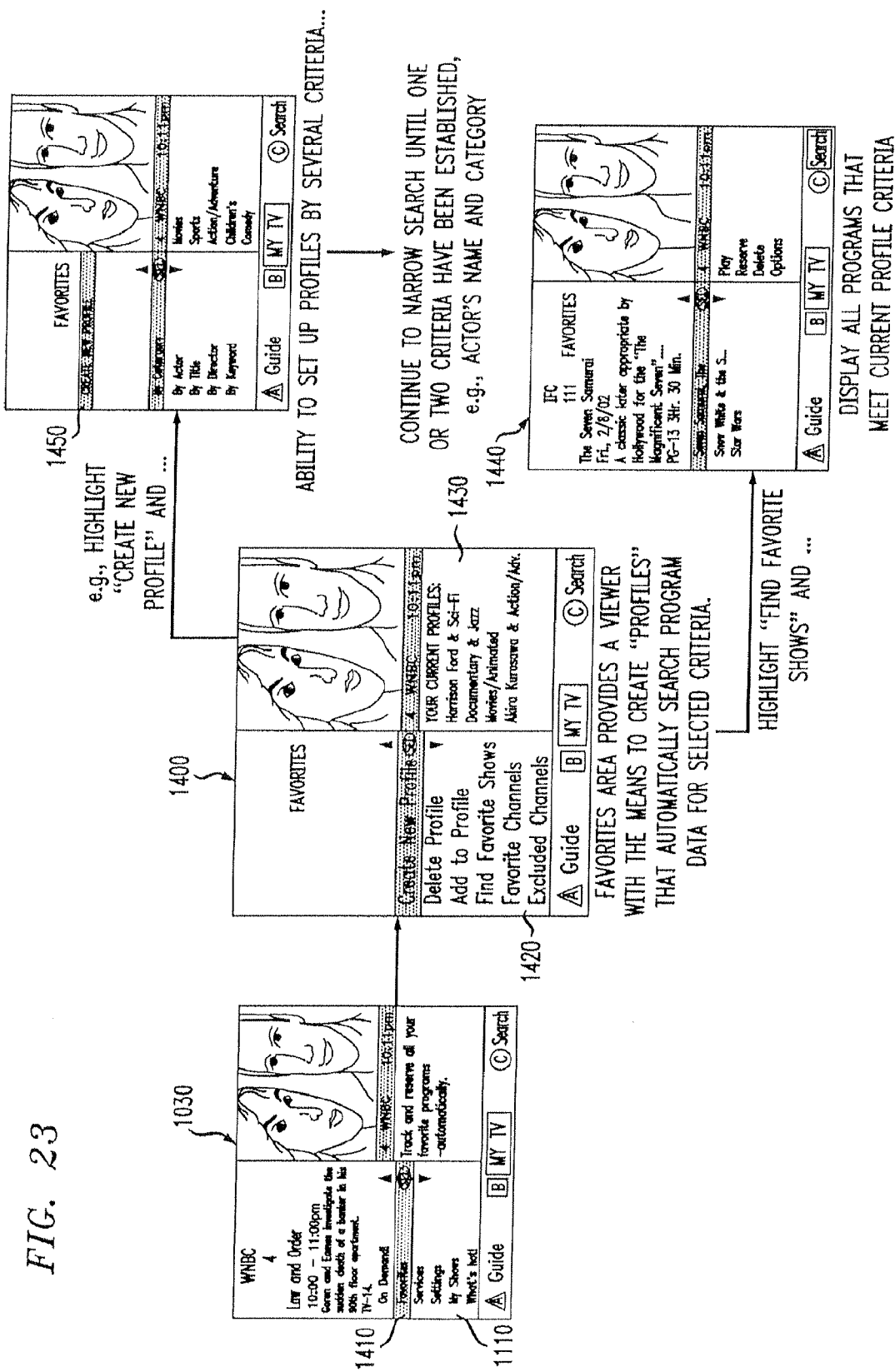
FIG. 23 illustrates screen displays in setting up a profile in a Favorites GUI in accordance with the invention.

Access to the Favorites features according to one embodiment is shown in FIG. 23. By accessing Home GUI 1030, a user is prompted to select one of the programming features listed in menu 1110. By selecting Favorites feature 1410 of menu 1110, the user accesses Favorites submenu 1420 on Favorites GUI 1400 which offers several choices concerning the Favorites feature. For example, in this instance the user can choose from: creating a new profile, deleting an existing profile, adding parameters to an existing profile, finding favorite channels or shows and excluding channels.

If the user wants to find a program that meets the parameters of the user=s existing Favorites profile, the AFind Favorite Shows@ feature is selected from the Favorites submenu 1420, and a listing of all of the programs that meet such criteria is displayed (1440). The user can then reserve, play or delete a program from the displayed Favorites list. Other options are available and are described below.

Figure 24:
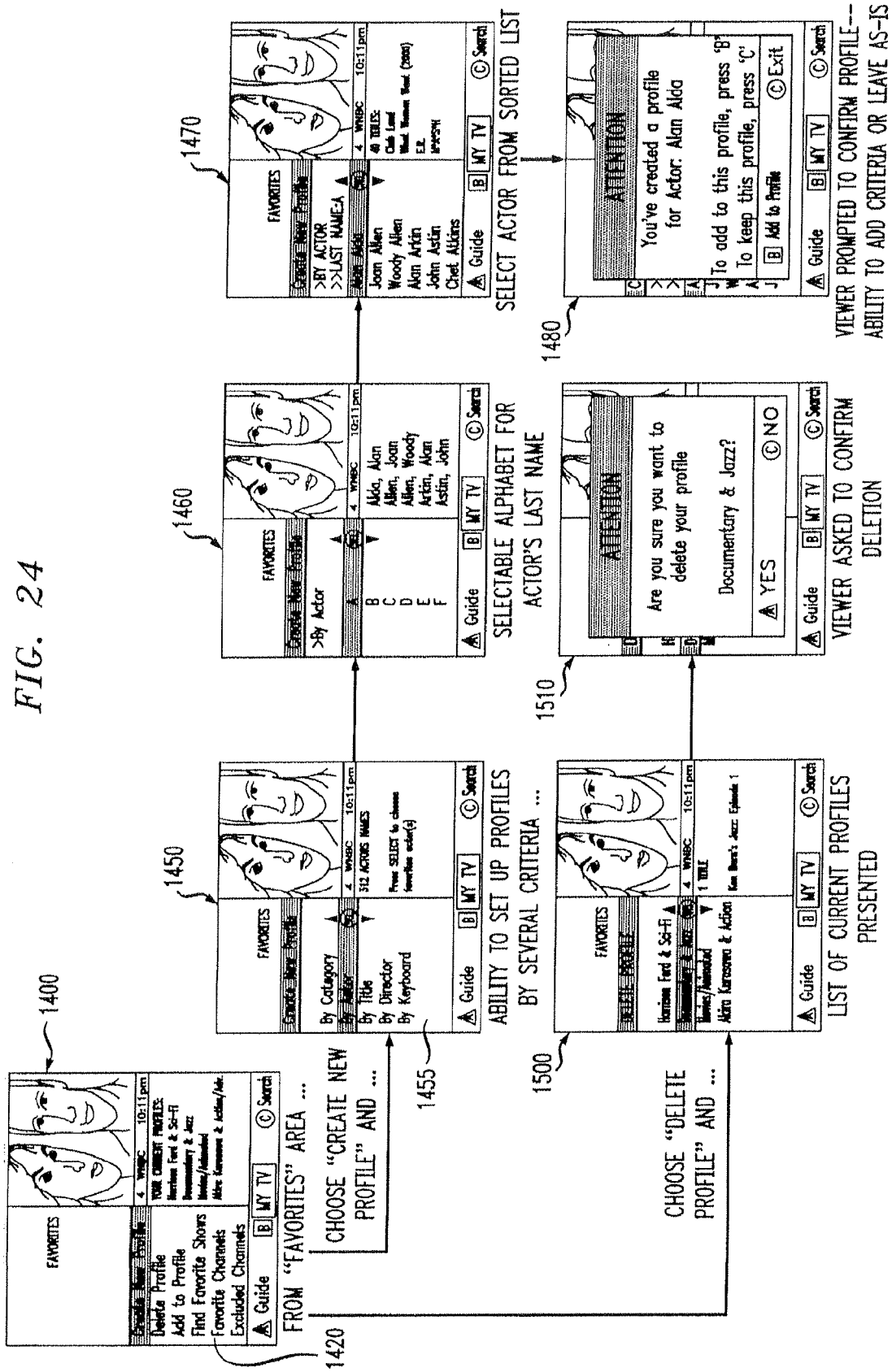
FIG. 24 illustrates screen displays in changing and deleting profiles in the Favorites GUI in accordance with the invention.

Referring to FIG. 24, a user may create a new profile by using select key 960 of remote control 900 to select the ACreate New Profile@ link from Favorites submenu 1420 to display search parameters from which a user may choose (1450). These parameters may include programming category, actor(s) name, program title, director, keyword and the like. FIG. 24 illustrates the method of creating and deleting a favorites profile in accordance with one aspect of the invention. Once the ACreate New profile@ display is accessed (1450) from the favorites GUI (1400), the user is prompted to set up a profile by selecting from several criteria (1455). If, for example, the criteria chosen is ABy Actor,@ the user is prompted to select an actor for allocation to its Favorites profile. In one embodiment, the names are listed in alphabetical order (1460). Once the desired actor is selected, a list of programs that includes the selected actor is displayed and the total number of program titles meeting such profile is also included (1470). The user is then asked to decide whether the profile should be added to an already existing profile (by pressing AB@ key 940 of remote control 900) or whether the criteria selection should be saved as a new profile (by pressing AC@ key 950 of remote control 900). In one embodiment, a user may have multiple profiles. For example, a user may wish to have one profile on the weekends and another during the week. Similarly, a user may create a profile which provides a user access to all available programming on a certain topic. For example a profile relating to cooking may include in-progress broadcasts, past broadcasts and out-of-market cooking programs. In such circumstances, the user may associate a descriptive name to the profile (such as AWeekend Programs@, AMy Cooking Stations@, etc.) and access each of the multiple profiles at different times.

A user may also choose to delete a profile. This is accomplished by using select key 960 of remote control 900 to select the ADelete Profile@ link from favorites submenu 1420 and thereby displaying the profiles already created and saved by a user (1500). After the user makes a confirmation (1510), the profile is then deleted from the user=s list of profiles.

The AFavorites@ menu also enables a user to AFind Favorite Shows@ which, when this option is selected, terminal 158-1 displays all programs that meet the current profile criteria for all profiles. Once a user has defined at least one profile, the user can, through the user interface, automatically search program data and then view all programs that match any profiles in the user=s Favorite Shows (1440). To view a program, the user selects Favorite Shows (1440), selects a show in the list and then terminal 158-1 presents to the user the playback options.

A user can also designate AFavorite Channels@ which are channels that are often watched by a user. A channel may be designated as a AFavorite Channel@ by selecting AFavorite Channels@ from the Favorites menu 1420 or by pressing FAV key 980 of remote control 900. Once a user has defined one or more Favorite channels, the user can toggle interactive program guide 1020 to display only Favorite channels and re-toggle back to the full list of channels. Channels can further be managed by defining a list of Excluded Channels from Favorites menu 1420. These channels are then skipped when a user channels up or down.

Lookback Feature

A user can also reserve, play or re-start, programming content that has broadcast during a predetermined period in the past by accessing a "Lookback" feature in accordance with the invention. The Lookback feature enables access to programming content that has broadcast during a "Lookback Period"—i.e., up to the predetermined period. The actual length of the period is subject to the negotiated rights to the programming content.

In one embodiment, the Lookback feature enables a user to re-start a program that is currently being broadcast. The Lookback feature also enables a user to play a program that was previously broadcast within the Lookback Period (e.g., the previous two days). In addition, the Lookback feature enables a user to reserve a program in its entirety that is presently being broadcast or a program that was previously broadcast within the Lookback Period for subsequent viewing or archiving.

Programs that are available through the Lookback feature may be accessed for viewing or reserving in several ways. For example, a Lookback menu may be accessed when viewing content on a channel which, in effect, gives that channel an on-demand-like feature. Thus, by accessing a Lookback menu, the viewer is presented with a categorical listing of all programs that are available for either (1) immediate viewing, or (2) reservation for subsequent viewing. Therefore, the Lookback feature provides a user with the ability to play or reserve previously (or currently) broadcast programs, but does not require the user to denote such programs in advance as a favorite, or to otherwise proactively elect to reserve the program.

Programs that are available through the Lookback feature may be accessed by a listing that is organized by channel, by reverse chronological (or chronological order), by theme (movies, sports, drama, etc.) or by an alphabetical listing. For example, referring to FIG. 19, a user can access interactive program guide 1020 and scroll through program grid 1060. In addition to scrolling up or down to view programming available on different channels, the user may scroll backwards by pressing left arrow key 985*b* of remote control 900 to view past programs that may be accessed. In another embodiment of the invention, currently broadcast programs and previously broadcast programs that are available for accessing during the Lookback period are identified in program grid 1060, and programs that are unavailable may be so designated therein.

Figure 25:
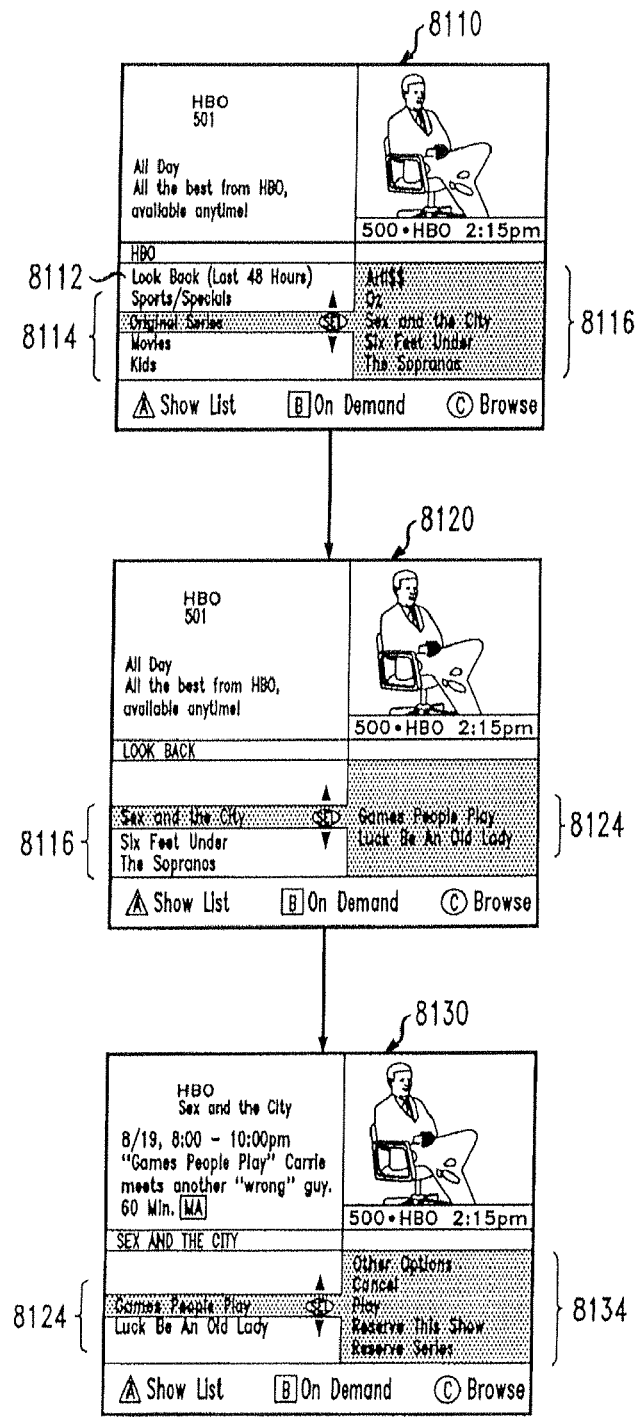
FIG. 25 illustrates screen displays in accessing a Lookback GUI in accordance with a first embodiment of the invention.

In addition, the Lookback feature may be made available while a user is viewing a program on certain broadcast channels. For example, turning to FIG. 25, while a user is viewing a program on an HBO channel, Lookback feature option 8112 is offered on GUI 8110 after the user presses menu key 970 on remote control 900. In accordance with another aspect of the invention, a selection of option 8112 in this instance allows the user to access past programs broadcast on the same channel (i.e., the HBO channel being viewed by the user) within the Lookback Period. Specifically, by highlighting the Lookback feature option 8112 and pressing select key 960 on remote control 900, a list of programming categories, denoted 8114 are displayed under selected Lookback feature option 8112. These categories may include sports programming, specials, original series, movies, kids programming. By highlighting a program category from list 8114, another list of available programs, denoted 8116, is displayed on GUI 8110.

Upon selecting a program category by pressing select key 960 of remote control 900, Lookback Programming GUI 8120 lists programs 8116 that are available on the displayed on-demand channel for the program category that was selected. In accordance with an illustrative embodiment of the invention, these programs 8116 are listed on the left side of GUI 8120. As the user highlights a listed program, episodes 8124 that are available through the Lookback feature are listed on the right side of GUI 8120.

Upon selecting a program by pressing select key 960 of remote control 900, Lookback Episode GUI 8130 lists episodes 8124 that are available on the displayed On-Demand channel for the program that was selected. In this illustrative embodiment, these episodes 8132 are listed on the left side of Lookback GUI 8130. As the user highlights a listed episode, the reservation/play options 8134 that are available through the Lookback feature are listed on the right side of GUI 8130. These features may include, for example, canceling the Lookback feature request, playing the selected episode, reserving the selected episode and reserving the entire series (i.e., season pass).

Figure 26:
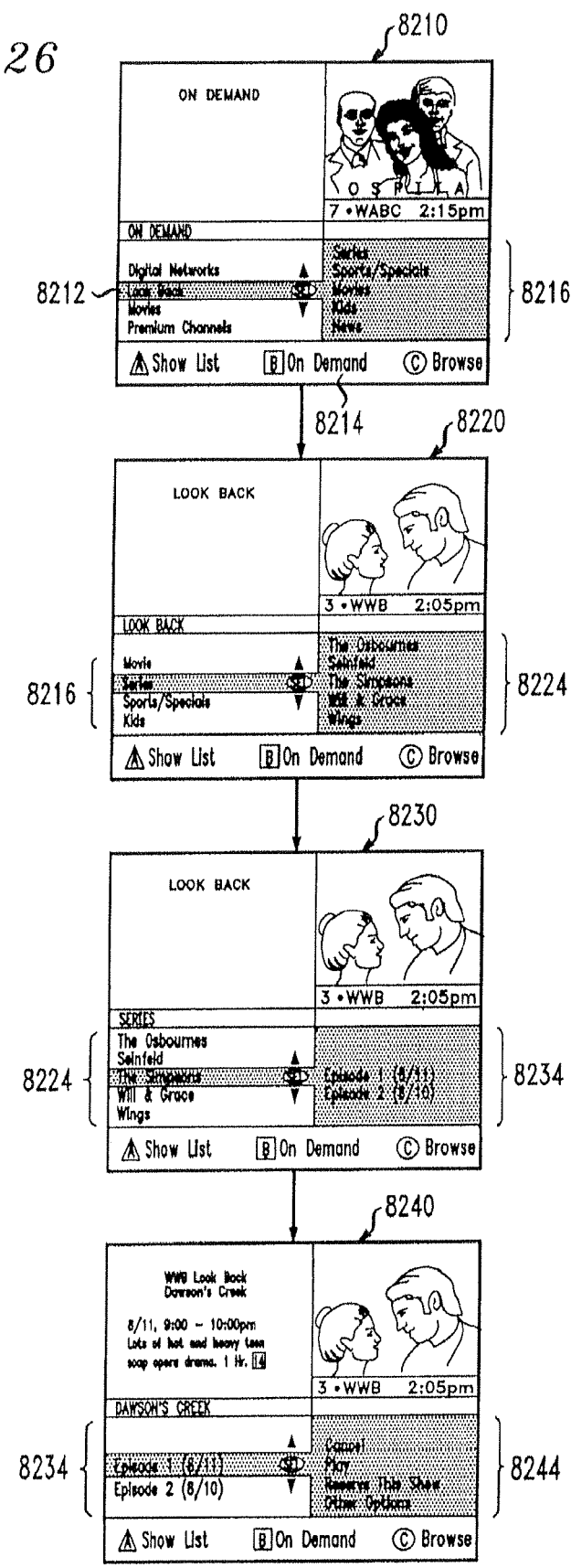
FIG. 26 illustrates screen displays in accessing a Lookback GUI in accordance with a second embodiment of the invention.

In another embodiment, a Global Lookback feature is also available. Global Lookback enables a user to access a program previously broadcast even if the user does not know on which channel it was broadcast. As illustrated in FIG. 26, the Global Lookback feature displays programs from one or more databases of all channels providing Lookback-enabled access during a given Lookback period (e.g., two days into the past). For example, Lookback option 8212 is displayed upon accessing On-Demand option 8214 of GUI 8110. By highlighting Lookback option 8212, a list of categories of available Lookback programs, denoted 8216, is displayed on the right side of GUI 8210. These categories include, e.g., TV show series, sports programming, specials, movies, kids programming and news.

Upon selecting Lookback option 8212 by pressing select key 960 on remote control 900, Lookback Program Categories GUI 8220 is displayed. In accordance with an embodiment of the invention, the available program categories 8216 are now listed on the left side of GUI 8220. By highlighting a listed program category, a list of available programs, denoted 8224, is displayed on the right side of GUI 8220.

Upon selecting a program category by pressing select key 960 of remote control 900, Lookback Programming GUI 8230 lists the programs 8224 that are available for the program category that was selected. In this illustrative embodiment, these programs 8224 are listed on the left side of GUI 8230. As the user highlights a listed program, episodes 8234 that are available through the Lookback feature are listed on the right side of GUI 8230.

Upon selecting a program by pressing select key 960 of remote control 900, Lookback Episode GUI 8240 lists, on the left side of GUI 8240, episodes 8234 that are available on the displayed On-Demand channel for the program that was selected. As the user highlights a listed episode, the reservation/play options 8244 that are available through the Lookback feature are listed on the right side of GUI 8240. These features may include, for example, canceling the Lookback feature request, playing the selected episode, reserving the selected episode, etc.

Figure 27:
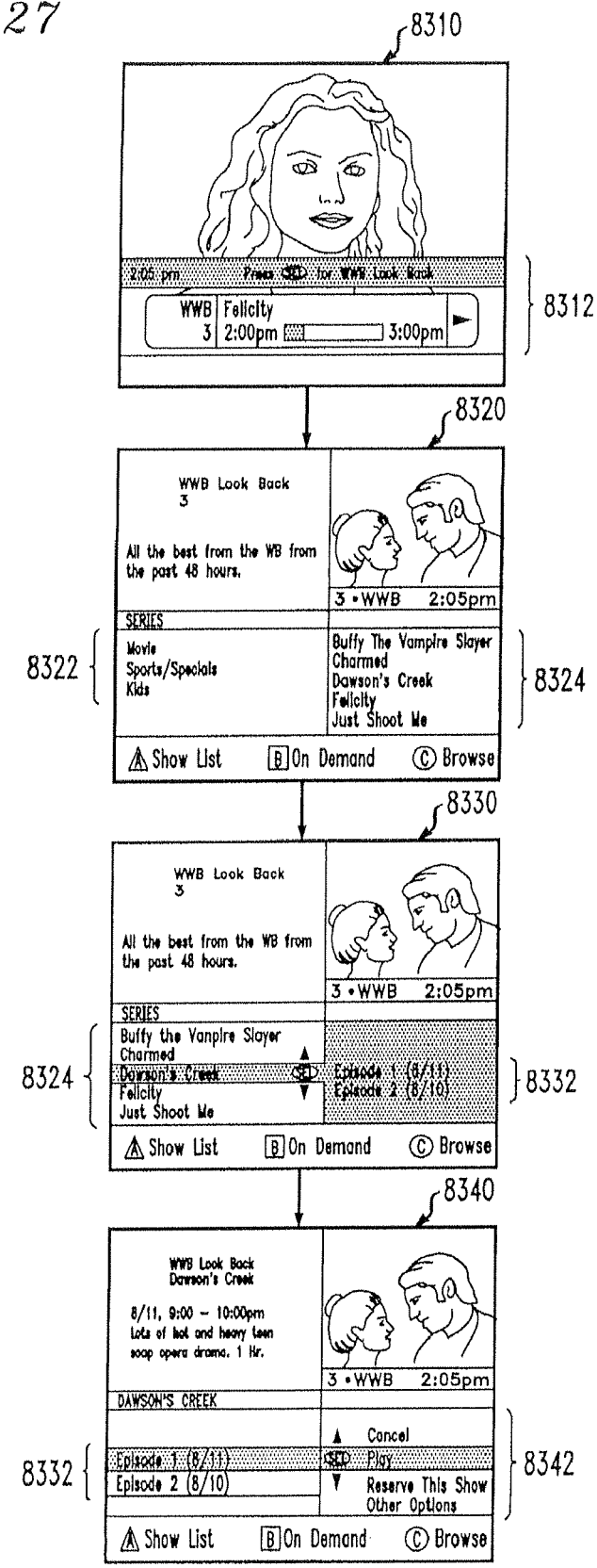
FIG. 27 illustrates screen displays in accessing a Lookback GUI in accordance with a third embodiment of the invention.

In yet another embodiment, the Lookback feature is also available through an information banner, from which a show within the Lookback period could be selected for playing or reservation. Referring to FIG. 27, information banner 8332, illustratively in the form of a rectangular bar, contains information about a program that is being viewed by a user. The information banner is displayed, e.g., when the user tunes to a channel or when a user presses info key 990 of remote control 900. The information includes the present time, the broadcast time (beginning and ending times), the channel on which the program is broadcast, etc. As indicated by GUI 8310, also provided by banner 8332 is a message indicating the availability of the Lookback feature for programming offered by the currently viewed channel.

By pressing select key 960 of remote control 900, Lookback (program categories) GUI 8320 is displayed. In accordance with an embodiment of the invention, the available program categories, denoted 8322, are listed on the left side of GUI 8320. By highlighting a listed program category, a list of available programs for such category, denoted 8324, is displayed on the right side of GUI 8320.

Upon selecting a program category by pressing select key 960 of remote control 900, Lookback Programming GUI 8330 lists programs 8324 that are available for the program category that was selected. In this illustrative embodiment, these programs 8324 are listed on the left side of GUI 8330. As the user highlights a listed program, episodes 8332 that are available through the Lookback feature are listed on the right side of GUI 8330.

Upon selecting a program by pressing select key 960 of remote control 900, Lookback Episode GUI 8340 lists, on the left side of GUI 8340, episodes 8332 that are available for the selected program. As the user highlights a listed episode, reservation/play options 8344 that are available through the Lookback feature are listed on the right side of GUI 8340. These features may include, for example, canceling the Lookback feature request, playing the selected episode, reserving the selected episode, etc.

Special Services

Figure 28:
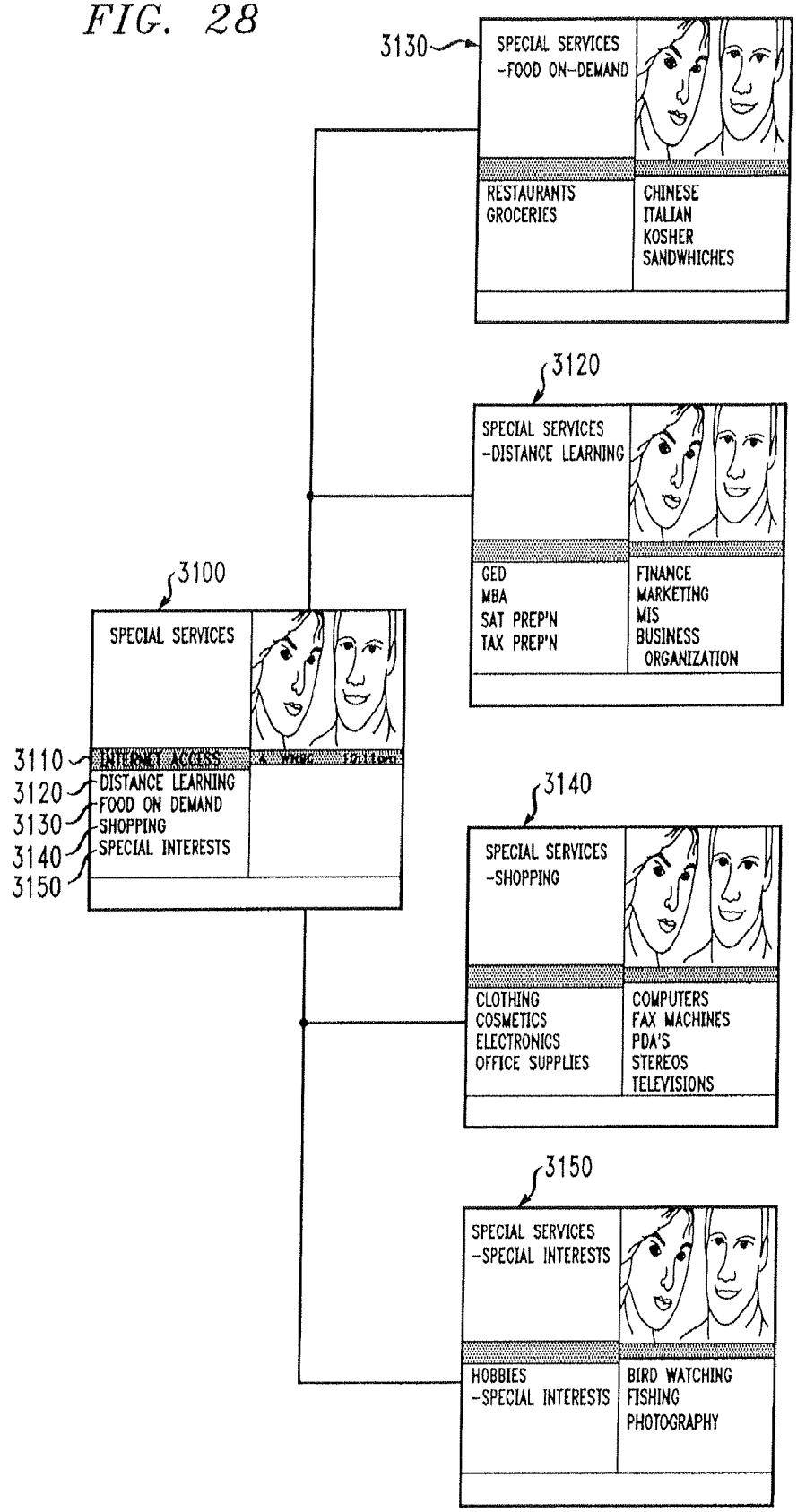
FIG. 28 illustrates screen displays in accessing different Special Services features in accordance with the invention.

As shown in FIG. 28, special services 3100 may be accessed by the user interface and, in one embodiment, may include Internet Access 3110 (including AOL, e-mail, AIM, keyword searching, etc.), Distance Learning 3120, Food On Demand 3130, Shopping 3140 and Special Interests 3150.

In one embodiment, a user may select Distance Learning (3120) to access a wide array of educational programs. For example, in the Distance Learning feature, terminal 158-1 may display program offerings relating to earning a GED or MBA, SAT preparation courses, tax preparation courses and the like. A user may access a specific course or course program by selecting from a menu of educational program categories and then choosing the specific course or course program that is desired. If the user highlights a specific course or course program and depresses info key 990 of remote control 900, terminal 158-1 displays information concerning the course.

Through the user interface, the user can also access Food On Demand (3130) which provides information concerning local restaurants or groceries. In one embodiment, a user that accesses Food On Demand is prompted by terminal 158-1 to enter a food type such as Chinese, Italian, Kosher, Sandwiches, etc. The user is then prompted to select whether information concerning restaurants or groceries is desired. In response to these parameters, relevant information is provided to the user. For example, if a user selects Chinese for food type and restaurant as venue, then a listing of Chinese restaurants in the user=s geographic area is displayed. By selecting one of the listed restaurants, the user can access, via terminal 158-1, certain basic information such as description of restaurant and restaurant location and hours. By pressing info key 990 of remote control 900, the user can access advanced information including the restaurant=s menu, photographs of the restaurant and real time seating availability and reservations. Similar type of information is available concerning grocers listed with the Food On Demand feature including available food items, prices, store location and hours.

Through the user interface, a user can also access information for purchasing goods. The Shopping feature (3140) enables a user to access basic information and advanced information concerning a wide array of goods. In one embodiment, by choosing the Shopping feature, headend 105 generates an initial list which includes broad categories of goods such as clothing, electronics, office supplies, cosmetics, etc. When the user selects a listed category, subcategories of goods are then displayed. An example of subcategories for the electronics category may include computers, televisions, stereos, PDA=s, fax machines, etc. Once a subcategory is selected, specific goods relating to the selected subcategory is listed. Similar to Food On Demand, a user can access basic information and advanced information about a selected good. For example, if an HP fax machine is selected, basic information may include certain specifications and pricing information concerning the fax machine. By selecting info key 990 of remote control 900, advanced information including retail stores that sell the fax machines and a video demonstration of the fax machine is made available to the user via terminal 158-1.

Through the user interface, the user can also access Special Interests (3150). By accessing the Special Interests feature, a user may access a list of Hobbies or a list of Special Interests. The list of Hobbies may include fishing, photography, bird watching and the like. Accessing a specific hobby within the Hobbies list enables a user to access basic information and advanced information concerning such hobby. For example, if a user accesses bird watching, basic information including a description of the hobby is provided. By pressing info key 990 of remote control 900, the user may learn advanced information concerning bird watching including organized local field trips, bird watching books that are for sale, recommended bird watching equipment such as binoculars, etc. The Special Interests feature also offers basic and advanced information concerning special interests such as public speaking, religion, etc.

Settings

Various Settings enable customization of the operation and navigation of the user interface. In one embodiment, such settings may include: Blocked Channels, Excluded Channels, Power On Channel, Power On Timer, Power Off Timer, SAP and Out-Of-Market.

Excluded Channels are those channels that a user programs to be temporarily skipped when the user at terminal 158-1 is channeling up or down. A user may choose to exclude a channel because it is rarely viewed by the user and therefore it is more convenient for the user not to have to navigate through such channel.

Blocked Channels are those that are key protected and prevents unauthorized viewing of such channels. One example in which channels are blocked is where parents want to restrict access of one or more channels to their children because the content offered by such channels may be considered inappropriate.

Power On Channel is a setting that allows a users to program a specific channel to be tuned each time that terminal 158 is turned on. For example, avid sports fans may always want their terminal to turn on to ESPN.

Terminals 158 may also have power on and power off timers. A power on timer enables the terminal to turn on at one or more predetermined times during designated days.

For example, a user that wakes up for work at 6:00 a.m., Monday through Friday, may want to set the terminal to automatically turn on at such time. Similarly, power off timer designates a specific time in which the terminal is turned off. In another embodiment, a user can program the terminal to turn off after a certain amount of time has transpired (e.g., 2 hours).

AOut-of-market@ is a feature that enables a person who is located in a certain geographic area to access multimedia content from another geographic area. For example, if a user who lives in New York City travels to Los Angeles for two weeks, the user may want to access local New York City news. By accessing the Out-of-market feature, the user may choose media content that is geared toward the specific market for which the user is particularly interested. This is accomplished by first creating an Out-of-market profile. For example, a profile with the name ANY News@ may be created by a user who wishes to reserve local news programs broadcast Over New York TV channels. When the user travels out of the marketplace (for example, to Los Angeles), the reserved Out-of-market programming may be accessed when the user inputs the appropriate personal identification number and profile name.

Figure 29:
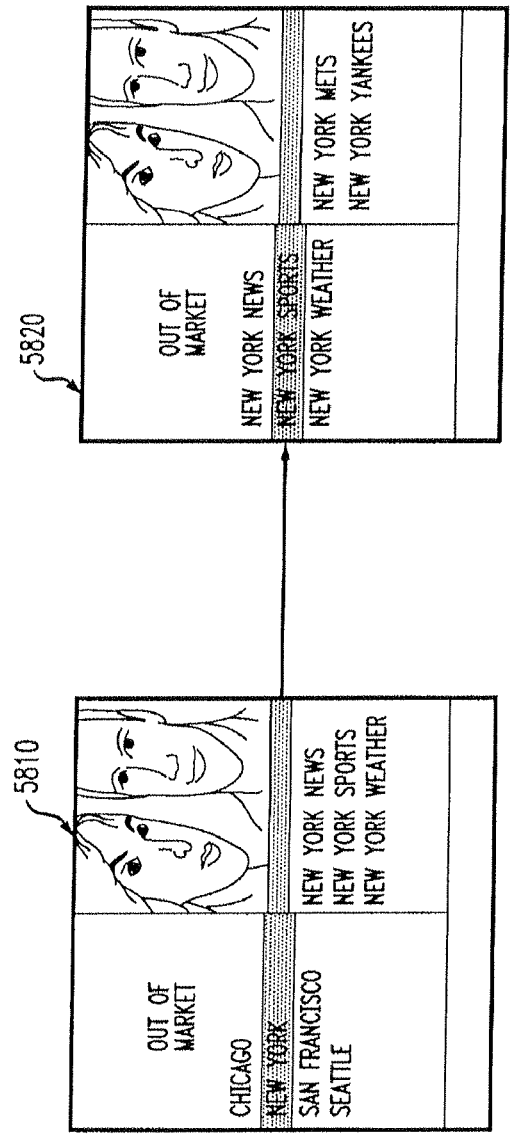
FIG. 29 illustrates a screen display in accessing out-of-market program line-ups.

For example, referring to Out-Of-Market GUI 5810 of FIG. 29, a user may have out-of-market profiles set up for four U.S. cities B Chicago, New York, San Francisco and Seattle. By selecting ANew York@ from the out-of-market feature menu, the user may choose from, for example, New York News, New York Sports and New York Weather. If the user selects New York Sports, programming content relating to such selection is displayed. In this case, the user may select between New York Mets or New York Yankees baseball content (5820).

What=s Hot

Figure 30:
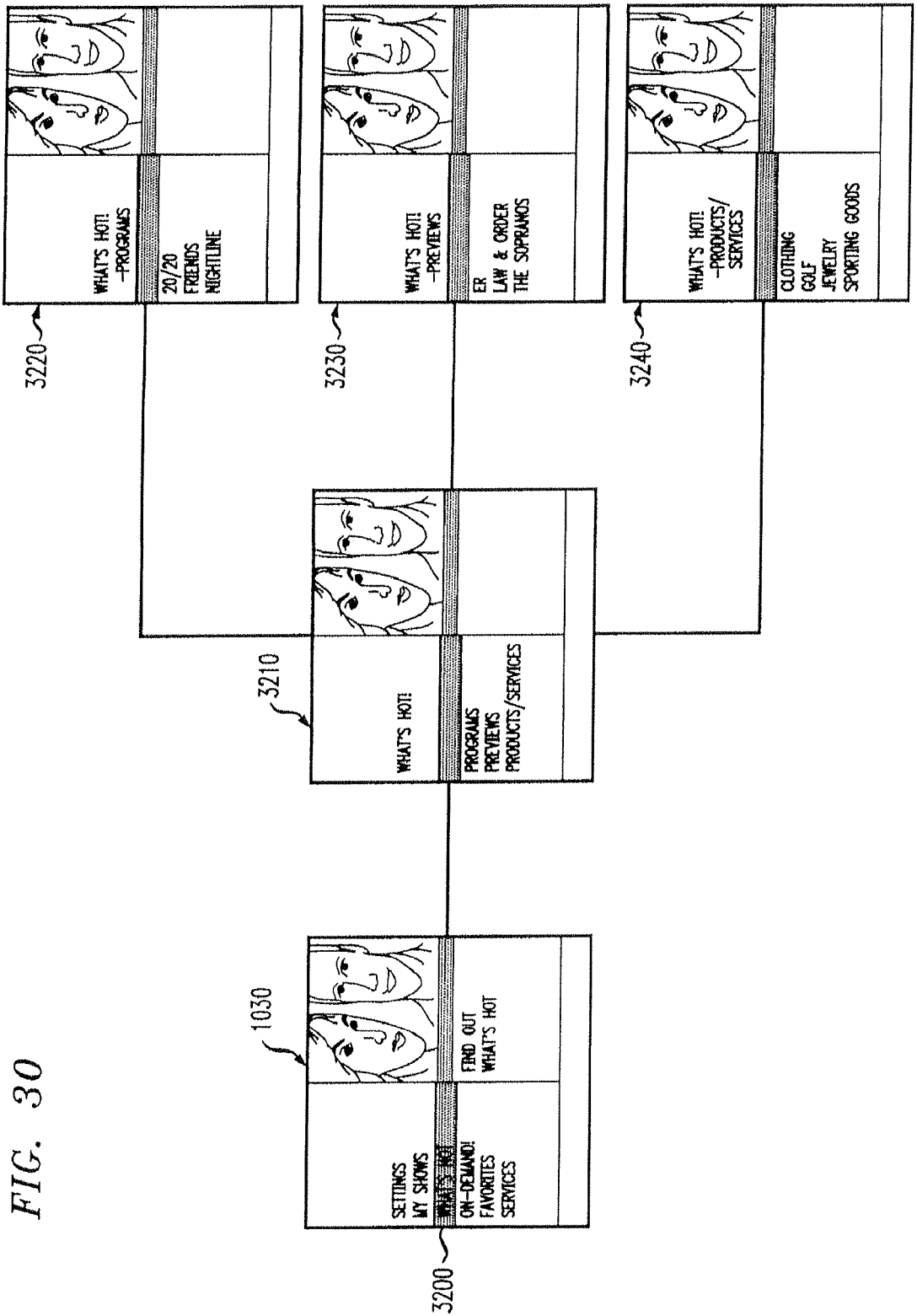
FIG. 30 illustrates screen displays in accessing a What=s Hot GUI in accordance with the invention.

The AWhat=s Hot@ feature offers users convenient access to programs, products and services that are or expected to be in popular demand. Access to the What=s Hot feature according to one embodiment of the invention is shown in FIG. 30. By accessing the What=s Hot feature 3200 of menu 1110, What=s Hot submenu 3210 is accessed. From the What=s Hot submenu, a user at terminal 158-1 can, for example, view a listing of the most popular programs 3220 that have been broadcast or those that have yet to be broadcast but are expected to be in high demand. A user can then reserve one or more of the listed programs for viewing.

What=s Hot feature 3200 also enables a user to view previews 3230 of popular programs and, at any time during the preview, the user can reserve the program that is being previewed. If the program is one that has been broadcast, then the user can play the program immediately or at some time in the future. If the preview relates to a program that has yet to be broadcast, the program may be reserved during the preview, and the user can play back the reserved program after the program is broadcast.

What=s Hot feature 3200 also offers users access to information concerning popular products and services (3240). In one embodiment, these products may be listed by categories, such as sporting goods, jewelry, clothing, golf lessons and the like. In another embodiment, these products and services may be listed alphabetically by product or service name. A user can select a product or service from the What=s Hot product/service list and access information, including basic and advanced descriptive information.

For example, if a new line of motorboats has recently been released in the marketplace, the user interface may display information concerning the specifications and sale of such boats. In one embodiment, a user may first access basic information about the boat by selecting the motorboat product name from the list of products and services. Basic information may include physical dimensions of the boat, its speed, suggested retail price, etc. The user may then press info key 990 on remote control 900 to access advanced product information. Advanced product information may include retail stores that sell the boat and directions to and hours of operation of identified stores. Advance product information may also include a video showing the boat in operation.

Network Home Graphical User Interface (GUI)

Figure 31:
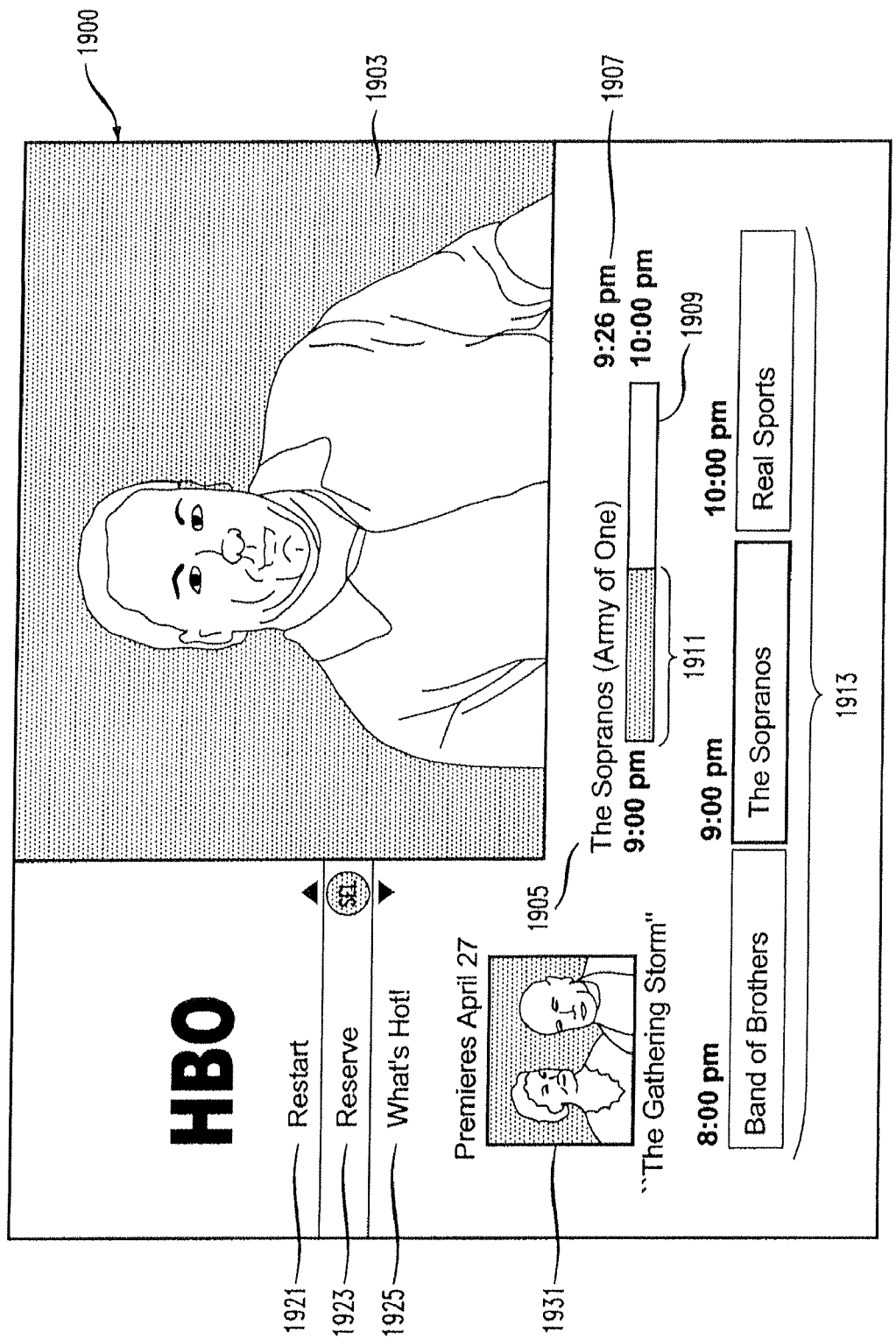
FIG. 31 illustrates a network home graphical user interface (GUI) in accordance with the invention.

A user in this instance may access network home GUI 1900 in FIG. 31 through interactive program guide 1020. As mentioned before, rights to all or some of the program materials on certain channels may have been negotiated and acquired from their providers. In accordance with an aspect of the invention, these rights-acquired channels are indicated on the program guide differently, e.g., in a different color, than other listed channels. In this example, let=s say rights to all program materials on the HBO channel have been acquired, which thus is indicated as a rights-acquired channel on the program guide. For instance, by highlighting the HBO channel on the guide and pressing info key 990 on remote control 900, the user is able to access network home GUI 1900, which concerns the HBO channel in this instance.

As shown in FIG. 31, GUI 1900 comprises window 1903 which displays thereon an in-progress HBO program, i.e., the ASopranos@ in this instance. The title of the in-progress program denoted 1905 appears under window 1903. The current time denoted 1907 also appears under window 1903. A time bar denoted 1909 is used to indicate the progression of the in-progress program. One end of time bar is marked with the start time of the in-progress program (i.e., 9:00 p.m. in this instance), and its other end is marked with the end time thereof (i.e., 10:00 p.m. in this instance). The same start and end times of the in-progress program are indicated on micro-grid or micro-guide 1913, along with those of the programs contiguous to the in-progress program. Time bar 1909 has marking 1911 thereon for graphically indicating the proportion of the program which has been broadcast. If the user wants to view the in-progress program from the beginning thereof, the user may use navigation keys 985 on remote control 900 to cause a ARestart@ option (denoted 1921) to be highlighted, and selects the option by pressing select key 960. If the user wants to reserve the in-progress program for later viewing thereof, the user may similarly select a AReserve@ option, denoted 1923. If the user wants to take advantage of the above-described What=s Hot feature to reserve certain HBO programs through their promotional previews, the user may select a AWhat=s Hot!@ option, denoted 1925. Similar to a What=s Hot preview, a thumbnail preview, denoted 1931, may be used to reserve the program (e.g., AThe Gathering Storm@) featured in the preview in advance of the broadcast of the program (e.g., on April 27). To make such a reservation, the user may highlight and select preview 1931.

One of the motivations for providing a network home GUI in accordance with the invention is to facilitate user access to programming content and channel listings on a programming-network by programming-network basis. A programming network may be a multi-program-channel broadcaster such as the CNN network, NBC network, HBO network, etc. For example, the CNN network offers multiple program channels and choices such as CNN, CNN Headline News, CNN fn (Financial News), CNN Sports Illustrated, CNN Espanol, CNN International, etc. However, because the channel numbers assigned to the CNN channels invariably are not close to one another, their listings in prior art do not appear as a group on a program guide where program channels typically are listed in numerical order. Another example is the NBC network, which offers the NBC channel on program channel 4 in some markets, but its affiliated CNBC and MS NBC channels are not listed anywhere close to the NBC channel on a prior art program guide. Moreover, the NBC High Definition channel may be listed some 800+ channels away from the NBC channel. Indeed, there is no real logic or pattern as to where program channels affiliated with the same programming network would appear in a prior art entertainment delivery system. As a result, a user of such a prior art system finds it extremely difficult to access program channels on a network basis.

In accordance with another aspect of the invention, the Network Home GUI serves as an origination point or a "home" site for a programming network from which a user may access the network's affiliated program channels, and its products and services in general, which are aggregated in a manner described below. Such an aggregation not only facilitates user access to the programming network's products or services, but also its cross-marketing and promoting the same.

Figure 32:
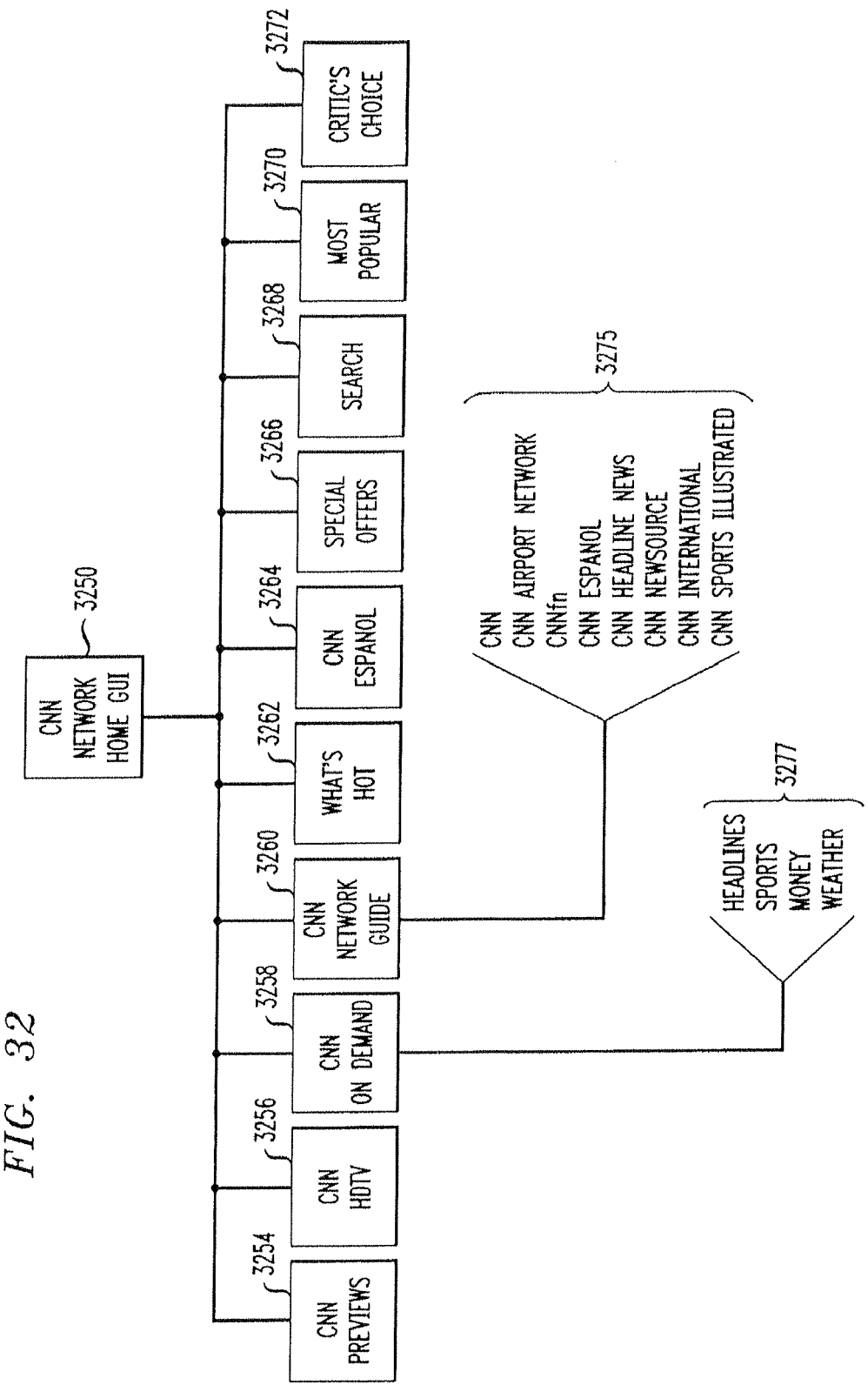
FIG. 32 illustrates a flow chart depicting a sequence of selectable options originating from the network home GUI in accordance with the invention.
Figure 33:
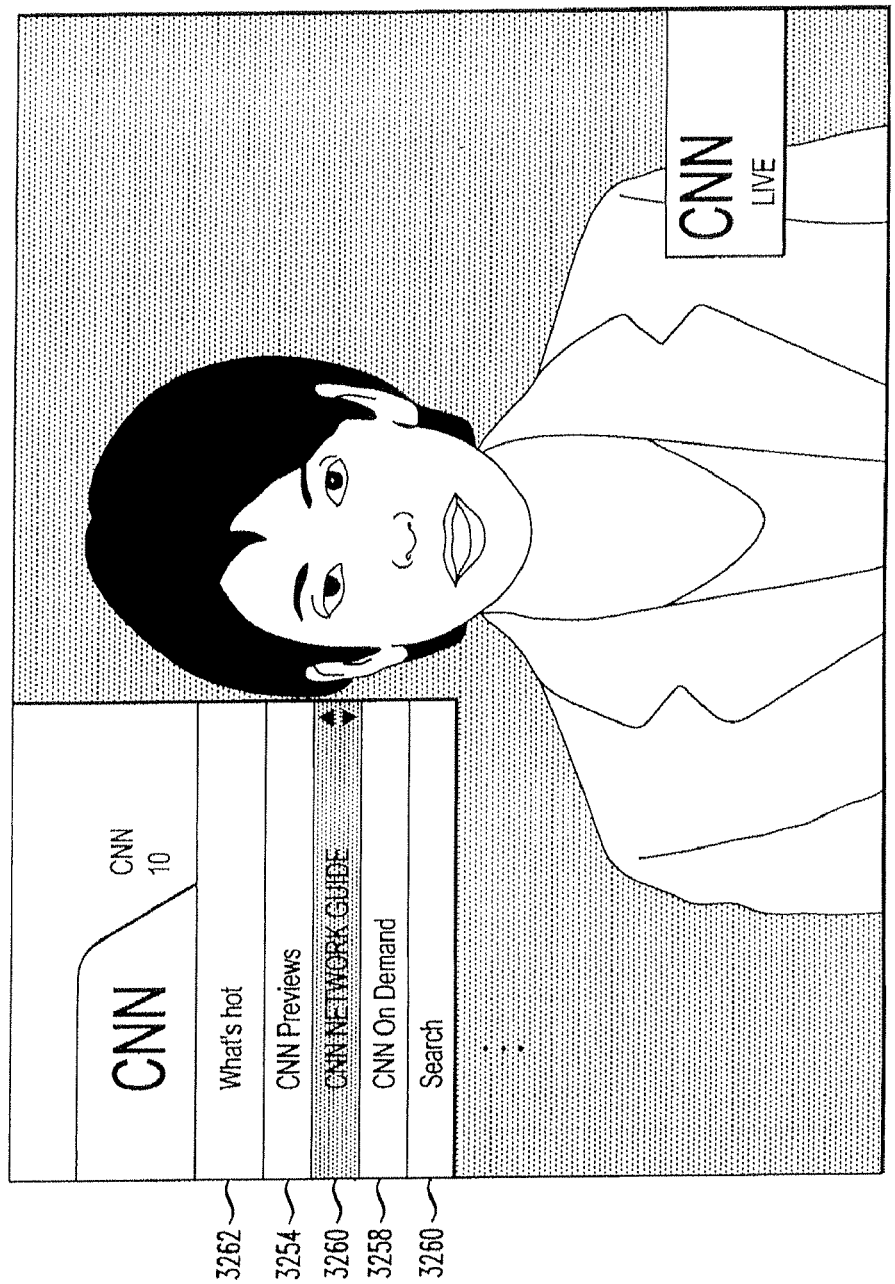
FIG. 33 illustrates a GUI which may be invoked from the network home GUI, and which includes a subset of the selectable options.

Referring to FIG. 32, in this illustrative embodiment, let's assume that a user has accessed CNN network home GUI 3250 in a manner similar to accessing HBO network home GUI 1900 described before. In this instance, the user when viewing GUI 3250 presses a predetermined key, e.g., "select" key 960, on remote control 900 to access GUI 3280 in FIG. 33. Referring to both FIGS. 32 and 33, GUI 3280 includes a display of an in-progress program on the CNN channel to which the user's set-top terminal is currently tuned. In addition, GUI 3280 includes various options pertaining to the CNN network, such as CNN Previews option 3254, HDTV option 3256, CNN On Demand option 3258, CNN Network Guide option 3260, What's Hot option 3262, CNN Espanol option 3264, Special Offers option 3266, Search option 3268, Most Popular option 3270, Critic's choice option 3272, etc. (some of which are not shown in FIG. 33).

In this instance, let's say the user uses remote control 900 to highlight and select CNN Network Guide option 3260 on GUI 3280. The user is thereby provided with another GUI including an aggregation of program channels (denoted 3275 in FIG. 32) affiliated with the CNN network, e.g., the CNN, CNN Airport Network, CNNfn, CNN Espanol, CNN Headline News, CNN Newsource, CNN International, CNN Sports Illustrated channels.

Channel aggregation 3275 conveniently provides a network guide for all program channels affiliated with the CNN network, each of which is selectable to view the program guide associated with the program channel. The program guide, when shown, is initially centered on the listing of the in-progress program on the program channel associated therewith, flanked by a number of listings of previously transmitted programs and those to be transmitted. The user may scroll the guide forward or backward in time to learn additional listings. In this illustrative embodiment, a selection of the listing of an in-progress program causes the user's set-top terminal to be tuned to the in-progress program. A selection of the listing of a past program causes a reservation thereof if the past program has not been recorded by, say, a set-top PVR. A selection of the listing of a future program causes a reservation or recording of the same.

In this illustrative embodiment, the CNN programming network also has on-demand channels affiliated therewith which allow a user to view previously transmitted programming content, and special programming content at his/her convenience on an on-demand basis. Typically, these on-demand channels also are not listed adjacent to one another on a prior art program guide, either. Thus, similar to option 3260, CNN On Demand option 3258 provides access to an aggregation of CNN on-demand channels, denoted 3277. For example, aggregation 3277 includes the Headlines, Sports, Money and Weather channels.

Access to an on-demand channel may be subscription based. In that case, when a user attempts to access one such on-demand channel, a server (not shown) in headend 105 may verify whether the user is an on-demand subscriber, and perform the steps similar to those of FIG. 16 which enable the user to instantly sign on with the on-demand service if he/she currently is not a subscriber. A non-subscriber may also be afforded an opportunity to receive a free trial of the on-demand service for a limited time.

In addition, a selection of CNN Previews option 3254 enables a user to preview CNN programming content, and to reserve such programming content to be aired. A selection of CNN HDTV option 3256 causes an aggregation of any CNN HDTV channels to be presented, from which a user may select to access one such channel. What's Hot option 3262 is similar to option 1925 described before. A selection of CNN Espanol option 3264 causes an aggregation of any CNN Spanish speaking channels to be presented, from which a user may select to access one such channel. A selection of Special Offers option 3266 causes a presentation of any special offers of products or services by the CNN programming network. Search option 3268 allows for searching for content, relating to the CNN programming network, by keyword entry or thematic browsing. A selection of Most Popular option 3270 enables a user to access information concerning popular CNN programming content, products or services. A selection of Critic's Choice option 3272 enables a user to access information concerning critics' favorite programming content, products or services.

Quick View Guide

Figure 34:
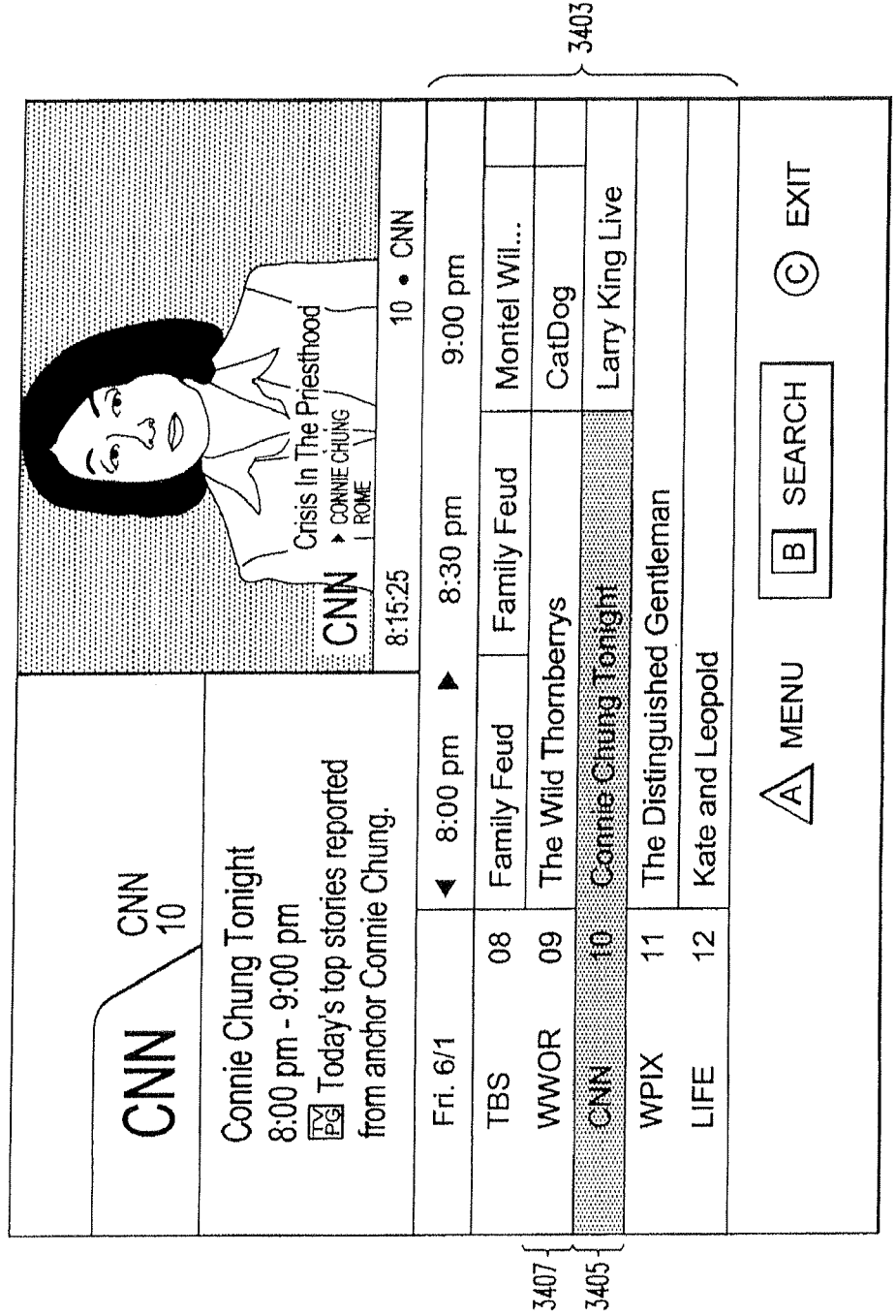
FIG. 34 illustrates a screen display including a program guide in a grid format.

As previously described, depression of "Guide" key 920 on remote control 900 enables a user to access an interactive program guide. One such guide is illustrated in FIG. 34 where in this instance the user accesses the guide while he/she is viewing the "Connie Chung Tonight" show on CNN channel 10. As shown in FIG. 34, guide portion 3403 is arranged in a typical grid format where each row is associated with a different program channel. For example, row 3405 lists the programming of CNN channel 10 starting with the Connie Chung Tonight show (from 8:00 p.m. to 9:00 p.m.) which the user is currently viewing and is highlighted. This show is followed by "Larry King Live" starting at 9:00 p.m. Similarly, row 3407 lists the programming of WWOR channel 9, indicating that "The Wild Thornberrys" is shown from 8:00 p.m. to 9:00 p.m.; and "CatDog" is shown from 9:00 to 9:30 p.m. It has been recognized that the grid format, where programming of different program channels are simultaneously listed in portion 3403, is ineffective in certain respects. For example, because of the limited display area of portion 3403, it can accommodate only three half-hour slots at a time, e.g., 8:00 p.m. to 8:30 p.m., 8:30 p.m. to 9:00 p.m. and 9:00 pm to 9:30 p.m. As a result, the number of programs that can be listed in a row corresponding to a program channel is accordingly limited, e.g., one to two programs at a time. This proves to be inconvenient especially when a user is interested in learning the programming listing of only a particular channel, and more than one or two programs thereon.

Figure 35:
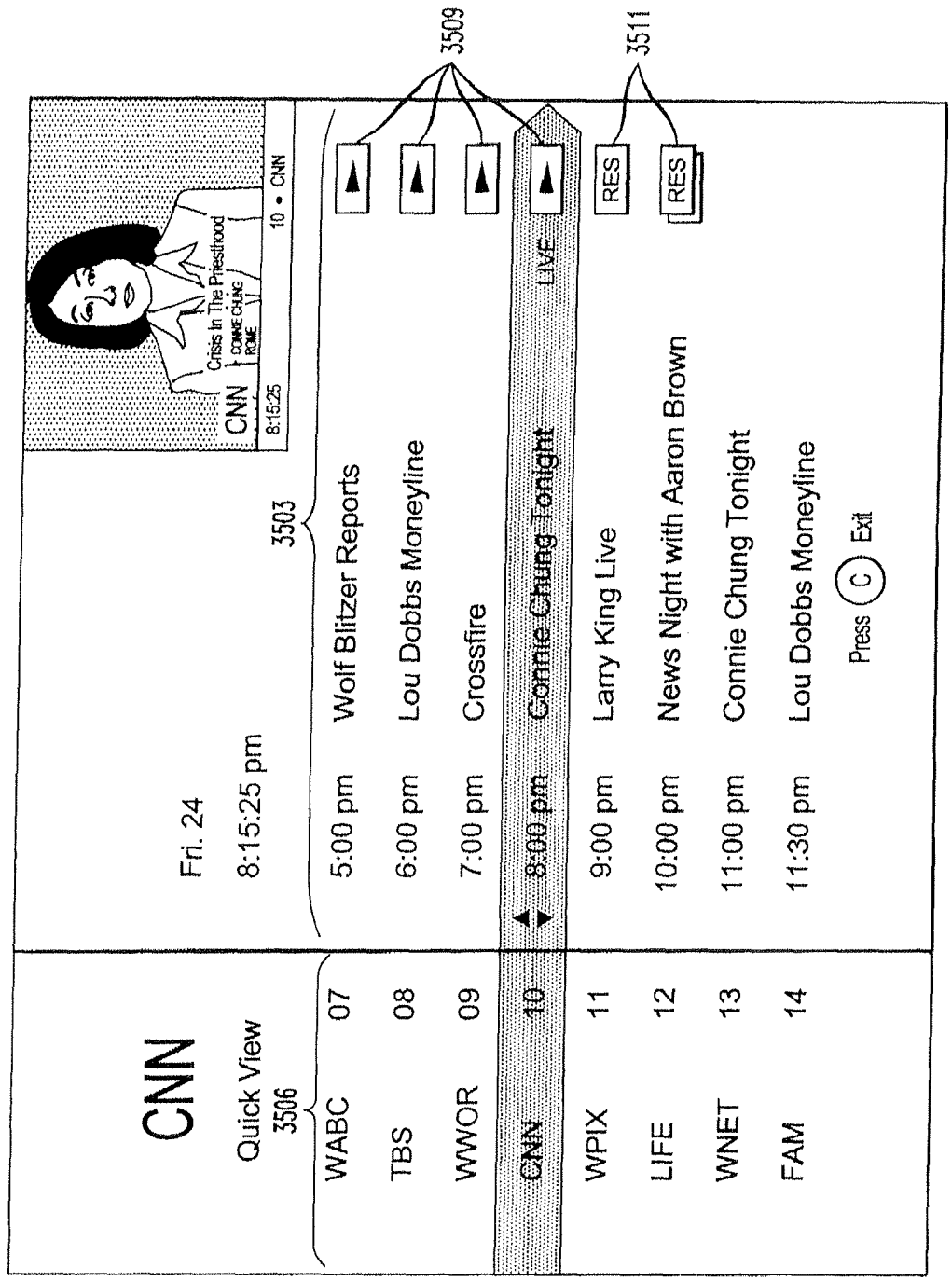
FIG. 35 illustrates a Quick View guide which shows a programming listing of a selected program channel.

Thus, in accordance with another aspect of the invention, a "Quick View" guide is provided whereby a user may access the programming listing of only the program channel of interest. FIG. 35 illustrates one such Quick View guide (denoted 3501), which in this instance is invoked when the user at the grid guide of FIG. 34 again presses "Guide" key 920. As shown in FIG. 35, guide 3501 differs from the typical grid guide in that the programming listing of a particular channel is shown in a fanlike fashion. In this instance, because the user is currently viewing CNN channel 10, guide 3501 shows the programming listing of the CNN channel only. Specifically, program listing portion 3503 lists CNN programs solely, which surround the in-progress program (indicated "Live" in this instance), i.e., the "Connie Chung Tonight" show, which begins at 8:00 p.m. and is highlighted. That is, portion 3503 in the first instance lists not only the CNN programs following the Connie Chung Tonight show as in prior art, but also programs preceding the same.

It should be noted that the number of programs listed in portion 3503 is not dictated by the number of time slots allowed as in portion 3403. Rather, because of its fanlike format, portion 3503 always can list a predetermined number of programs, e.g., eight in this instance. The user may manipulate "navigation" keys 985 to scroll up or down the CNN programming listing in portion 3503. In this illustrative embodiment, a selection of an in-progress program in the listing causes the user's set-top terminal to be tuned to the in-progress program. A selection of option 3509 associated with an in-progress program or a past program in the listing causes an exercise of a Lookback feature (described before) on the in-progress or past program. A selection of option 3511 associated with a future program in the listing causes a reservation of the future program.

The user may also manipulate page +/− key 987 to select a program channel other than CNN channel 10 in channel portion 3506, e.g., WABC channel 7. By pressing select key 960 after highlighting the WABC channel 7 indicator in portion 3506, the user is provided with the programming listing of channel 7 in portion 3503, instead.

Network Options GUI

Figure 36:
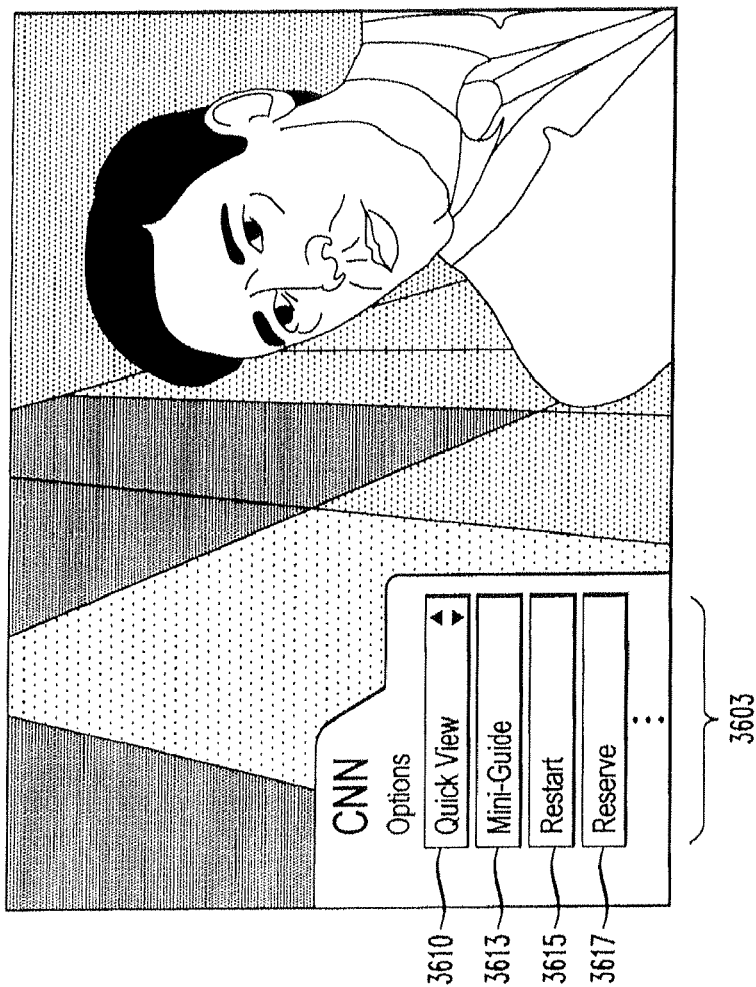
FIG. 36 illustrates a Network Options GUI in accordance with the invention.

FIG. 36 illustrates Network Options GUI 3601 serving as a "home" site in accordance with the invention, alternative to the Network Home GUI described before. In this instance, GUI 3601 concerning the CNN programming network may be accessed by pressing Select key 960 on remote control 900 while a program on the CNN channel is being viewed. GUI 3601 shows thereon, in addition to such a CNN program, menu 3603 comprising selectable options 3610, 3613, 3615, 3617, etc. For example, by pressing Select key 960 while option 3610 is highlighted, a user can access a Quick View guide, showing a programming listing of the CNN channel in a manner previously described. By using the navigation keys on remote control 900, the user can highlight a different option for selection. A selection of, say, option 3613 in this instance enables the user to access a Mini-Guide described below. A selection of, say, option 3615 in this instance causes a restart of the program being viewed, thereby allowing the user to view the program from its beginning. A selection of, say, option 3617, in this instance enables the user to reserve the program being viewed for later review.

Figure 37:
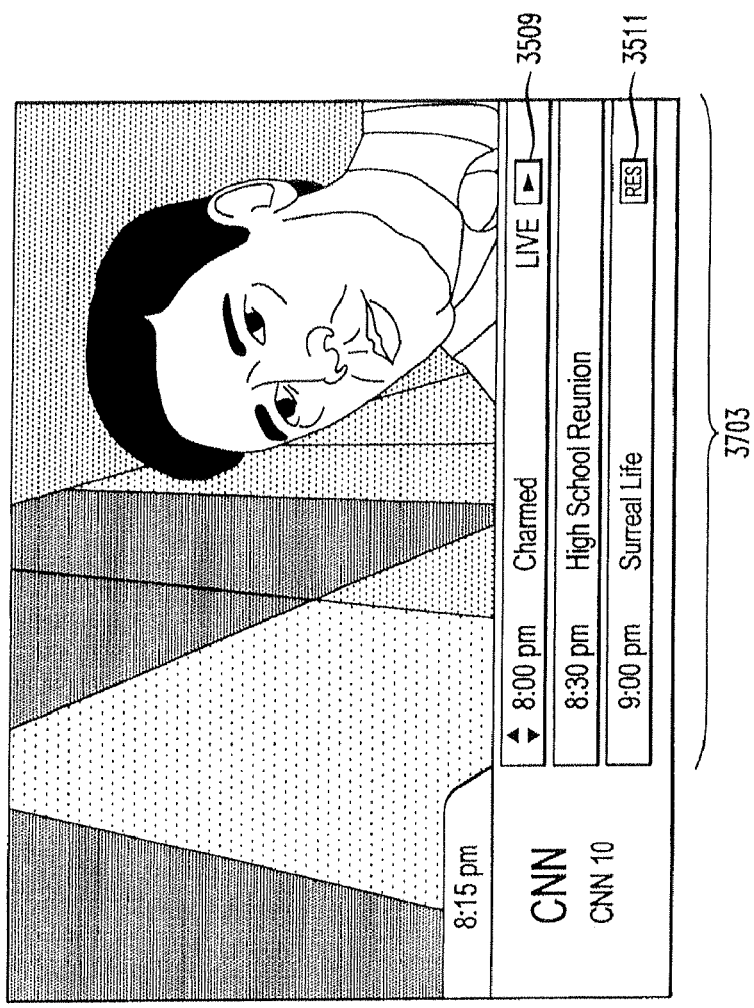
FIG. 37 illustrates a Mini-Guide in accordance with the invention.

The aforementioned Mini-Guide will now be described, which is illustrated in FIG. 37. Mini-Guide 3701 is designed to be a mini-version of a Quick View Guide, e.g., guide 3501, described before. However, unlike the Quick View Guide, Mini-Guide 3701 dedicates a major portion of its screen to an on-going program so that a user can view the on-going program effectively, notwithstanding program listing portion 3703, which occupies the rest of the screen and provides a listing of a smaller number of programs, e.g., three programs, concerning the CNN channel than the corresponding Quick View guide. That is, portion 3703 is designed to list only a subset of those programs in the program listing portion of the corresponding Quick View Guide, e.g., portion 3503. Like portion 3503, portion 3703 includes option 3509 selectable to exercise the Lookback feature on a past or in-progress program, and option 3511 selectable to reserve a future program.

Music on Demand

Figure 38:
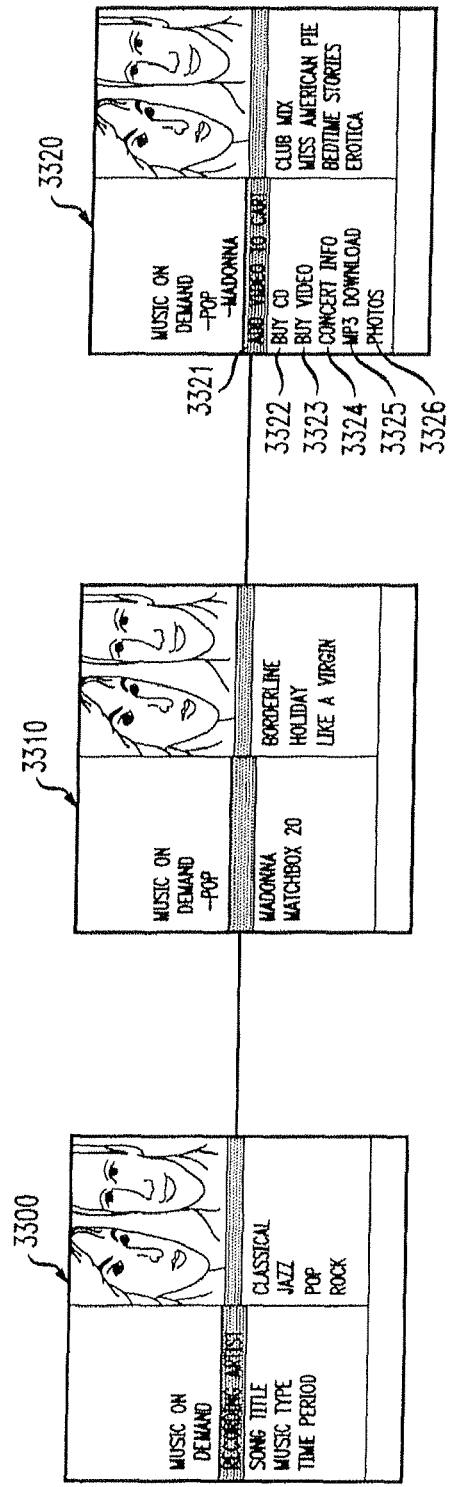
FIG. 38 illustrates screen displays in accessing different Music-On-Demand features in accordance with the invention.

Referring to FIG. 38, through the user interface, an interactive music video feature called Music On Demand may be accessed. Music On Demand enables a user to search for videos by categories 3300, including recording artist name, song title, music type (jazz, rock, classical, etc.), time period (60's, 70's, 80's), and the like, as well as associated subcategories 3310. Upon selecting a video for viewing, a user at terminal 158-1 can access several Music On Demand options 3320 by pressing info key 990 on remote control 900, including Add Video to Shopping Cart 3321, Buy CD 3322, Buy Video 3323, Concert Information 3324, MP3 Download 3325 and Photos 3326.

The Add Video to Shopping Cart feature 3321 enables a user to reserve a music video such that it can be recalled for viewing at any time. In one embodiment, the user may Arent@ the video—that is, for a certain price, the user can access the video for a predetermined time period (such as a month). In another embodiment, the user may Abuy@ the video—that is, for a certain price, the user has extended term access to the video (such as one year or unlimited access).

The Buy CD feature 3322 enables a user to purchase a recording of the artist that is performing the video that is being currently viewed by the user. In one embodiment, a list of CD=s that contains the performed song by the performing artist is displayed. In another embodiment, all CD=s recorded by the performing artist is displayed by terminal 158-1 for purchase by the user. Similarly, the user will have the option to (1) buy a recording of the video by selecting the Buy Video feature (3223); (2) download an MP3 recording of a song or CD recorded by the viewed artist by selecting the Download MP3 feature (3224); or (3) download photographs of the recording artist by selecting the Photos feature (3225).

The Concert feature (3226) enables a user that is a watching a music video to access concert information relating to the recording artist. Concert information may include location, date and time of the concert, ticket availability and pricing, as well as a link to purchase tickets.

Sports

Figure 39:
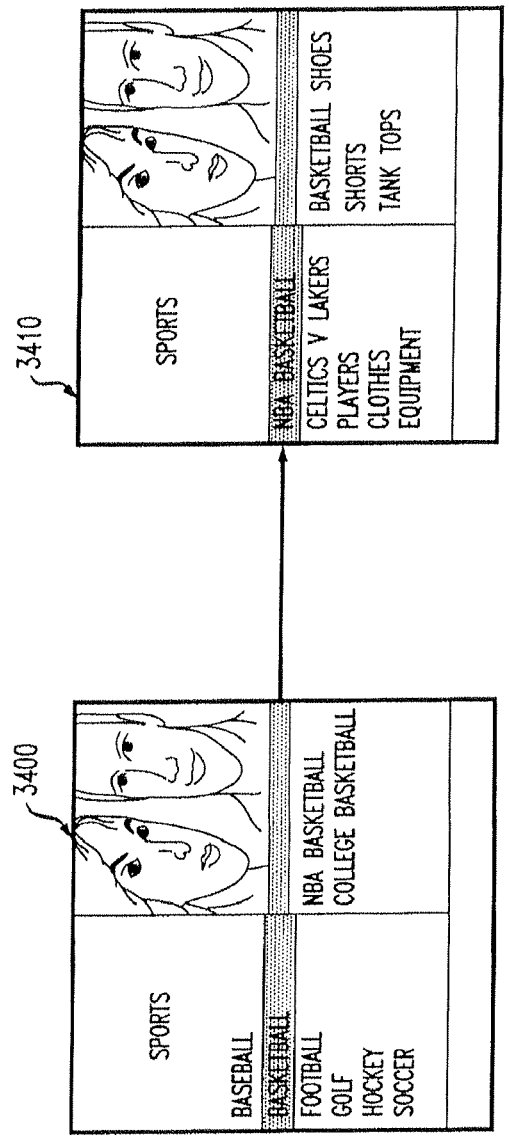
FIG. 39 illustrates screen displays in accessing different Sports features in accordance with the invention.

Referring to FIG. 39, through the user interface, convenient access to sports programs and information relating to such programs may be provided. The Sports feature (3400) enables a user to search for sports programs by reviewing menus for selecting the type, subtype and specific sports program to be viewed (3410). The types of sports programs may include basketball, baseball, hockey, soccer, football, golf, etc. If, for example, a user selects basketball, several subtypes may be displayed including NBA basketball, college basketball, and the like.

When a sports program is reserved and viewed, the user at terminal 158-1 can access information concerning the viewed program. In one embodiment, when the user depresses info key 990 of remote control 900, a menu is displayed for accessing information concerning the sport being viewed, the specific game being viewed, the specific players being viewed and other items of interest relating to the viewed sports program, including information about the sports equipment used and clothing worn by the players.

Searching

In one embodiment of the invention, based on the data associated with a program or event, users can search for content including On Demand programs, Pay-Per-View, broadcast and Out Of Network programs. Users can find programs and events by searching for certain criteria including actor, title, keyword, year/season, genre, rating and the like. A search may include one of these parameters or multiple parameters.

To access Searching, a user at terminal 158-1 depresses Search key 995 of remote control 900. Once Searching is accessed, a user can then complete a Search. FIG. 40 illustrates the process of creating a search. Search GUI 1030 may be accessed from the home GUI 1030. As shown in FIG. 40, different search parameters may be used. For example, a user can search for content by entering text relating to an actor=s name, program title or any other keyword (2200). In another embodiment, by selecting genre, a user can choose from action/adventure, comedy, documentary, drama, horror, romantic comedy or suspense (2210). A user may also search for content by selecting a listed year (2220) or listed rating (i.e., TV-Y, NC-17, etc.) (2230). When the genre, year and/or rating parameters are used for searching, a user may be prompted to use an additional text search to reduce the number of programs listed in a requested search result. In one embodiment, a predetermined maximum number of results (e.g., 50) for a given search may be imposed. If the predetermined maximum is exceeded, the user may be prompted to further limit the search.

Commercial Targeting and Playback Monitoring

In one embodiment of the present invention, headend 105 is capable of varying advertising content included in reserved broadcasts and media processor 119 monitoring user viewing patterns concerning commercials.

By monitoring the content reserved and viewed by a user, headend 105 can create a profile relating to a user=s interests. This information may then be used to target advertising that would be of most use and interest to the user and therefore most effectiveness to advertisers. Because reserved programs are recorded prior to distribution to a user, a content provider has the ability to vary advertising content prior to distributing a program to terminal 158.

Commercial monitoring can provide useful marketing information to advertising companies and the companies that pay for the production and distribution of these commercials. When viewing a program, users often change channels during commercials. Further, when viewing a past program that has been reserved, a user has the additional capability of fast-forwarding through the commercials. Because a commercial is only effective if it is viewed by its intended audience, monitoring whether a user has changed a channel or fast forwarded a program to avoid viewing a commercial can provide useful information to advertisers. Similarly, identifying the commercials that tend to be watched by a higher percentage of the intended audience is valuable information to the advertisers and companies that market the advertised products or services.

Figure 41:
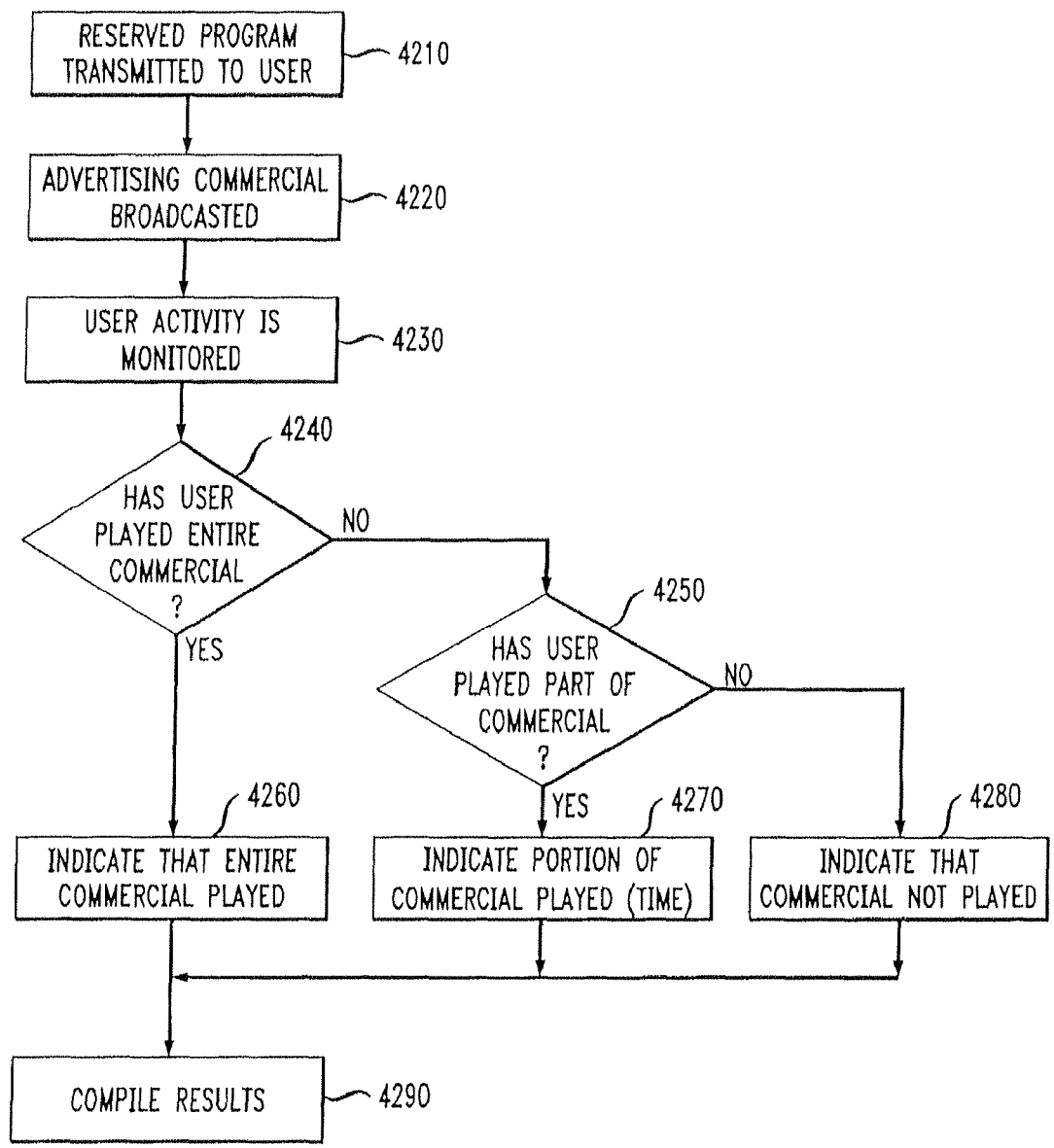
FIG. 41 is a flow chart depicting a process for monitoring user responses to a commercial playback in accordance with the invention.

FIG. 41 illustrates the Commercial Playback Monitoring feature in accordance with one embodiment of the invention. In step 4210, a reserved program is transmitted to a user. At some point during the program, a commercial is broadcast to the user (step 4220) and user activity is monitored (step 4230). In one embodiment, media processor 119 recognizes that a commercial has been presented by detecting tones that are embedded in the reserved program. These tones are embedded at the beginning and at the end of the commercial so that the monitoring functionality of media processor 119 can be automatically powered on and off as a commercial begins and ends.

When a commercial is broadcast and the monitoring functionality is turned on, media processor 119 detects if the entire commercial is played by the user (step 4240), a portion of the commercial is played or whether the commercial has not been played at all (step 4260). If the entire commercial is played, media processor 119 generates a data point at step 4260 indicating that the user has played the entire commercial. If, however, the entire commercial has not been played, media processor 119 similarly generates a data point at step 4280 indicating that the user has not played the commercial at all. Alternatively, if a portion of the commercial has been played, media processor 119 records the amount of time that the user played the commercial (step 4270). This data is then compiled by media processor 119.

By performing such monitoring, a content provider can collect certain information relating to a commercial=s effectiveness including determining the percentage of viewers that watched a specific commercial, which group of user watched and which did not watch the commercial (such as those tuning in to sports programs versus those tuned in to news programs), at what point in the commercial was it no longer played, whether the same user played the same commercial multiple times, and the like.

Picture in Picture (PIP) Programming

In an illustrative embodiment of the invention, a content provider may provide a video stream that appears to a user to be a picture in picture (PIP) broadcast, with multiple programs juxtaposed next to one another. The PIP format may be predefined. For example, in providing a sports PIP package, the PIP format may be defined as having programs from ESPN, ESPN2, ESPN Classic, and ABC Sports displayed on four quadrants of the TV screen, respectively.

In another embodiment, because all programs are recorded at headend 105, a video stream may be provided by the cable operator which represents multiple recorded programs juxtaposed next to one another. Accordingly, headend 105 may receive from a user at a set-top terminal a PIP request, where the PIP format and/or make-up of the displayed programs may be predefined, or selected by the user. In response to such a request, the content of appropriate recorded programs are arranged in headend 105 in a proper format to develop the PIP multicast receivable by the user=s set-top terminal.

Further, by using navigation keys 985 of remote control 900, the user may select one of the PIP displayed programs to play the associated audio.

Messaging Service

In this illustrative embodiment, The messaging services provided in system 100 include system messaging, subscriber content level messaging, and subscriber-to-subscriber messaging services. The types of message provided by each messaging service may be accorded different priorities, and the receipt of certain types of message may be optional. For example, the system messaging service may provide system messages concerning, e.g., emergency information, hot news, etc. The emergency information messages may be accorded a higher priority than hot news messages. In this example, a user may be able to opt out receipt of the hot news messages but not the emergency information messages because of their higher priority. In addition, the system messages may be geographically specific. For example, system messages pertaining to a geographic area are provided to the users in that geographic area only (e.g., having specified zip codes)

The subscriber content level messaging service provides messages which may be directed to specific users at a group level or sometimes even at a personal level. Users of system 100 may be grouped according to their program viewing habit. For example, those users who request baseball programs frequently may be grouped as baseball fan-users. Thus, the messaging service in question may from time to time provide targeted messages concerning baseball games, equipment, etc. to such baseball fan-users. In addition, the messaging service may provide personal messages to a user, including messages concerning the user=s account, an expiration of the user=s reserved program, etc.

The subscriber-to-subscriber messaging service may be realized by taking advantage of the aforementioned RDCs for communicating upstream data, the aforementioned FDCs for communicating downstream data, and network controller 125. To that end, a messaging interface, e.g., a GUI, may be invoked by a user on screen to read, compose, send, reply or forward messages. It should be noted that users at set-top terminals in system 100 are identified by their user account IDs which are assigned thereto when the users register with the messaging service.

For example, a first user at a first set-top terminal, say, terminal 158-1 in FIG. 1, may send through the messaging interface a message to a second user at a second terminal, which may or may not be in the same neighborhood as terminal 158-1. Such first and second users are identified by their respective user account IDs in the message. Accordingly, terminal 158-1 may packetize the message into one or more packets, depending on the length of the message. Each packet in this instance contains, among others, a sequence number for ordering the packet at the receiving terminal, a destination address (e.g., the IP address of network controller 125) and an origination address (e.g., the first terminal IP and/or MAC address). After terminal 158-1 transmits the packet through an RDC, the packet is routed to network controller 125 based on the destination address therein. It should be noted at this point that network controller 125 contains a table for translating a user account ID to the corresponding IP address of the user terminal. Upon learning the second user account ID in the leading packet, network controller 125 looks up in the table the IP (and/or MAC) address of the corresponding second terminal, for which the message is ultimately destined. Network controller 125 then sends a notice to the second terminal via an FDC, informing the latter of the receipt of a message from the first user identified by his/her user account ID. In response to such a notice, the second user at the second terminal may acknowledge that he/she is ready to receive messages. In that case, the second terminal generates a positive acknowledgment to network controller 125. In response, network controller 125 replaces the original destination address in the received packets with the IP (and/or MAC) address of the second terminal, thereby redirecting the packets to the second terminal. The second terminal receives the packets via an FDC, which contain the origination address identifying the originating, first terminal. Conversely, the second user may communicate with the first user through the messaging interface provided by the second terminal, thereby realizing the subscriber-to-subscriber messaging service. Subsequent messages may continue to flow between the two terminals until either terminal sends an end-of-transmission (EOT) message to network controller 125.

In the event that after sending the aforementioned message receipt notice to the second terminal, network controller 125 receives a negative acknowledgment or no response therefrom, the message is retained in network controller 125 for later retrieval by the second terminal. Network controller 125 then informs the first terminal of the negative acknowledgment or non-response from the second terminal.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, remote control 900 is used as an external peripheral to interact with system 100. However, it will be appreciated that other peripherals, such as a printer, dance pad, joystick, camera, and mobile device (e.g., a personal digital assistant (PDA)), connectable to a set-top terminal (e.g., through a USB port) may be used to interact with system 100 as well.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for facilitating user access to programming content, comprising:
    displaying on a display device, as part of a home network graphical user interface corresponding to a single programming network, a plurality of user selectable network related options relating to content available from said single programming network, a user selectable programming network guide option corresponding to the single programming network to which said channel corresponds being one of said user selectable network options;
    responding to user input indicating selection of the programming network guide option by:
        displaying a network guide channel listing providing channel information on a network basis, said network guide channel listing including a group of program channels which correspond to said single programming network, channels corresponding to other networks having channel numbers falling between at least some of the numbers of program channels in said group of program channels, said network guide channel listing including multiple channels corresponding to said single programming network while excluding said channels corresponding to other networks which have channel numbers falling between the numbers of program channels in said group of program channels.

2. The method of claim 1, further comprising:
    presenting, as part of said home network graphical user interface corresponding to the single programming network various additional options pertaining to said single programming network which provides the channel being viewed, said additional options including a preview option providing access to previews of programs provided by said single programming network which provides the channel being viewed.

3. The method of claim 1 wherein at least one of the program channels listed in said network guide channel listing offers high definition television (HDTV).

4. The method of claim 2, further comprising:
presenting, as part of said home network graphical user interface corresponding to the single programming network, a network on-demand option providing access to on-demand programming content provided by said single programming network which provides the channel being viewed.

5. The method of claim 2, further comprising:
presenting, as part of said home network graphical user interface corresponding to the single programming network, a network based search option providing access to searching programs available from said single programming network which provides the channel being viewed.

6. The method of claim 2, further comprising:
presenting, as part of said home network graphical user interface corresponding to the single programming network, an option to select a programming network guide and a network based special offers option providing offers available from said programming network which provides the channel being viewed.

7. The method of claim 1, wherein said network guide channel listing is displayed in a window which does not include a listing of any program channels other than channels corresponding to said single programming network.

8. The method of claim 1, wherein said network guide channel listing is a listing of multiple program channels corresponding to the same network.

9. The method of claim 8, wherein said same network is a CNN network, said network channel listing being an aggregation of information corresponding to CNN network channels, any one of said CNN network channels being selectable by a user from said network channel listing.

10. The method of claim 1, wherein responding to user input indicating selection of the programming network guide option includes continuing to display said content from the channel of said single programming network along with said network guide channel listing.

11. The method of claim 10, wherein said displayed graphical user interface corresponds to a single network, said single programming network being said network to which said channel corresponds.

12. The method of claim 10, wherein said graphical user interface is a home network graphical user interface corresponding to said network to which said channel corresponds.

13. The method of claim 1,
wherein said home network graphical user interface provides information corresponding to a single one of a plurality of different networks at least some of which have program channels corresponding to program channel numbers which are non-contiguous and interspersed with program channel numbers corresponding to other networks, said plurality of different networks providing channels which can be viewed on said display device.

14. The method of claim 1, wherein said method is implemented by a set top box.

15. The method of claim 10, wherein said method is implemented by a set top box.

16. The method of claim 1, further comprising:
displaying with said user selectable network guide option a user selectable network on demand option which, when selected by the user provides a list of programs available on demand from said programming network to which said channel corresponds.

17. The method of claim 1, further comprising:
displaying with said user selectable network guide option a user selectable network previews option which, when selected by the user provides the user an opportunity to preview programs corresponding to said single programming network to which said channel corresponds.

* * * * *